(12) United States Patent
Langmacher et al.

(10) Patent No.: US 8,286,081 B2
(45) Date of Patent: Oct. 9, 2012

(54) EDITING AND SAVING KEY-INDEXED GEOMETRIES IN MEDIA EDITING APPLICATIONS

(75) Inventors: Tom Langmacher, Washougal, WA (US); Samuel Joseph Liberto, III, Portland, OR (US)

(73) Assignee: Apple Inc., Cupertino, CA (US)

( * ) Notice: Subject to any disclaimer, the term of this patent is extended or adjusted under 35 U.S.C. 154(b) by 502 days.

(21) Appl. No.: 12/475,602

(22) Filed: May 31, 2009

(65) Prior Publication Data

US 2010/0281380 A1    Nov. 4, 2010

Related U.S. Application Data

(60) Provisional application No. 61/174,491, filed on Apr. 30, 2009.

(51) Int. Cl.
*G06F 3/00* (2006.01)
*H04N 5/93* (2006.01)

(52) U.S. Cl. .................. 715/723; 715/726; 386/282

(58) Field of Classification Search ........... 715/716–729
See application file for complete search history.

(56) References Cited

U.S. PATENT DOCUMENTS

| | | |
|---|---|---|
| 4,868,687 A | 9/1989 | Penn et al. |
| 5,151,998 A | 9/1992 | Capps |
| 5,204,969 A | 4/1993 | Capps et al. |
| 5,261,041 A | 11/1993 | Susman |
| 5,331,111 A | 7/1994 | O'Connell |
| 5,359,712 A | 10/1994 | Cohen et al. |
| 5,659,793 A | 8/1997 | Escobar et al. |
| 5,664,216 A | 9/1997 | Blumenau |
| 5,682,326 A | 10/1997 | Klingler et al. |
| 5,692,117 A | 11/1997 | Berend et al. |
| 5,812,983 A | 9/1998 | Kumagai |
| 5,835,611 A | 11/1998 | Kaiser et al. |
| 5,874,950 A | 2/1999 | Broussard et al. |
| 5,929,867 A | 7/1999 | Herbstman et al. |
| 5,940,573 A | 8/1999 | Beckwith |
| 5,999,173 A | 12/1999 | Ubillos |
| 5,999,194 A | 12/1999 | Brunelle |
| 5,999,195 A | 12/1999 | Santangeli |

(Continued)

FOREIGN PATENT DOCUMENTS

| | | |
|---|---|---|
| WO | WO 2009/122213 | 10/2009 |
| WO | WO 2010/106586 | 9/2010 |

OTHER PUBLICATIONS

Antony Bolante Premiere Pro CS3 for Windows and Macintosh: Visual QuickPro Guide Dec. 4, 2007.*

(Continued)

*Primary Examiner* — Robert Stevens
*Assistant Examiner* — Phoebe Pan
(74) *Attorney, Agent, or Firm* — Adeli & Tollen, LLP

(57) ABSTRACT

Some embodiment provide media editing applications that include libraries that (i) provide presets (i.e., predefined operations and/or predefined attribute values) for modifying key indices and interpolation between the key indices, and/or (ii) provide storage for storing presets defined by a user of the media editing application. Some embodiments display the presets as thumbnails, thumbnails with text descriptions, and/or text-defined operations. In addition, some embodiments provide user-interface tools that allow the user of the media editing application to augment the preset libraries by storing a selected part of one key-indexed geometry or parts of multiple different geometries as a user-defined preset.

27 Claims, 67 Drawing Sheets

U.S. PATENT DOCUMENTS

| | | | |
|---|---|---|---|
| 6,023,016 | A | 2/2000 | Tamura |
| 6,108,011 | A | 8/2000 | Fowler |
| 6,154,221 | A | 11/2000 | Gangnet |
| 6,154,600 | A | 11/2000 | Newman et al. |
| 6,154,601 | A | 11/2000 | Yaegashi et al. |
| 6,239,846 | B1 | 5/2001 | Billing |
| 6,266,103 | B1 | 7/2001 | Barton et al. |
| 6,392,135 | B1 | 5/2002 | Kitayama |
| 6,469,711 | B2 | 10/2002 | Foreman et al. |
| 6,504,545 | B1 | 1/2003 | Browne et al. |
| 6,512,522 | B1 | 1/2003 | Miller et al. |
| 6,704,029 | B1 | 3/2004 | Ikeda et al. |
| 6,744,968 | B1 | 6/2004 | Imai et al. |
| 6,763,175 | B1 | 7/2004 | Trottier et al. |
| 6,828,971 | B2 | 12/2004 | Uesaki et al. |
| 6,867,787 | B1 | 3/2005 | Shimizu et al. |
| 6,928,613 | B1 | 8/2005 | Ishii et al. |
| 6,956,574 | B1 | 10/2005 | Cailloux et al. |
| 7,006,688 | B2 | 2/2006 | Zaklika et al. |
| 7,030,872 | B2 | 4/2006 | Tazaki |
| 7,062,713 | B2 | 6/2006 | Schriever et al. |
| 7,134,093 | B2 | 11/2006 | Etgen et al. |
| 7,194,676 | B2 | 3/2007 | Fayan et al. |
| 7,225,405 | B1 | 5/2007 | Barrus et al. |
| 7,239,316 | B1 | 7/2007 | Cox et al. |
| 7,319,764 | B1 | 1/2008 | Reid et al. |
| 7,325,199 | B1 | 1/2008 | Reid |
| 7,355,606 | B2 | 4/2008 | Paquette |
| 7,411,590 | B1 | 8/2008 | Boyd et al. |
| 7,518,611 | B2 * | 4/2009 | Boyd et al. .............. 345/473 |
| 7,546,532 | B1 | 6/2009 | Nichols et al. |
| 7,725,828 | B1 | 5/2010 | Johnson |
| 7,765,018 | B2 * | 7/2010 | Hiroi et al. .............. 700/94 |
| 2001/0020953 | A1 | 9/2001 | Moriwake et al. |
| 2001/0036356 | A1 | 11/2001 | Weaver et al. |
| 2001/0040592 | A1 | 11/2001 | Foreman et al. |
| 2002/0044148 | A1 | 4/2002 | Ludi |
| 2002/0154140 | A1 | 10/2002 | Tazaki |
| 2002/0154156 | A1 | 10/2002 | Moriwake et al. |
| 2002/0156805 | A1 | 10/2002 | Schriever et al. |
| 2002/0163498 | A1 | 11/2002 | Chang et al. |
| 2003/0117431 | A1 | 6/2003 | Moriwake et al. |
| 2003/0146915 | A1 | 8/2003 | Brook et al. |
| 2003/0164845 | A1 | 9/2003 | Fayan et al. |
| 2004/0071441 | A1 | 4/2004 | Foreman et al. |
| 2004/0088723 | A1 | 5/2004 | Ma et al. |
| 2004/0199395 | A1 | 10/2004 | Schulz |
| 2005/0007383 | A1 | 1/2005 | Potter et al. |
| 2005/0231512 | A1 | 10/2005 | Niles et al. |
| 2006/0005130 | A1 * | 1/2006 | Hiroi et al. .............. 715/700 |
| 2006/0008247 | A1 | 1/2006 | Minami et al. |
| 2006/0109271 | A1 | 5/2006 | Lomask |
| 2007/0093913 | A1 | 4/2007 | Ferguson et al. |
| 2007/0104384 | A1 | 5/2007 | Shaw |
| 2007/0159487 | A1 | 7/2007 | Felt |
| 2007/0243515 | A1 * | 10/2007 | Hufford .............. 434/319 |
| 2008/0072166 | A1 | 3/2008 | Reddy |
| 2008/0080721 | A1 | 4/2008 | Reid et al. |
| 2009/0201310 | A1 | 8/2009 | Weiss |
| 2009/0297022 | A1 | 12/2009 | Pettigrew et al. |
| 2010/0180224 | A1 * | 7/2010 | Willard et al. .............. 715/773 |
| 2010/0201692 | A1 | 8/2010 | Niles et al. |
| 2010/0275121 | A1 | 10/2010 | Johnson |
| 2010/0281366 | A1 | 11/2010 | Langmacher et al. |
| 2010/0281367 | A1 | 11/2010 | Langmacher et al. |
| 2010/0281404 | A1 | 11/2010 | Langmacher et al. |
| 2011/0131526 | A1 | 6/2011 | Vronay et al. |
| 2011/0258547 | A1 * | 10/2011 | Symons et al. .............. 715/723 |

OTHER PUBLICATIONS

Elaine Weinmann; Peter Lourekas Photoshop 7 for Windows and Macintosh: Visual QuickStart Guide Aug. 16, 2002.*

Audible—Editing for Beinners Part 2—Cut, Copy and Paste Apr. 12, 2004.*

Author Unknown, "Adobe Premiere Pro CS3: User Guide," Month Unknown, 2007, Adobe Systems Incorporated, San Jose, California, USA.

Author Unknown, "Adobe Director 11: User Guide," Month Unknown, 2008, Adobe Systems Incorporated, San Jose, California, USA.

Author Unknown, "Using Adobe Flash CS4 Professional," Month Unknown, 2008, Adobe Systems Incorporated, San Jose, California, USA.

Author Unknown, "Using Adobe Premiere Elements 8 Editor," Month Unknown, 2009, Adobe Systems Incorporated, San Jose, California, USA.

Portions of prosecution history of U.S. Appl. No. 10/337,925, filed Sep. 27, 2007, Reid, Glenn, et al.

Portions of prosecution history of U.S. Appl. No. 12/433,886, filed Dec. 18, 2009, Langmacher, Tom, et al.

Portions of prosecution history of U.S. Appl. No. 12/475,601, filed Dec. 18, 2009, Langmacher, Tom, et al.

Author Unknown, "Cinelerra Linux Video Editing, Cinelerra Cv Manual Section 18: Keyframing," Feb. 16, 2008.

Author Unknown, "KDenLive Open Source Video Editing, Keyframe for Every Video and Audio Effect Variable in the Effects Stack," Nov. 10, 2008 through May 1, 2009.

Jones, Jerry, "India Pro Special Effects Titler," The Ken Stone Index, Apr. 1, 2002, pp. 1-18.

Meade, Tom, et al., "Maya 6: The Complete Reference," Month N/A, 2004, pp. iv-xviii, 194, 204, McGraw-Hill Professional, USA.

Spencer, Mark, "Working with Keyframes in Motion, Part 1: Creating and Manipulating Keyframes," The Ken Stone Index, Feb. 11, 2005.

Stone, Ken, "Boris Calligraphy: Text Generators for Final Cut Pro 3 Title Creation and Animation with 'Title 3D' and 'Title Crawl'," The Ken Stone Index, Jan. 14, 2002, pp. 1-11.

Stone, Ken, "The Basics—Editing with Transitions in Final Cut Pro," The Ken Stone Index, Jun. 12, 2001, pp. 1-8.

Stone, Ken, "Using the Text Generators in FCP," The Ken Stone Index, Aug. 27, 2001, pp. 1-13.

Portions of prosecution history of U.S. Appl. No. 12/475,598, filed Dec. 18, 2009, Langmacher, Tom, et al.

Updated portions of prosecution history of U.S. Appl. No. 12/433,886, filed Feb. 8, 2012, Langmacher, Tom, et al.

Updated portions of prosecution history of U.S. Appl. No. 12/475,601, filed Feb. 6, 2012, Langmacher, Tom, et al.

Updated portions of prosecution history of U.S. Appl. No. 12/475,598, filed Feb. 2, 2012, Langmacher, Tom, et al.

Allen, Damian, et al., "Apple Pro Training Series Motion 3," Safari Books Online, Aug. 30, 2007, 7 pages, Peachpit Press.

Author Unknown, "Apple Announces Final Cut Pro 4," NAB, Apr. 6, 2003, pp. 1-3, Apple Inc., Las Vegas, NV, USA.

Author Unknown, "Adobe Premiere Pro CS3: Classroom in a Book", Month Unknown, 2008, pp. 2-3, 201-221, 225-247, Chapters 9 and 10.

Author Unknown, "Cinelerra CV Manual," Chapters 1, 2 and 18, Mar. 8, 2008, 34 pages.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide,"Apr. 2002, 288 pages, Peachpit Press, Berkeley, CA, USA.

Stone, Ken, "Basic Keyframing in Final Cut Express", The Ken Stone Index, Jan. 27, 2003, pp. 1-14, V. 1.0.1, Ken Stone.

Stone, Ken, "Motion Paths and the Bezier Handle in FCP," The Ken Stone Index, Aug. 13, 2001, pp. 1-11, Ken Stone.

Updated portions of prosecution history of U.S. Appl. No. 12/433,886, filed Mar. 27, 2012 Langmacher, Tom, et al.

Updated portions of prosecution history of U.S. Appl. No. 12/475,598, filed Mar. 26, 2012 Langmacher, Tom, et al.

* cited by examiner

EDITING AND SAVING KEY-INDEXED GEOMETRIES IN MEDIA EDITING APPLICATIONS

CLAIM OF BENEFIT TO PRIOR APPLICATION

This application claims the benefit of U.S. Provisional Application 61/174,491, entitled "Editing Key-Indexed Graphs in Media Editing Applications", filed Apr. 30, 2009, which is incorporated herein by reference.

CROSS REFERENCE TO RELATED APPLICATIONS

This Application is related to the following applications: U.S. patent application Ser. No. 12/433,886, filed Apr. 30, 2009, now published as U.S. Publication No. 2010-0281366 A1; U.S. patent application Ser. No. 12/475,601, filed May 31, 2009, now published as U.S. Publication No. 2010-0281404 A1; and U.S. patent application Ser. No. 12/475,598, filed May 31, 2009, now published as U.S. Publication No. 2010-0281367.

FIELD OF THE INVENTION

The invention relates to editing key-indexed geometries in media editing applications.

BACKGROUND OF THE INVENTION

To date, many media editing applications have been proposed for editing digital graphic designs, image editing, audio editing, and video editing. These applications provide graphical designers, media artists, and other users with tools for creating and editing media presentations. Examples of such applications include Final Cut Pro® and iMovie®, both sold by Apple Inc.

Several of these media editing applications provide editing tools that allow a user or its users to perform keyframe editing. Typically, keyframe editing entails manipulating keyframes on a line graph in order to create an effect for a media clip such as video clip. Such keyframe manipulation may entail dragging individual keyframes to a desired position, and moving multiple Bezier handles at the keyframes to create a curve on the line graph. As such, the user must not only understand how to manipulate these keyframes and their associated Bezier handles but also possess patience and drawings skills to create the desired effect. Furthermore, if the user wants to create the same effects for another media clip or several other clips, the user must repeat the same keyframe manipulation for each clip.

Therefore, there is a need for a more simplified way of performing keyframe editing. Also, there is a need for a media editing application that allow its users to perform simple to complex keyframe editing with minimal drawing skills and without having to understand how Bezier handles work. There is also need for a media editing application that allows its users to easily recreate keyframe editing operations without having to manipulate keyframes.

SUMMARY OF THE INVENTION

Some embodiments of the invention provide novel methods for editing the value of an attribute of a media item (e.g., a media content or a media operation) for a media editing application. Such attribute of a media item can include scale, rotation, opacity, pan, volume, etc. In some embodiments, a media editing application represents the changing value of such an attribute over a duration (e.g., a duration of time, a duration of frequencies, etc.) as a key-indexed geometry. A user of the media editing application can manipulate these geometries to change the attribute value over a duration. Such geometries may include graphs and shapes. For such applications, some embodiments provide novel methods for modifying and storing key-indexed geometries. For instance, in some such embodiments, the media editing application includes libraries that (i) provide presets (i.e., predefined operations and/or predefined attribute values) for modifying key indices and interpolation between the key indices, and/or (ii) provide storage for storing presets defined by a user of the media editing application.

Some embodiments display the presets as thumbnails, thumbnails with text descriptions, and/or text-defined operations. The media editing application provides in some embodiments user-interface tools for displaying and selecting such graphical and textual representations. One such tool is a preset window that displays the thumbnails and/or text and allows a user of the media editing application to select a particular preset to apply on one or more key-indexed graphs and/or shapes.

In addition, some embodiments allow a user of the media editing application to augment preset libraries by storing a selected part of one key-indexed geometry (i.e., key-indexed graph or key-indexed shape) or parts of multiple different geometries as a user-defined preset. For instance, the user of the media editing application, in some such embodiments, can select multiple different geometries, and store the selected geometries or the key-index operations associated with the selected geometries as one retrievable unit. Once the preset is stored, some embodiments display a selectable thumbnail and/or text representation of the preset that when selected replicates the predefined operations on other key-indexed geometries.

To facilitate such saving operations, some embodiments provide novel techniques for selecting key-indexed geometries. For instance, in some embodiments, the media editing application allows the user to select a part of a graph by directly selecting on a segment of the graph in between two key indices. Alternatively, or conjunctively, some embodiments provide user-interface tools that allow the user to easily select a portion of one geometry or multiple portions of different geometries. In some such embodiments, the user of the media editing application can drag one or more markers along a bar to select portions of multiple different graphs by specifying a range.

Some embodiments provide compressed and uncompressed key-indexed geometries that represent the value of attributes across a duration, which may be a temporal duration, frequency duration, or any other duration of interest for a media editing operation. In some embodiments, the compressed geometric representations that span across a temporal duration, take the form of a timing bar. In some embodiments, a user of the media editing application can manipulate such timing bar in order to select and apply a preset. For instance, in some such embodiments, the media editing application allows the user to select an interior location within the timing bar in order to display a preset widow having several user-selectable representations (e.g., thumbnail and/or text) of different presets. Alternatively, or conjunctively, in some embodiments, the timing bar displays one or more user-selectable tools (e.g., user-interface controls, user-selectable text) that when selected displays such preset window.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
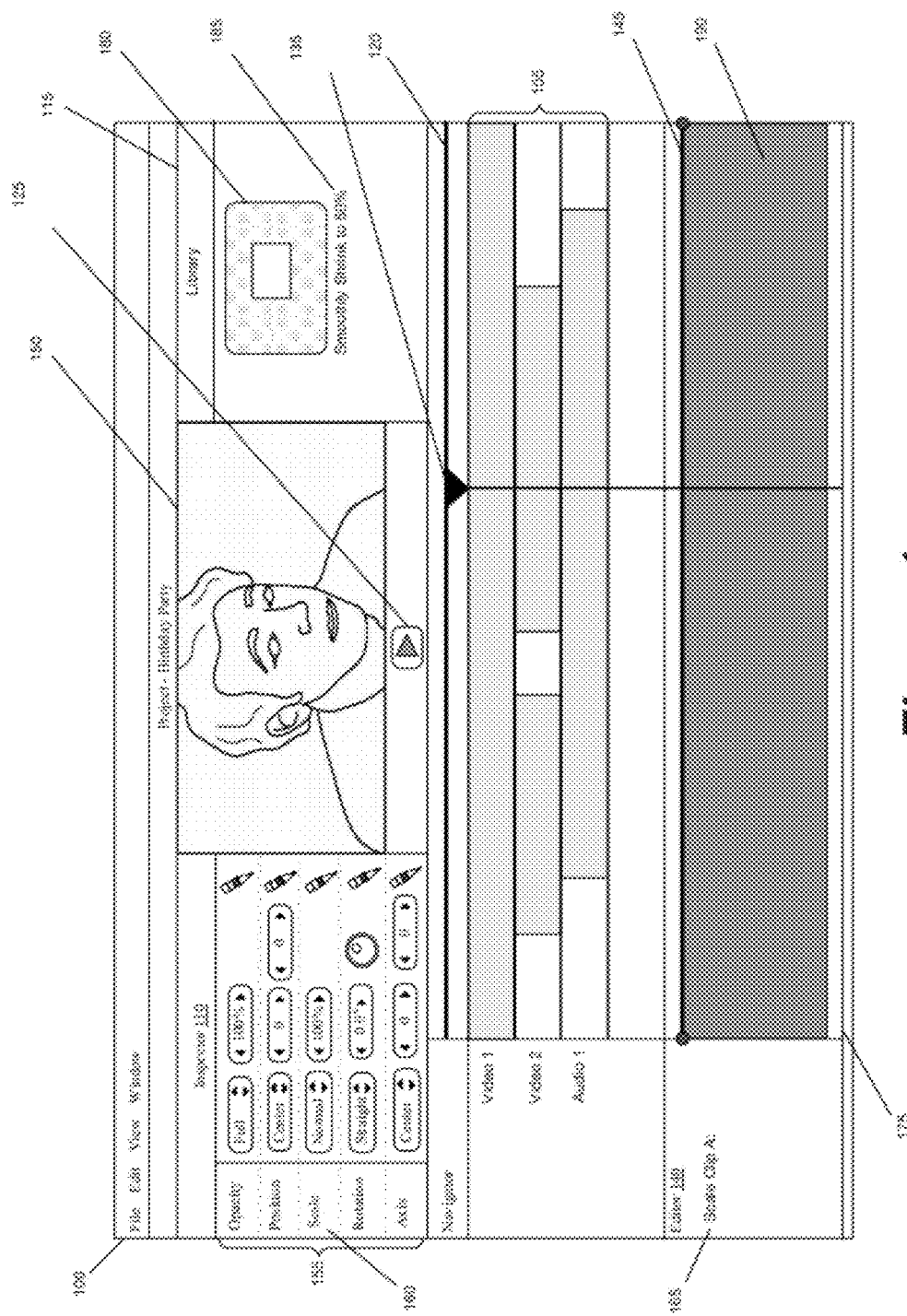
FIG. 1 illustrates a graphical user interface of a video editing application in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for editing the value of an attribute of a media item (e.g., a media content or a media operation) for a media editing application. Such attribute of a media item can include scale, rotation, opacity, pan, volume, etc. In some embodiments, a media editing application represents the changing value of such an attribute over a duration (e.g., a duration of time, a duration of frequencies, etc.) as a key-indexed geometry. A user of the media editing application can manipulate these geometries to change the attribute value over a duration. Such geometries may include graphs and shapes. For such applications, some embodiments provide novel methods for modifying and storing key-indexed geometries. For instance, in some such embodiments, the media editing application includes libraries that (i) provide presets (i.e., predefined operations and/or predefined attribute values) for modifying key indices and interpolation between the key indices, and/or (ii) provide storage for storing presets defined by a user of the media editing application.

Some embodiments display the presets as thumbnails, thumbnails with text descriptions, and/or text-defined operations. The media editing application provides in some embodiments user-interface tools for displaying and selecting such graphical and textual representations. One such tool is a preset window that displays the thumbnails and/or text and allows a user of the media editing application to select a particular preset to apply on one or more key-indexed graphs and/or shapes.

In addition, some embodiments allow a user of the media editing application to augment preset libraries by storing a selected part of one key-indexed geometry (i.e., key-indexed graph or key-indexed shape) or parts of multiple different geometries as a user-defined preset. For instance, the user of the media editing application, in some such embodiments, can select multiple different geometries, and store the selected geometries or the key-index operations associated with the selected geometries as one retrievable unit. Once the preset is stored, some embodiments display a selectable thumbnail and/or text representation of the preset that when selected replicates the predefined operations on other key-indexed geometries.

To facilitate such saving operations, some embodiments provide novel techniques for selecting key-indexed geometries. For instance, in some embodiments, the media editing application allows the user to select a part of a graph by directly selecting on a segment of the graph in between two key indices. Alternatively, or conjunctively, some embodiments provide user-interface tools that allow the user to easily select a portion of one geometry or multiple portions of different geometries. In some such embodiments, the user of the media editing application can drag one or more markers along a bar to select portions of multiple different graphs by specifying a range.

Some embodiments provide compressed and uncompressed key-indexed geometries that represent the value of attributes across a duration, which may be a temporal duration, frequency duration, or any other duration of interest for a media editing operation. In some embodiments, the compressed geometric representations that span across a temporal duration, take the form of a timing bar. In some embodiments, a user of the media editing application can manipulate such timing bar in order to select and apply a preset. For instance, in some such embodiments, the media editing application allows the user to select an interior location within the timing bar in order to display a preset widow having several user-selectable representations (e.g., thumbnail and/or text) of different presets. Alternatively, or conjunctively, in some embodiments, the timing bar displays one or more user-selectable tools (e.g., user-interface controls, user-selectable text) that when selected displays such preset window.

Several examples of such embodiments will be described in the sections. However, before describing these examples, several terms are defined in Section I. Also, an exemplary media editing application that implements preset library operations of some embodiments will be described below in Section II. Furthermore, several other embodiments are described below by references to Sections III-V. These embodiments relate to compressing key-indexed geometries into compressed representations on which key-index operations and/or interpolation operations can be performed. Understanding of some of these embodiments described in sections III-V will facilitate the understanding of some of the embodiments described below in sections VI-IX that may use such collapsed representation to perform preset operations and preset storage operations. Lastly, section X describes a computer system with which some embodiments of the invention are implemented.

I. Definitions

In some media editing applications, a key index represents a value (e.g., a default value or a user-specified value) of an attribute of a media content (e.g., a clip) or a media operation at a particular location in a particular duration. For example, in a fade to black operation, a starting key index might represent one point in time when an opacity attribute starts to change from fully visible to fully transparent, and an ending key index represents another transitional point in time when the change ends.

Some embodiments use such key indices to define geometries such as graphs and/or shapes that specify the transitioning values of any attribute associated with the edited media content (e.g., media clips) or the editing operations. Different types of media content may have different attributes. For instance, attributes of a video clip may include opacity, axis, color, and scale, while attributes of an audio clip may include volume level, echo, and pan.

Also, attributes of editing operations may include filters. Filters, in some embodiments, are media editing components that may be associated with a piece of media content to create an effect. For instance, a color correction filter may be applied to a video clip, in order to adjust the color of the video clip. Similarly, a twirl filter creates a twirling effect on the video clip, a blur filter creates a blurring effect on the video clip, etc. An audio clip may also be associated with filters, such as an echo filter that creates an echo, noise reduction filter that reduces noise, pass band filter that allows a range of frequencies to pass through while preventing other frequencies, etc.

Moreover, the duration across which the attributes are defined may differ. They may differ in length or in type (e.g., the duration might be expressed in time, or in frequency, or along a different axis).

In some embodiments, the media editing application provides a timing bar that represents the changing value of the attribute over the duration. For instance, in some such embodiments, the timing bar in a compressed form represents key-indexed graph and/or its associated key-indexed shape, which specify the changing value of attributes along a timeline. One of ordinary skill will realize that such compressed timing bar can be used in embodiments that only use key-indexed graphs or key-indexed shapes to specify the changing values of attributes.

II. Media Editing Application

FIG. 1 illustrates a graphical user interface ("GUI") 100 of a video editing application that uses the novel preset library operations of some embodiments of the invention. As shown in these figures, the GUI 100 includes a preview display area 150, a composite display area 105, an attribute display area 110, a timeline 120, a geometry editor 140 with a geometry editing window 175, and a preset display area 115.

The preview display area 150 displays the preview of the media presentation that the media editing application creates. The composite display area 105 provides a visual representation of the composite presentation being created by the application's user. It displays one or more geometric shapes that represent one or more pieces of media content that are a part of the media presentation. In the example illustrated in FIG. 1, the composite display area 105 is an area that includes multiple media tracks that span across the timeline 120. One or more pieces of media content can be placed on each track.

The attribute display area 110 is an area in the GUI 100 through which the application's user can view attributes of media content in the media presentation, or media editing operations for the media presentation. The user can select one or more attributes in this area 110. For some or all attributes, such a selection will cause one ore more editable geometries) (i.e., graphs, shapes) to be presented in the geometry editing window 175 in order to allow the user to view and possibly edit the geometry. The attribute display area 110 also provides various user interface tools 155 (e.g., list boxes, text fields, buttons, radial dials, etc.) for modifying the attributes.

The timeline 120 represents a duration or a portion of the duration in the media presentation. A time marker (also called a playhead) 135 is situated on the timeline 120. The user of the media editing application can drag the time marker along the timeline to display a preview of the media presentation at a particular point in the presentation, or to play the preview starting from the particular point by selecting the play button 125.

The preset display area 115 is an area in the GUI 100 through which the user can view one or more presets stored in preset libraries. For instance, in FIG. 1, the preset display area 115 displays a thumbnail 180 and text 185 that represent a preset stored in a preset library. The user of the media can select the thumbnail 180 and/or text 185 in order to replicate the preset operations on any number of different key-indexed geometries.

The geometry editor 140 is the area in the application that displays the geometry editing window 175. This window 175 displays one or more key-indexed geometries (e.g., graphs, shapes) that can be modified by a user according to one or more of the editing operations described below. In the example illustrated in FIG. 1, the window 175 displays the graph 145 and shape 190 that are associated with a scale attribute of the media content over a particular duration of the media presentation. The geometry editor shows this association by (i) displaying a description 165 of the attribute and (ii) displaying the key-indexed graph 145 and shape 190 over a particular duration in the timeline 120.

In the example illustrated in FIG. 1, the key-indexed graph 145 and shape 190 is provided in a separate window 175 that is dedicated for displaying such graphs and shape in the media editing application. However, in some embodiments, one or more such graphs may be provided in another window in the media editing application. For instance, in some such embodiments, one or more such graphs may be shown in the composite display area 105 with the clip representations (e.g., on top of, adjacent to, the clip representations).

III. Timing Bar Overview

For a media editing application, some embodiments of the invention provide novel methods for editing the value of an attribute of a media content or a media operation. Some media editing applications represent the changing value of such an attribute over a duration (e.g., a duration of time, a duration of frequencies, etc.) as a key-indexed geometry. Such geometries may include graphs, graph shapes, or bars. For such applications, some embodiments provide novel compressed or collapsed views of one or more key-indexed graphs or shapes. For instance, some embodiments provide single-attribute timing bars, multi-attribute timing bars, and/or global timing bars on which a user can perform key-index edit operations for one or more attributes. Other embodiments provide a novel method for manipulating the value of one or more attribute directly in a display area that is used to view the media content in the media editing application.

FIGS. 2-9 illustrate examples of compressed timing bars of the media editing application of some embodiments of the invention. The many embodiments that will be described will refer to key-indexed graphs and their associated shapes as well as collapsed timing bar representations of those graphs and shapes. These terms represent different types of key-indexed geometries. The geometries represent the values of attributes across a duration, which may be a temporal duration, frequency duration, or any other duration of interest for a media editing application. Although compressed representations of the geometries will be referred to as timing bars, they can also be frequency bars for a frequency duration.

In the following examples, the timing bars are compressed representations of key-indexed graphs and their associated key-indexed shapes, which specify the changing values of attributes along a timeline. One of ordinary skill will realize, however, that such compressed timing bars can be used in embodiments that only used key-indexed graphs or key-indexed shapes to specify the changing values of attributes. For purposes of simplifying the description of these figures, only the geometry editing window of the media editing application is shown in these figures. An example of a graphic user-interface ("GUI") of a media editing application of some embodiments is described above by reference to FIG. 1.

Figure 2:
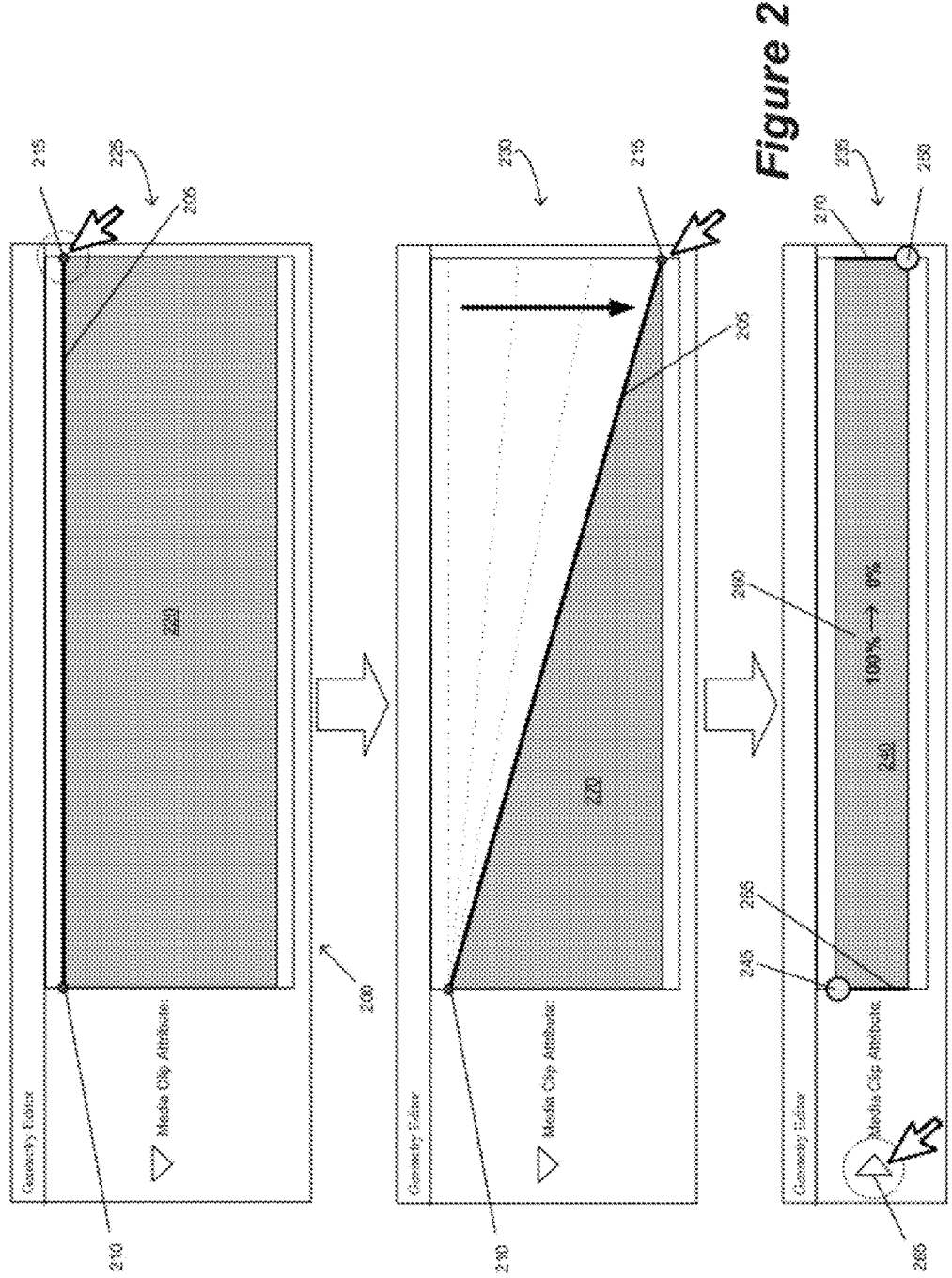
FIG. 2 illustrates a key-indexed graph and a collapsed representation of the key-indexed graph in some embodiments.

FIG. 2 illustrates a key-indexed graph 205 being collapsed into a timing bar representation. Specifically, FIG. 2 illustrates a geometry editing window 200 at three different stages, a first stage 225 displaying a key-indexed graph, a second stage 230 where one of the key-indices of the graph is manipulated, and a third stage 235 illustrating a timing bar as the collapsed version of the key-indexed graph.

In the first stage 225, a key-indexed graph 205 is initially shown in the key-index geometry editing window 200. This graph 205 represents the value of an attribute (e.g., opacity, position, volume level) of a media clip (e.g., audio clip, video clip, text overlay, picture, and/or other media) over a duration of time. Initially, the graph 205 is a horizontal line that represents a constant attribute value. This graph also defines a rectangular shape 220 within the window 200 of the media editing application; in other words, the key-indexed shape 220 is initially defined underneath the graph 205. Also, in this example, a timeline (not shown) spans across the window 200. One or more media tracks (not shown) also span along this timeline in a composite display area of the media editing application. Each track is for holding one or more media clips, with each clip lasting a particular duration. Each media clip can have several attributes, one of which is represented by the key-indexed graph 205 in this first stage 225.

As shown in the second stage 230 of FIG. 2, the value of the attribute at the second key index 215 is changed to a zero value thus changing the slope of the graph 205. The graph 205 in the second stage 230 now defines a triangular shape 270. This shape is an example of one editable shape in some embodiments of the media editing application.

The third stage 235 illustrates selection of a user control 265 which presents the user with a modified view of the key-indexed graph 205 and the shape 270 it defines. Specifically, the selection of the user control 265 causes the key-indexed graph 205 to collapse into a compressed timing bar 240. This timing bar represents the key-indexed graph 205 in a collapsed form. Some embodiments provide a user selectable control 265 to expand and collapse the view of a key-indexed graph while others may accomplish the same with different user commands (e.g., a click or double-click selection of the attribute label or a key-board shortcut).

The timing bar 240 displays each key index 210 and 215 as selectable key indices 245 and 250 on respective key index markers 265 and 270. The vertical position of each key index 245 and 250 along the key index markers 265 and 270 conveys the value of the attribute. Here, the first key index 245 is located towards the top of the timing bar representing the attribute value at its maximum, while the second key index 250 is located at the bottom of the timing bar representing the attribute value at its minimum. As shown in the third stage 235 of FIG. 2, some embodiments display the change in value of the attribute in a text label 260 that is displayed within the timing bar.

To display attribute values in the compressed timing bar format, some embodiments do not use both the text description 260 and the vertical position of the key indices 245 and 250 on the timing bar, and instead only use one of these approaches. Still other embodiments use other techniques in conjunction with one or both of these techniques.

Figure 3:
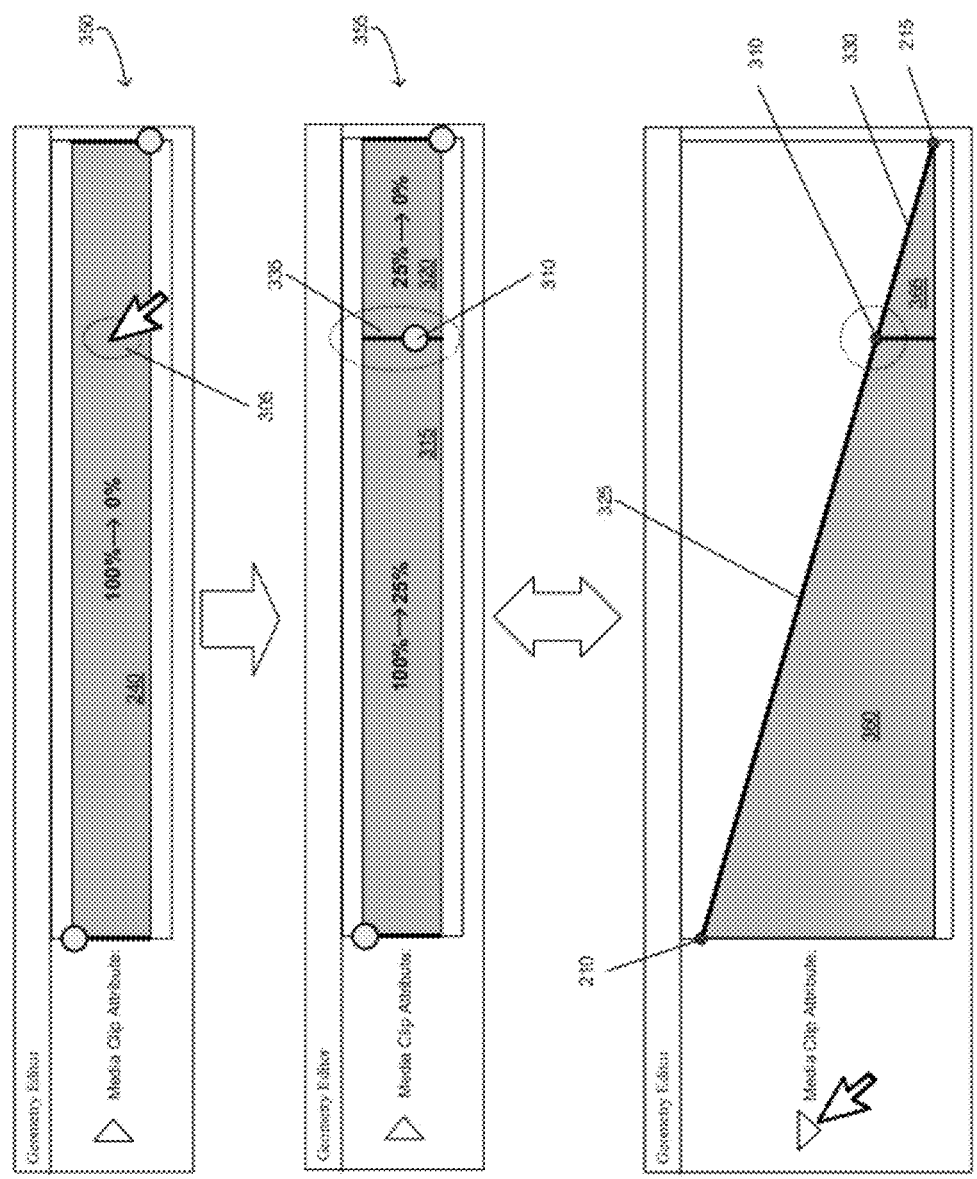
FIG. 3 illustrates an example of creating a new key index for an attribute on a timing bar in some embodiments.

FIG. 3 illustrates an example of creating a new key index for the graph 205 on the timing bar 240. Specifically, FIG. 3 illustrates the geometry editing window at two different stages, a first stage 350 where an interior location for creating a key index is selected and a second stage 355 where a key index has been created on the timing bar. The timing bar 240 at the first stage 350 illustrates the cursor selection (e.g., a double click operation within) of an interior location 305 within the timing bar 240. The second stage 355 illustrates the creation of a new key index 310 that divides the timing bar into two new portions or segments 315 and 320. Specifically, this cursor selection creates the new key index 310 about the horizontal location 305 of the cursor. The new key index 310 defines a new graph segment 325 along with the key index 210 and a new graph segment 330 along with the key index 215.

The media editing applications of different embodiments treat differently the division of the graph 205 into the two graph segments 325 and 330. For instance, some embodiments discard the graph 205 and only use the two graph segments 325 and 330 and/or their associated shapes 360 and 365 as selectable elements in the graphical user interface of the media editing application. Other embodiments, however, use the new graph segments 325 and 330 and/or associated shapes 360 and 365 as conceptual, pictorial representations of the division of the graph 205 and the shape 270; in other words, these embodiments maintain the graph 205 and shape 270 as the selectable element in the GUI, and use the new key index 310 for placing bounds on the modifications that are received directly or indirectly with respect to the graph 205 and the shape 270.

When a key index is created on a collapsed timing bar, some embodiments create and display on the timing bar 1) a key index marker and 2) a moveable key index on the key index marker. In some embodiments, a key index marker is represented as a vertical line that spans the timing bar. This line identifies the horizontal location of the key index along the timeline. A key index marker, or the key index displayed on the marker, can be selected and moved horizontally along the timing bar to modify the position of the key index along the timeline. As discussed above, the attribute value at that particular location is identified by the vertical position of a key index along the key index marker. This key index is selectable and can slide up or down along the key index marker to affect the attribute value at that particular position on the timeline. One example of such a key index and key index marker combination is illustrated in FIG. 3. For instance, in the second stage 355 of FIG. 3, the selection of the interior location 305 of the timing bar 250 causes a line 335 (i.e. key index marker) and the key index 310 to appear on the timing bar. This key index marker 335 can be viewed as dividing the timing bar 240 into two distinct segments 315 and 320. Alternatively, the marker 335 and its associated key index 310 can simply be viewed as only a selectable control within the shape. Irrespective of its characterization, the next two figures, FIGS. 4-5, will illustrate the use of the key index marker and its associated key index for modifying attribute value and location of a particular key index.

Figure 4:
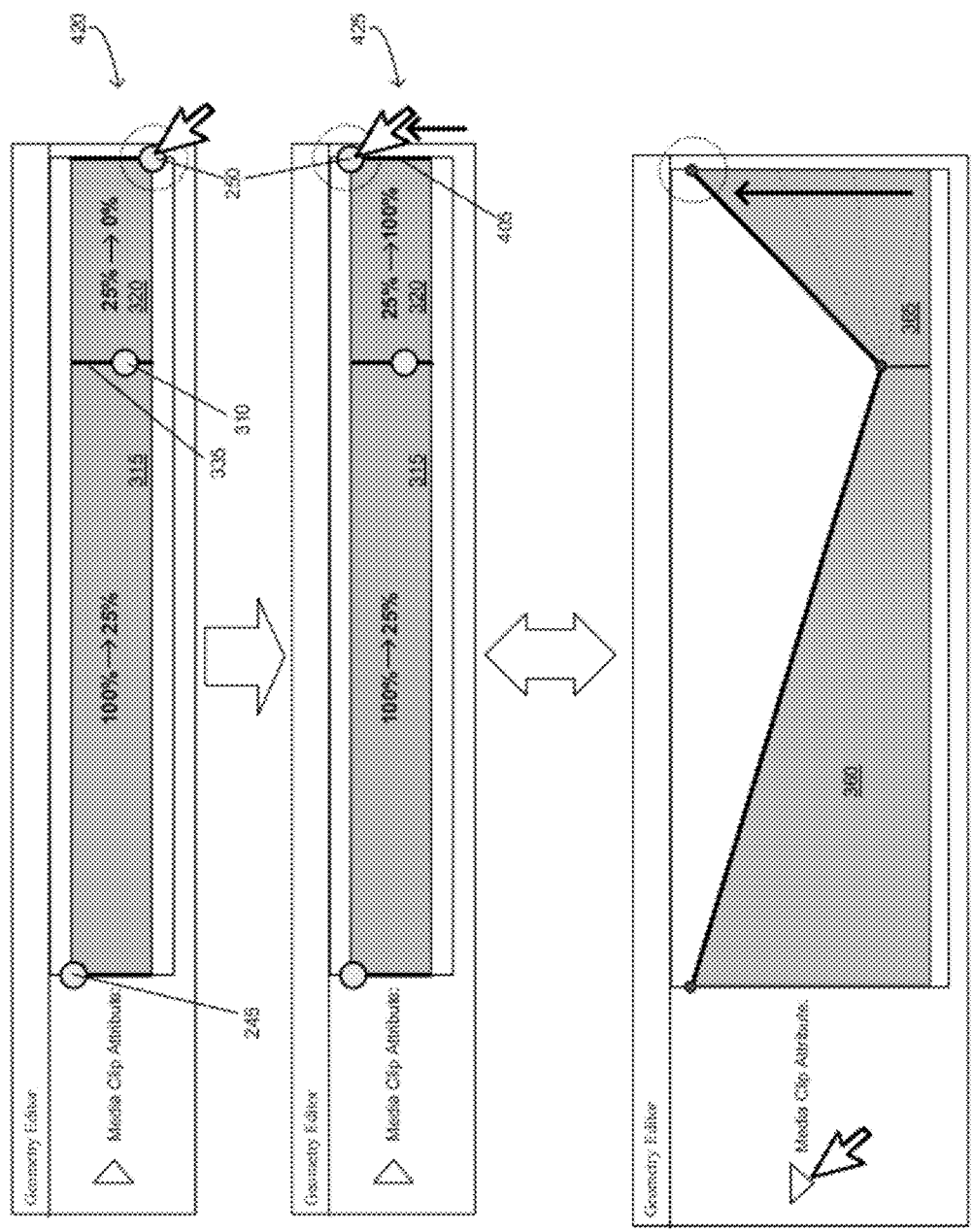
FIG. 4 illustrates an example of modifying the value of an attribute at a particular key index on a timing bar in some embodiments.

FIG. 4 continues from FIG. 3 and illustrates an example of modifying the attribute value of a key index from a timing bar. Specifically, FIG. 4 illustrates modifying the attribute value of a key index at two stages, a first stage 420 where a key index 250 is selected, and a second stage 425 where the attribute value of the key index 250 is modified. As illustrated, three key indices 245, 310, and 250 from FIG. 3 are defined on the timing bar. In the first stage 420, the vertical position of the three key indices 245, 310, and 250 on their respective key index markers convey their values of 100%, 25%, and 0%. Here, the cursor selection of the key index 250 is illustrated at the first stage 420.

Figure 5:
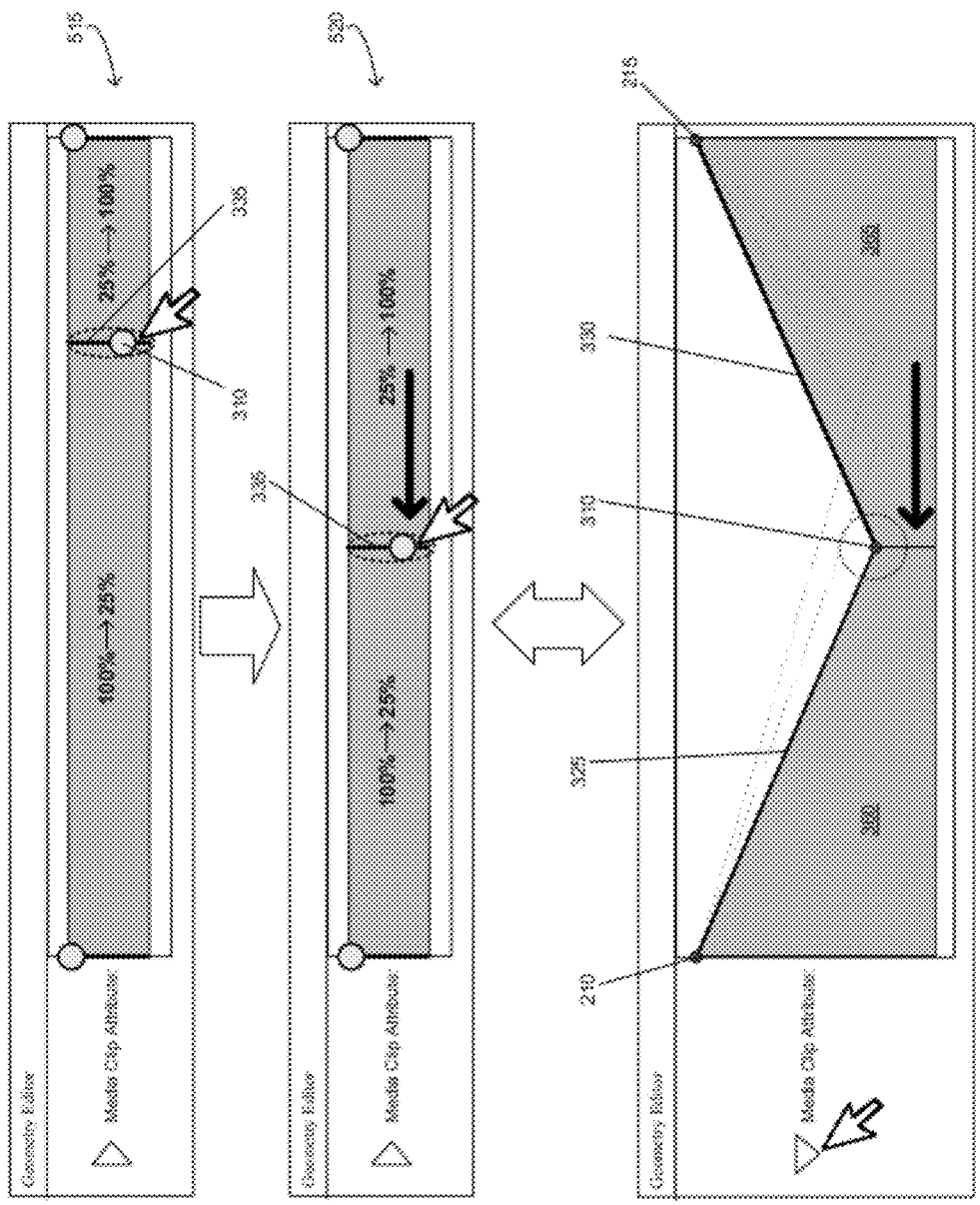
FIG. 5 illustrates an example of relocating a key index on a timing bar in some embodiments.

The second stage 425 then illustrates sliding the key index 250 in an upward direction along the key index marker 405 to affect the attribute value at that location. Specifically, the attribute value is changed from 0% to its maximum, 100%. The change in attribute value is reflected by the change in segment shape 365 which is illustrated in the uncollapsed view of the key-indexed graph in FIG. 4. As illustrated in FIG. 5, both shapes 360 and 365 can further be modified by relocating the key index 310 and its associated key index marker 335 to a different position along the timelines.

FIG. 5 illustrates an example of relocating the key index 310 with its associated key index marker 335 to a new location on the graph 205. Specifically, FIG. 5 illustrates the geometry editing window at two stages 515 and 520. The first stage 515 illustrates the cursor selection of the key index marker 335 along with key index 310. The selection can be accomplished by selecting either the key index marker 335 or the key index 310 itself. The second stage 520 illustrates moving the marker 335 and key index 310 (e.g., a cursor click and drag operation) along a horizontal direction. The movement also redefines the graphs segments 325 and 330, as it reduces the distance between the key indices 210 and 310 while distancing the key indices 310 and 215. In other words, the horizontal movement causes the transitional period between the key indices 310 and 215 to increase while causing the transitional period between the key indices 210 and 310 to decrease. The attribute value at each key index 210 and 310 remains the same and thus affects the slope of each graph segment 325 and 330 as well as the shapes defined by each 360 and 365. This operation maintains the attribute value at the key index whereas the operation described in FIG. 4 illustrated changing the attribute value by sliding key index 250 vertically along the key index marker 335. To avoid accidental modification of both attribute value and location when selecting a key index, some embodiments provide a controlled selection (e.g., keyboard and cursor selection) of the key index for modification of only the attribute value or the location of the key index.

The previous figures have described operations on a timing bar for creating a key index, modifying the attribute value at a key index, and relocating the position of the key index. Other embodiments also provide a mechanism for directly modifying the interpolation between two key indices without modifying the key index value or location using a timing bar. One such example is illustrated in FIG. 6.

Figure 6:
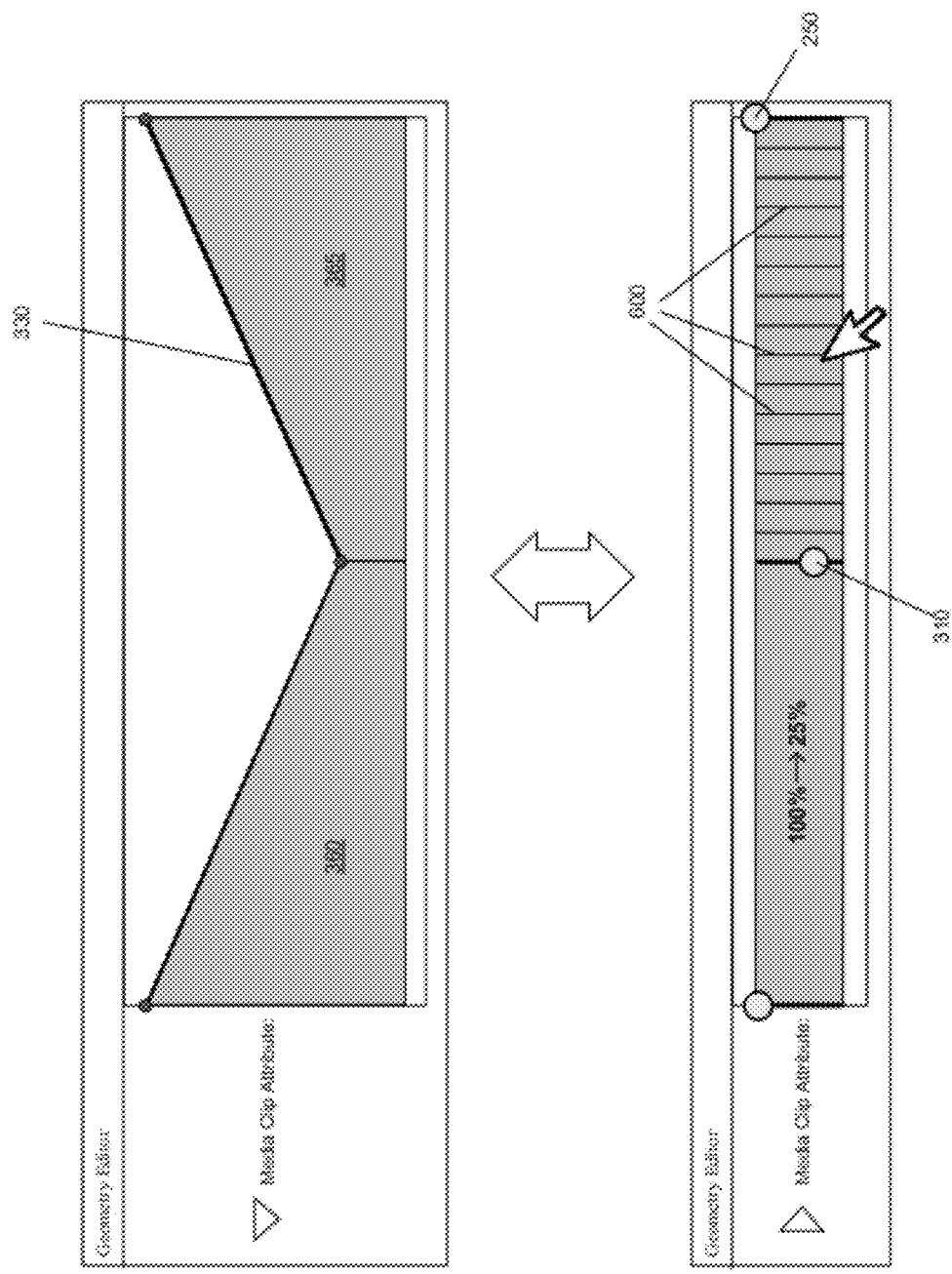
FIG. 6 illustrates an example of interpolation marks on a timing bar in some embodiments.

FIG. 6 shows several editable interpolation marks 600 on a collapsed representation of the key-indexed graph of FIG. 5. The interpolation marks 600 span a segment within the timing bar which, in this example, is a segment defined by key indices 310 and 250. The space between each interpolation mark conveys the speed or ease at which the attribute value changes over the duration of the segment. In this example, the interpolation marks 600 are evenly spaced and thus represent a linear change in attribute value as shown by the key-indexed graph 330.

Figure 7:
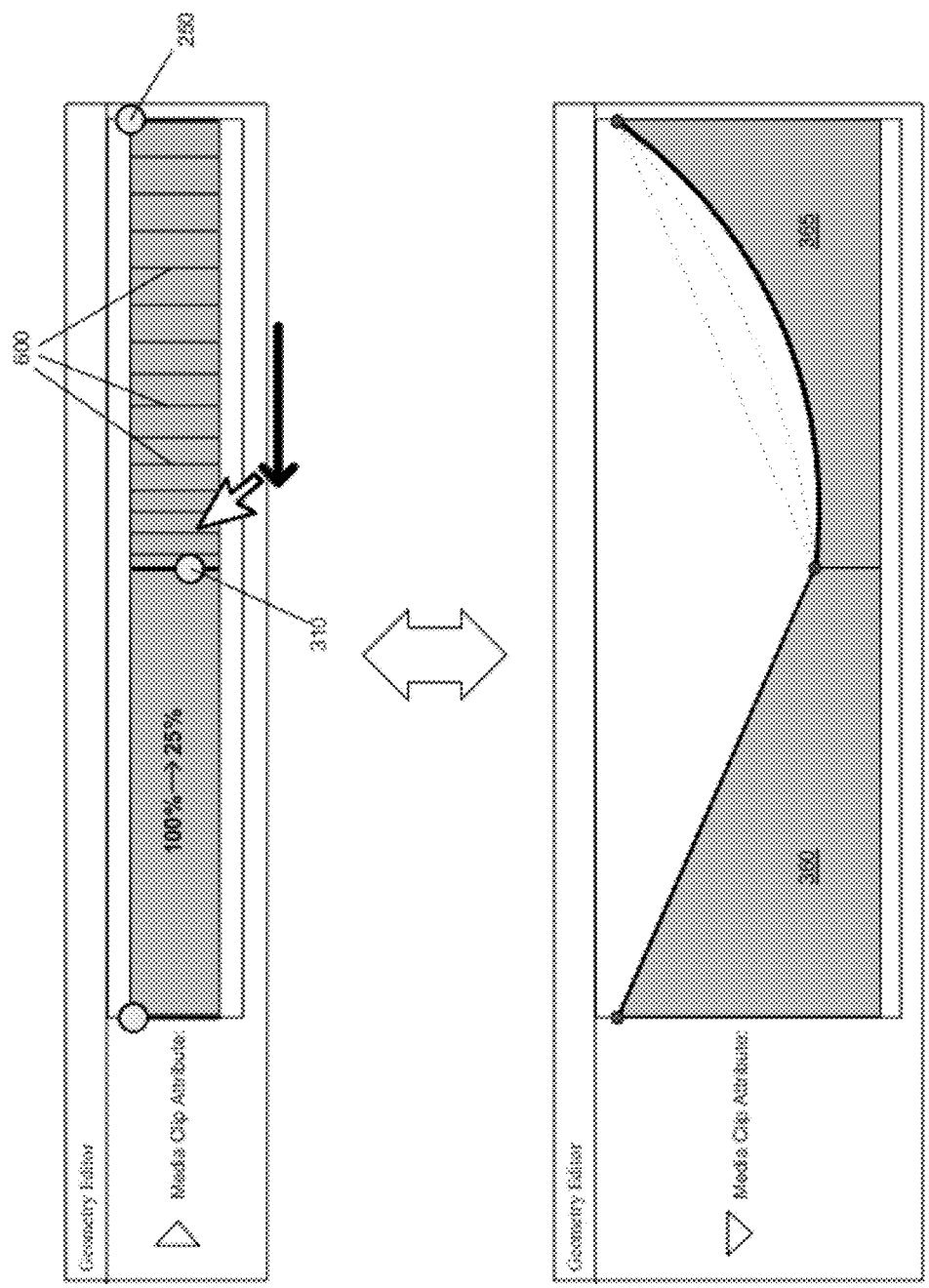
FIG. 7 illustrates an example of editing the interpolation between two key indices by manipulating interpolation marks on a timing bar in some embodiments.

As illustrated in FIG. 7, the interpolation marks 600 can be selected at any point within the segment and modified to affect the interpolation between two key indices. Here, a click and drag operation from the center of the segment modifies the interpolation marks by squeezing them closer together towards the first key index 310. In some embodiments a shorter distance between each interpolation mark indicates a faster transition while other embodiments might interpret a shorter distance to be a slower transition. In this particular example, a shorter distance represents a slower transition as illustrated by the modified shape 365 between key indices 310 and 250. This interpolation mark mechanism provides a user with a simple method to directly modify the interpolation between key indices. This mechanism can also be invoked in various ways including a user interface item, keyboard shortcut, or drop down menu.

All the examples described above have modified a key-indexed graph using a collapsed representation of the graph. In order to get visual feedback of how each modification has affected the corresponding key-indexed graph, the timing bar would have to be uncollapsed into its full key-indexed graph form. However, some embodiments allow viewing of the modified key-indexed graph without uncollapsing the timing bar into a full key-indexed graph. This is accomplished by providing a zoom tool that displays a portion of the graph being modified in a separate window. Such an example of a zoom tool is illustrated in FIG. 8.

Figure 8:
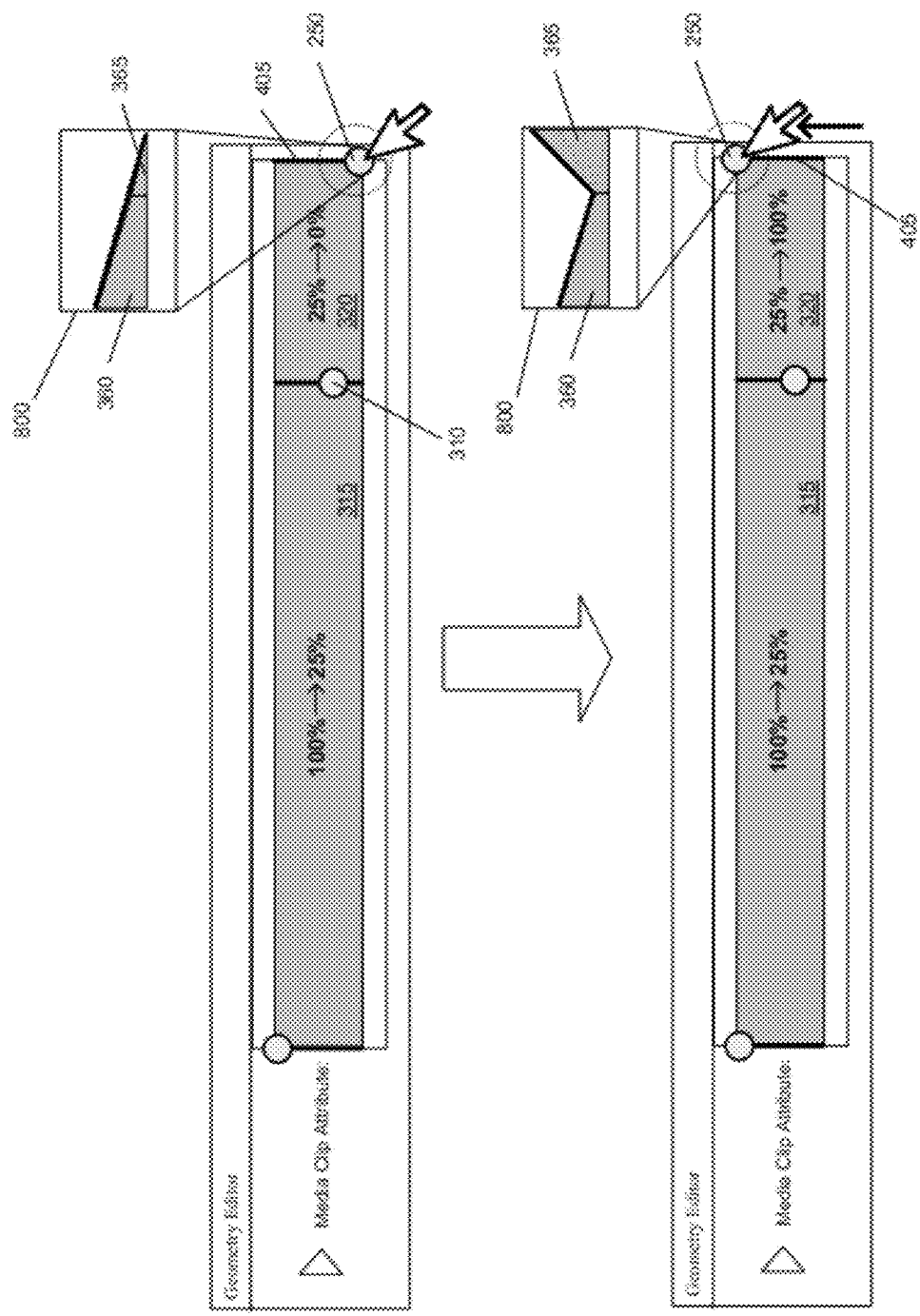
FIG. 8 illustrates an example of a zoom tool for displaying a portion of the key-indexed graph when editing a timing bar in some embodiments.

FIG. 8 shows the same timing bar and the same modification of attribute value using key index 250 as shown in FIG. 4. In this figure, as the attribute value is being modified using key index 250 (i.e. by sliding key index 250 along the key index marker 405) a window 800 is displayed. This window 800 initially shows a portion of the key indexed graph and shapes 360 and 365. As the graph is being modified from the timing bar, the effect of the modification on its corresponding key-indexed graph is concurrently displayed in the zoom window 800. Therefore this window alleviates the need to uncollapse the timing bar to view a modified key-indexed graph.

Figure 9:
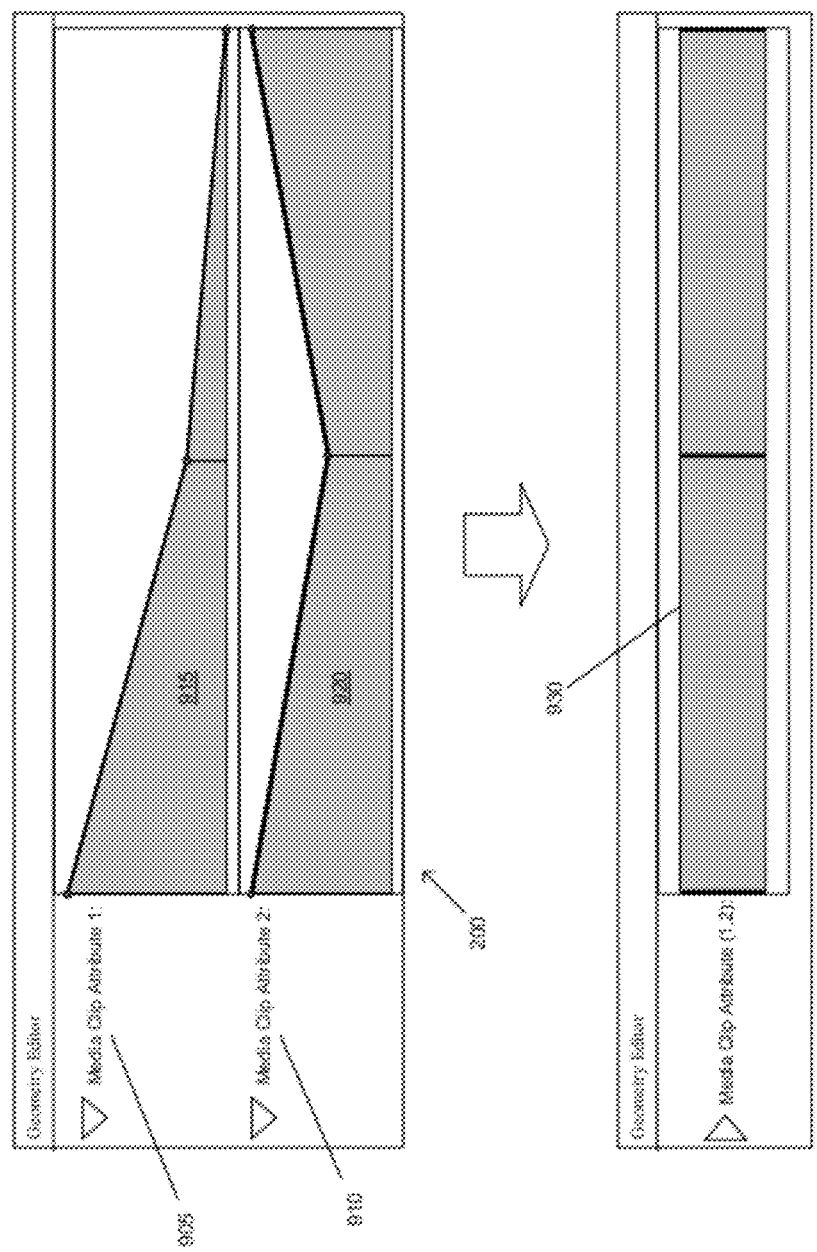
FIG. 9 illustrates an example of a multi-attribute timing bar for representing two or more attribute of media content in some embodiments.

FIGS. 2-8 above illustrate examples where the compressed timing bar represents one key-indexed graph or shape in a collapsed mode. However, as mentioned above, some embodiments use a single collapsed timing bar to represent multiple attributes rather than individual key-indexed graphs or shapes for each attribute. FIG. 9 shows one such example.

FIG. 9 illustrates a timing bar for representing two or more attributes of a media clip. Specifically, FIG. 9 first shows two media clip attributes 905 and 910 in the geometry editing window 200. Both attributes 905 and 910 are displayed in an expanded view where shapes 915 and 920 represent the key-indexed graphs. The editor window 200 is then shown with both graphs combined into a single multi-attribute timing bar 930 where a user can perform editing operations to affect both attributes simultaneously. Such operations can include one or more of the operations discussed above such as creating new key indices, relocating key indices, and affecting attribute values at a specific key index.

The multi-attribute timing bar described in FIG. 9 is also equivalent to a third timing bar variation, specifically, a global timing bar. A global timing bar is tied to the geometry editing window and is a collective representation of all the attributes that currently reside in the geometry editor. These timing bar variations will be discussed in further detail in the following sections.

As described above, some embodiments allow a user to manipulate key indices and attribute values without interacting with the key-indexed line or shape graph. Other embodiments also allow manipulation of the transition, or interpolation, between two key indices directly from the timing bar. Furthermore, a timing bar can represent one or more attributes of a media clip. For instance, some embodiment provide a single attribute timing bar for representing one attribute while other embodiments provide a multi-attribute timing bar for representing two or more attributes of a media clip. In addition, some embodiments also provide a global timing bar for representing all attributes that a user is actively editing in a geometry editing window of a media editing application. Some embodiments provide the timing bars as selectable and modifiable items in the graphical user interface ("GUI") of the media editing application (i.e., as items that can be selected and modified by the user in the GUI).

IV. Timing Bars Variations

Figure 10:
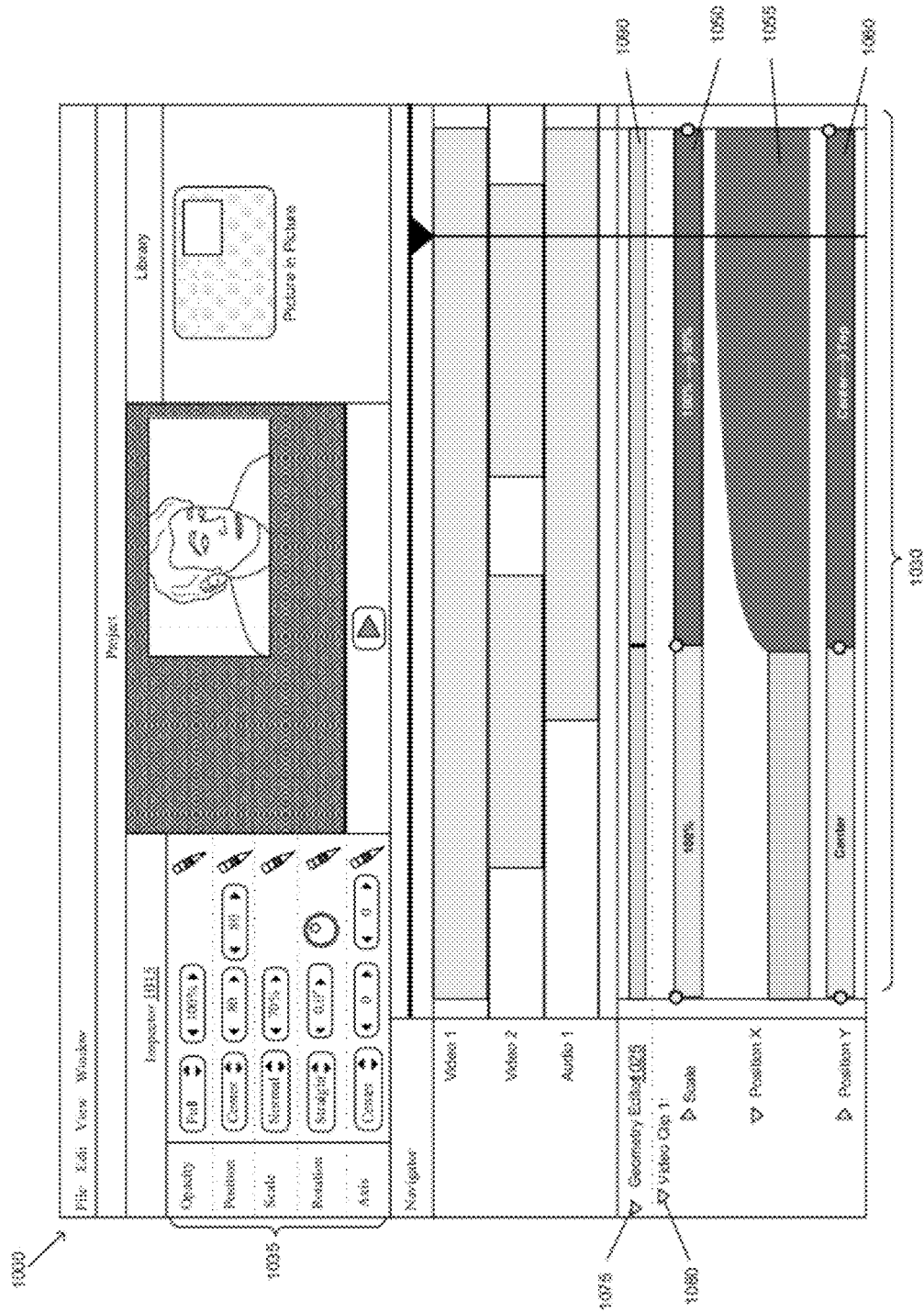
FIG. 10 illustrates a geometry editor displaying two types of timing bars.

FIG. 10 illustrates a geometry editor 1025 displaying two types of timing bars, specifically a single-attribute timing bar and a global timing bar. As shown, a graphical user interface 1000 of a media editing application includes a geometry editor 1025. In this example, the geometry editor 1025 has two attributes represented through single attribute timing bars 1050 and 1060 while another attribute is represented by a key-indexed graph and the shape it defines 1055. As previously illustrated in FIG. 2, a single attribute timing bar representation is displayed when a key-indexed graph is collapsed, for example by using a user control 1065 or a double click operation.

A second type of timing bar, a multi-attribute timing bar, similar to the one described in FIG. 9 may also be displayed in the geometry editing window 1030. A multi-attribute timing bar represents two or more attributes that a user wishes to group together within the geometry editing window 1030. A user can perform edit operations on a multi-attribute timing bar that simultaneously affects all the attributes associated with the multi-attribute timing bar in the same fashion. For example, selection of the user control 1075 would collapse all the attributes being edited for video clip 1 1080 in the geometry editing window into a single multi-attribute timing bar to represent all the attributes that were being edited for video clip 1 1080. In other embodiments, a multi-attribute timing bar may also be created by a user grouping two or more attributes together for editing. For example, attributes for a clip's position in the x-direction and y-direction may be combined in a multi-attribute timing bar for performing the same editing operations so the user can avoid having to perform repetitive operations for multiple attributes.

Furthermore, a third type of timing bar, a global timing bar 1090, is illustrated in FIG. 10. The global timing bar 1090 is tied to the geometry editing window 1030 and is a timing bar that collectively represents each attribute that is displayed in the geometry editing window. In some embodiments, the global timing bar is always present at the top of the geometry editing window and by default, represents every attribute and their respective key indices that are currently displayed in the geometry editing window 1030. Other embodiments allow user selection of which attributes to associate with the global timing bar.

The global timing bar and multi-attribute timing bar are similar, but a multi-attribute timing bar is defined by one or more attributes that a user wishes to group together rather than a default representation of all attributes in a geometry editing window. Furthermore, a global timing bar can be equivalent to a single-attribute timing bar when only one attribute is associated with the global timing bar or if only one attribute is actively being edited in the geometry editing window. Several more detailed examples of how each type of timing bar may be used to manipulate key-indexed graphs will be described in the following sections.

V. Key-Index Editing with Timing Bars

As mentioned above, some embodiments provide several novel methods for editing the value of an attribute of a media content or a media operation. Some media editing application represent the changing value of such an attribute over a duration (e.g., a duration of time, duration of frequencies) as a key-indexed geometry. Such geometries may include graphs, graph shapes, or bars which are displayed in a geometry editing window of the media editing application. For such applications, some embodiment provide novel compressed or collapsed views of one or more key-indexed graphs or shapes, namely timing bars and different variations of timing bars.

A user of the application populates the geometry editing window with attribute geometries through selection of a piece of content and identifying one or more attributes of the content for editing. This can be accomplished in various ways such as a drag and drop operation from an attribute display window which displays all the modifiable attributes of a selected content, context menus, drop-down menus, or automatic population of all modifiable attributes when a media content is selected. These are only some examples of populating the geometry editor with attribute geometries of a media clip and it would be clear to one skilled in the art that the same can be accomplished through other different methods.

Several different examples of operations for modifying the value of one or more attributes over a duration using collapsed timing bar representations of the attributes' key-indexed graphs will be described below. In some cases, these different operations may be used conjunctively (i.e., all together) in one application, while in other cases, some of the operations may be alternatives to one another. When these operations are used conjunctively in one application, some embodiments allow a user to differentiate one operation from another operation by providing user interface tools, user interface techniques, and/or shortcuts (e.g., through the use of hot-keys). This will be further elaborated in the examples described below. Several examples of manipulating the different types of timing bars will now be described by reference to FIGS. 11-36.

A. Creating Key Indices

FIGS. 11-16 illustrate several examples of creating new key indices for one or more attributes of media content using timing bars. Specifically, these figures illustrate creating new key-indices across one or more attributes by selecting an interior location of a timing bar. Different types of timing bars including a single attribute timing bar, a global timing bar, and a multi-attribute timing bar are illustrated in these figures. For purposes of simplifying the description of these figures, only the geometry editor 1100 of the media editing application is shown.

Figure 11:
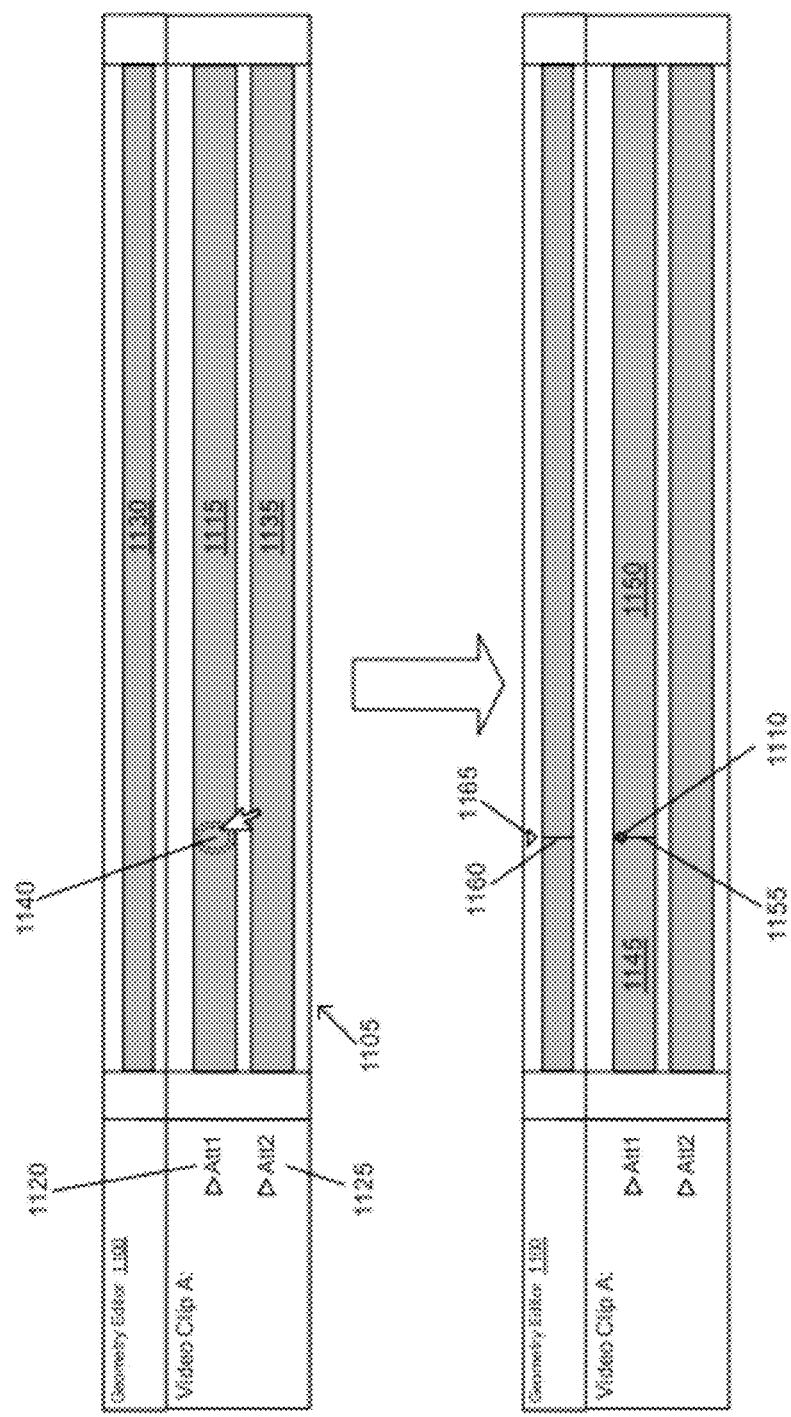
FIG. 11 illustrates an example of creating a new key index on a single attribute timing bar in some embodiments.

FIG. 11 illustrates an example of creating a new key index for an attribute from a timing bar. Specifically, FIG. 11 illustrates a geometry editor 1100 where a new key index 1110 is created for a single attribute 1120 using a single-attribute timing bar 1115. FIG. 11 shows a geometry editing window 1105, two attributes 1120 and 1125 of a particular media clip, two collapsed timing bars 1115 and 1135 for representing the two attributes, and a global timing bar 1130. The two timing bars, 1115 and 1135, are each associated with a corresponding single attribute, Att1 1120 and Att2 1125, of a media clip over the duration of a particular media clip. The global timing bar 1130 is for displaying a collective representation of all attributes displayed in the geometry editing window 1105. From the following examples it will become clear that all editing operation for one or more attributes can be accomplished directly from a global timing bar, whereas more complex editing might require the use of the geometry editor for manipulating key-indexed graphs and shapes individually.

When multiple attributes are being represented by the global timing bar, the global timing bar can display the location of one or more key indices by segmenting the global timing bar. Further information such as the existence of shared key indices or attribute values at the key indices can also be conveyed. Some embodiments display icons that represent globally shared versus non-shared key indices. Such information can be conveyed to the user through use of icons in or above the global timing bar as well as the use of different icon colors to represent different key indices for different attributes. These are just some examples of information that may be conveyed by a global timing bar, and it will be clear to one skilled in the art that the use of icons and colors can be used in a variety of ways to display different information that may be useful when performing edit operation on a key-indexed graphs, shapes, and/or timing bars.

FIG. 11 illustrates creating a new key index 1110 for a single attribute 1120 using a single-attribute timing bar 1115. Similar to the example described in FIG. 3, this figure illustrates performing a cursor selection (e.g., a double click operation within) of an interior location 1140 of the timing bar 1115. It further illustrates that this selection causes the timing bar to divide into two portions (i.e., segments 1145 and 1150) about the horizontal location of the cursor. As mentioned above, the media editing applications of different embodiments treat differently the division of the timing bar 1115 into the two bar segments 1145 and 1150. For instance, some embodiments discard the timing bar 1115 and only use the segments 1145 and 1150 as selectable elements in the graphical user interface of the media editing application. Other embodiments, however, use the new segmented bars 1145 and 1150 as conceptual, pictorial representations of the division of the timing bar and graph that it represents; in other words, these embodiments maintain the timing bar 1115 as the selectable element in the GUI, and use the new key index 1110 for placing bounds on the modifications that are received directly or indirectly with respect to the timing bar 1115.

When a key index is created on a graph, some embodiments create and display a key index marker to represent the location of a key index on the timeline. This marker can then be selected and moved in order to cause the key index to be relocated to a new location on the timeline. One example of such a marker in some embodiments is a line 1155 that spans the timing bar at the location of the key index 1110. For instance, in FIG. 11, the selection of the interior location of the timing bar 1140 causes a line 1155 to appear on the timing bar. This line 1155 can be viewed as dividing the timing bar 1115 into two distinct segments 1145 and 1150. Alternatively, this line 1155 can simply be viewed as only a selectable control within the shape.

In conjunction with displaying a key index marker on the timing bar, some embodiments display a marker for the new key index on the global timing bar. For instance, FIG. 11 illustrates when the key index 1110 is created, a line 1160 representing the key index is displayed on the global timing bar 1130. Specifically, the line 1160 is displayed on the global timing bar at the horizontal coordinate of the key index. Along with the line 1160 on the global timing bar, a graphical icon may also be used to display further information as discussed above. Here, a small triangle 1155 is displayed above the global timing bar and the newly created key index to convey that the key index at that position is not a globally shared key index between all attributes currently being displayed in the geometry editing window 1105. Furthermore, similar to the marker 1155 on the single attribute timing bar, the marker in some embodiments is a selectable graphical user interface item that a user can select and move in order to cause the key index to be relocated to a new location on the graph as will be describes in later figures.

Figure 12:
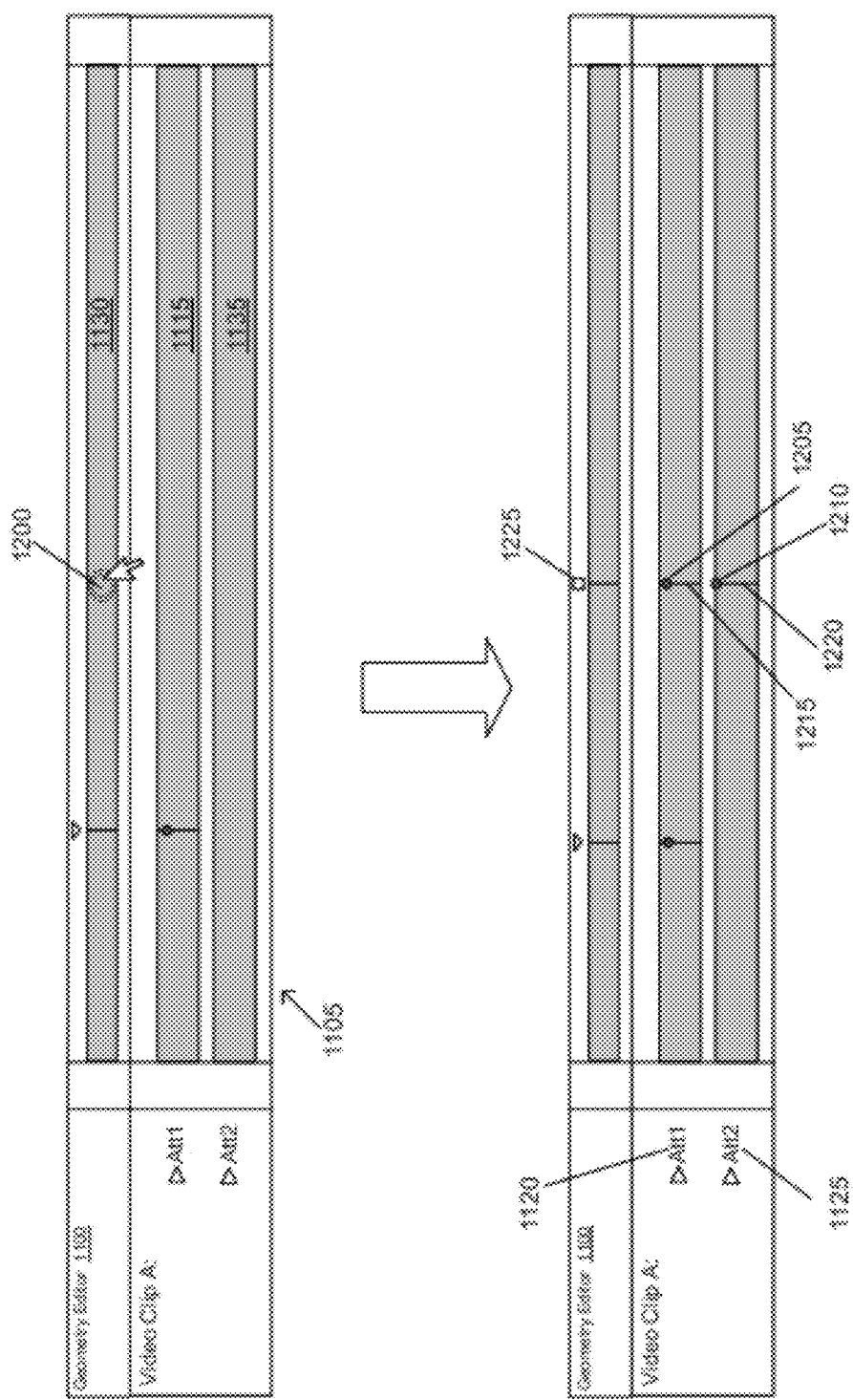
FIG. 12 illustrates an example of creating a new key index for multiple attributes from a global timing bar in some embodiments.

FIG. 12 illustrates an example of selecting a location on the global timing bar 1130 in order to create key indices across all attributes currently residing in the geometry editing window 1105. Specifically, FIG. 12 illustrates the cursor selection (e.g., a double-click operation) of a location 1200 in the global timing bar 1130. As shown, this operation creates two new key indices 1205 and 1210, where one key index 1205 is associated with the first attribute 1120, while the other key index 1210 is associated with the second attribute 1125. In this example, new key indices are created across the timing bars 1115 and 1130 about the horizontal coordinate of the selected location. Also, two new key index markers 1215 and 1220 that correspond to the two new key indices 1205 and 1210 are displayed across the timing bars 1115 and 1130 about the horizontal coordinate of the selected location.

In some embodiments, when multiple new key indices are created at a same location on multiple timing bars, some embodiments display an icon, as previously discussed, for representing the globally shared key index location on or above the global timing bar. For instance, in FIG. 12, as the two new key indices 1205 and 1210 are created at a same location along the duration, the selection causes one icon 1225, for example a square, that represents that the key index at that location is a shared key index between all attributes currently displayed in the geometry editing window 1105. Some embodiments also use such a representation when two key indices that were created at two different times for two different attributes subsequently overlap in time.

In some cases, it may be desirable to manipulate multiple different attributes at once, but not every attribute in the geometry editing window. For instance, when multiple key-indexed shapes are displayed in a geometry editor, the user may want to create key indices across only some but not all of the graphs through a single selection of a location on the global timing bar. Accordingly, some embodiments allow the user to associate and/or disassociate one or more key-indexed graphs in the global timing bar allowing modification of only the associated attributes from the global timing bar. In other embodiments, the user can select or deselect two or more shapes to combine into one multi-attribute timing bar which allows a user to perform key-index operations on multiple attributes from one multi-attribute timing bar. Such examples will described by the following figures.

Figure 13:
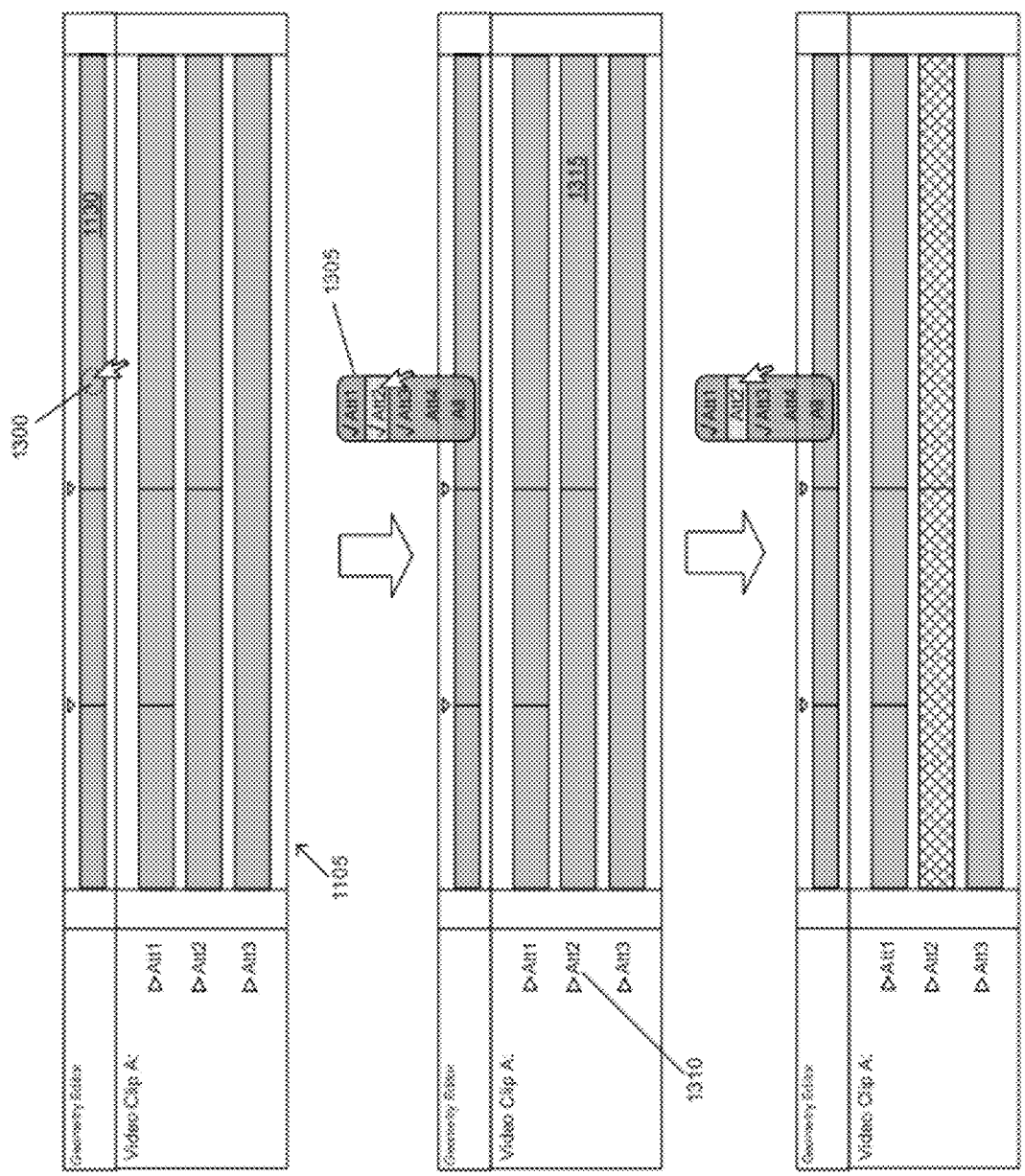
FIG. 13 illustrates an example of disassociating a particular attribute from a global timing bar in some embodiments.

FIG. 13 illustrates how to associate or disassociate one or more particular attributes of a media clip from a global timing bar. In one embodiment, as shown, a user can perform a right-click or control-click using the cursor on a location 1300 in the global timing bar 1130 to open up a context menu 1305. Within the context menu 1305, a user is presented with a listing of attributes associated with a particular media clip. In some embodiment, if multiple media clips are being edited, the user may be provided with sub-context menus for displaying the attributes for each of the media clips being edited. From the context menu, a user may select all attributes to be associated in the global timing bar or individually select which attributes to associate with the global timing bar. FIG. 13 illustrates the disassociation of Attribute 2 1310 from the global timing bar 1130. When Att2 1310 is disassociated from the global timing bar 1130, the timing bar 1315 representing Att2 1310 becomes inactive for editing purposes. Some embodiments will shade an inactive attribute differently from the active attributes to differentiate it while other embodiments might remove the attribute shape or timing bar altogether so as not to be displayed in the geometry editing window 1105. Once the desired attributes are the only attributes associated with the global timing bar, a user can perform key-index operations across all the associated attributes from the global timing bar as illustrated in FIG. 14.

Figure 14:
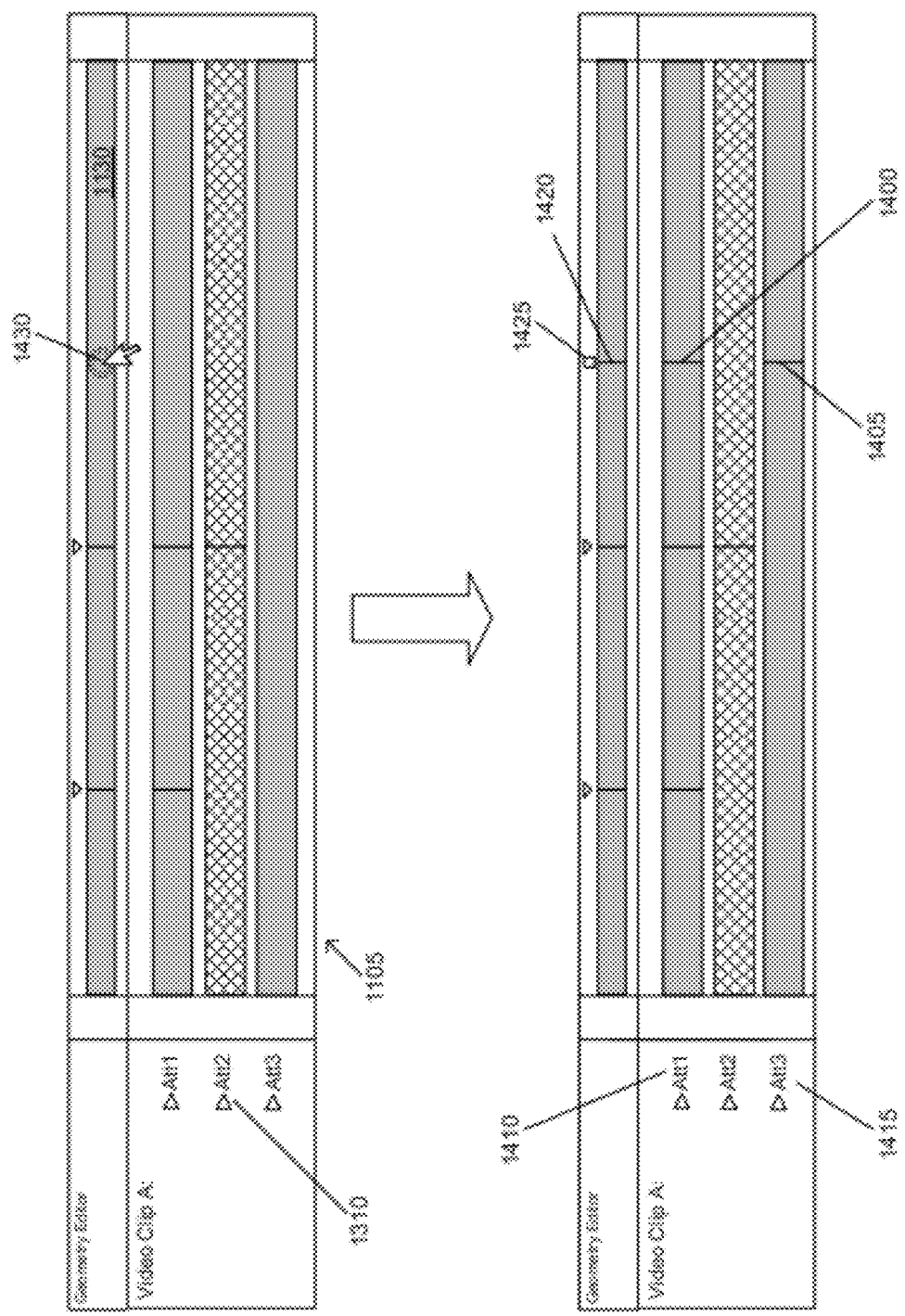
FIG. 14 illustrates an example of creating a new key index for all attributes associated with the global timing bar in some embodiments.

FIG. 14 shows the creation of a new key-index across all attributes associated with the global timing bar 1130 similar to the operation of FIG. 12. Specifically, a cursor-click operation (e.g., double-click) on an interior location 430 in the global timing bar 1130 creates two new key index markers 1400 and 1405 for the associated attributes Att1 1410 and Att3 1415 at the same location. The global timing bar displays a unique symbol such as a square 1425 above the newly created global key-index 1420 to signify that the key index is globally shared across all the attributes that are currently associated with the global timing bar. If Att2 1310 was once again activated or displayed in the geometry editing window, the icon 1425 would change to represent that the key index at that location no longer is a global key index for all attributes in the geometry editing window 1105.

Figure 15:
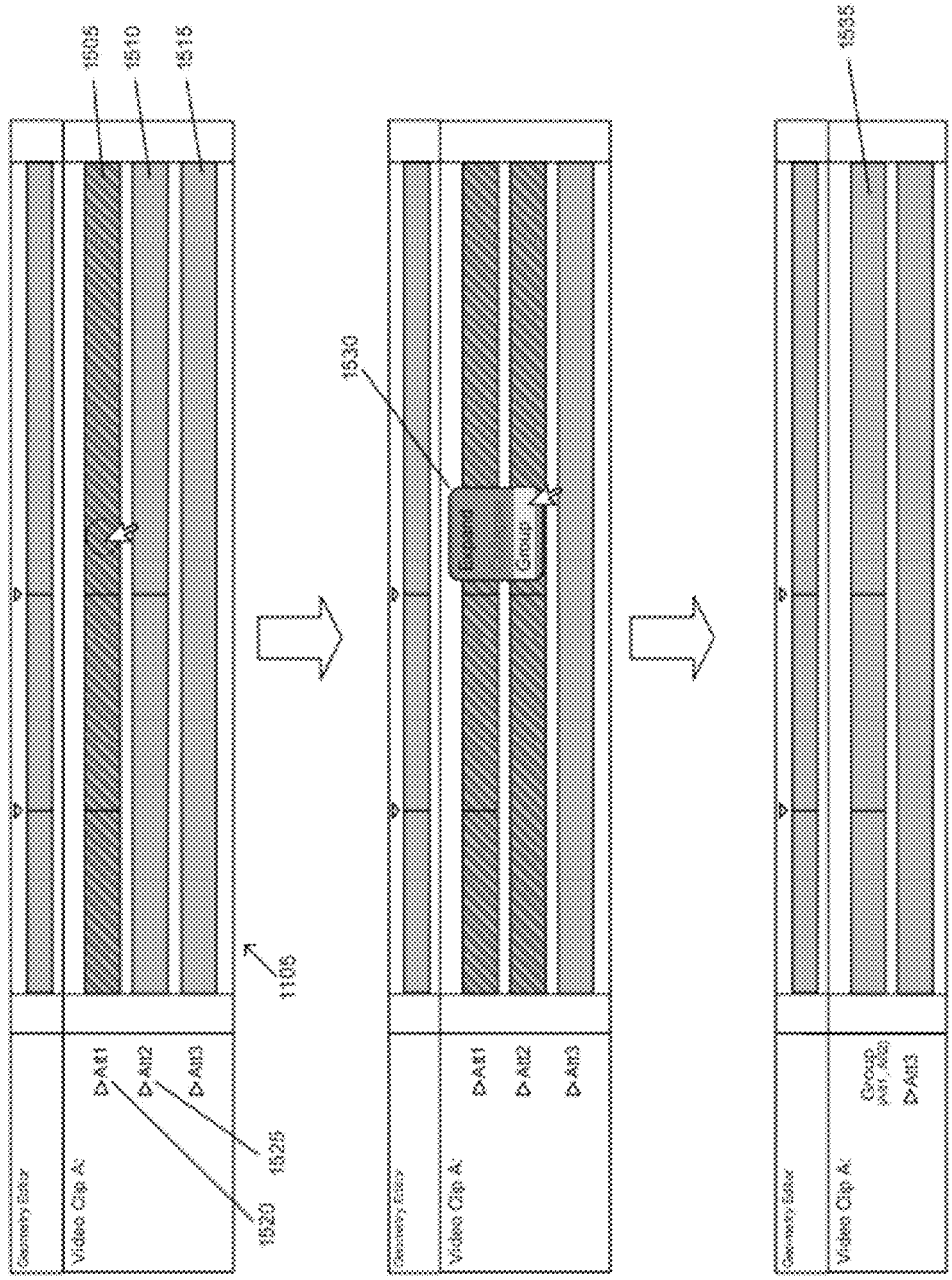
FIG. 15 illustrates and example of combining two attributes into one multi-attribute timing bar in some embodiments.

The same operation for creating a key index across multiple desired attributes can also be accomplished by combining the desired attributes together in a multi-attribute timing bar as illustrated in FIG. 15. This operation may sometimes be preferred over disassociating the undesired attribute(s) from the global timing bar or removing them from active editing in the geometry editing window 1105.

FIG. 15 illustrates altering the selection state of multiple timing bars in order to combine two attributes 1520 and 1525 in a single multi-attribute timing bar 1535. As shown, three timing bars 1505, 1510, and 1515 are displayed in the geometry editing window 1105. In this example, the selection states of two attributes 1520 and 1525 are altered. Specifically, the user alters the selection states by first selecting the Att1 timing bar 1505, and then selecting the Att2 timing bar 1510. The timing bars, or graph shapes in an un-collapsed view, may be selected in any number of different ways. For instance, the user may select the timing bars 1505 and 1510 through a cursor click operation while holding down a modifier key, by selecting user-interface controls (e.g., check boxes), or through hotkeys (e.g., CTRL+A). Once the desired attribute shape representations are selected, some embodiments use a right click operation to bring up a context menu 1530 allowing the user to group the selected attributes 1520 and 1525 into a single multi-attribute timing bar 1535. The grouping of attributes may also be performed in any number of different ways. For instance, the user may combine the two using a drop down menu from the file browser of through the use of a hotkey or keyboard shortcut.

Figure 16:
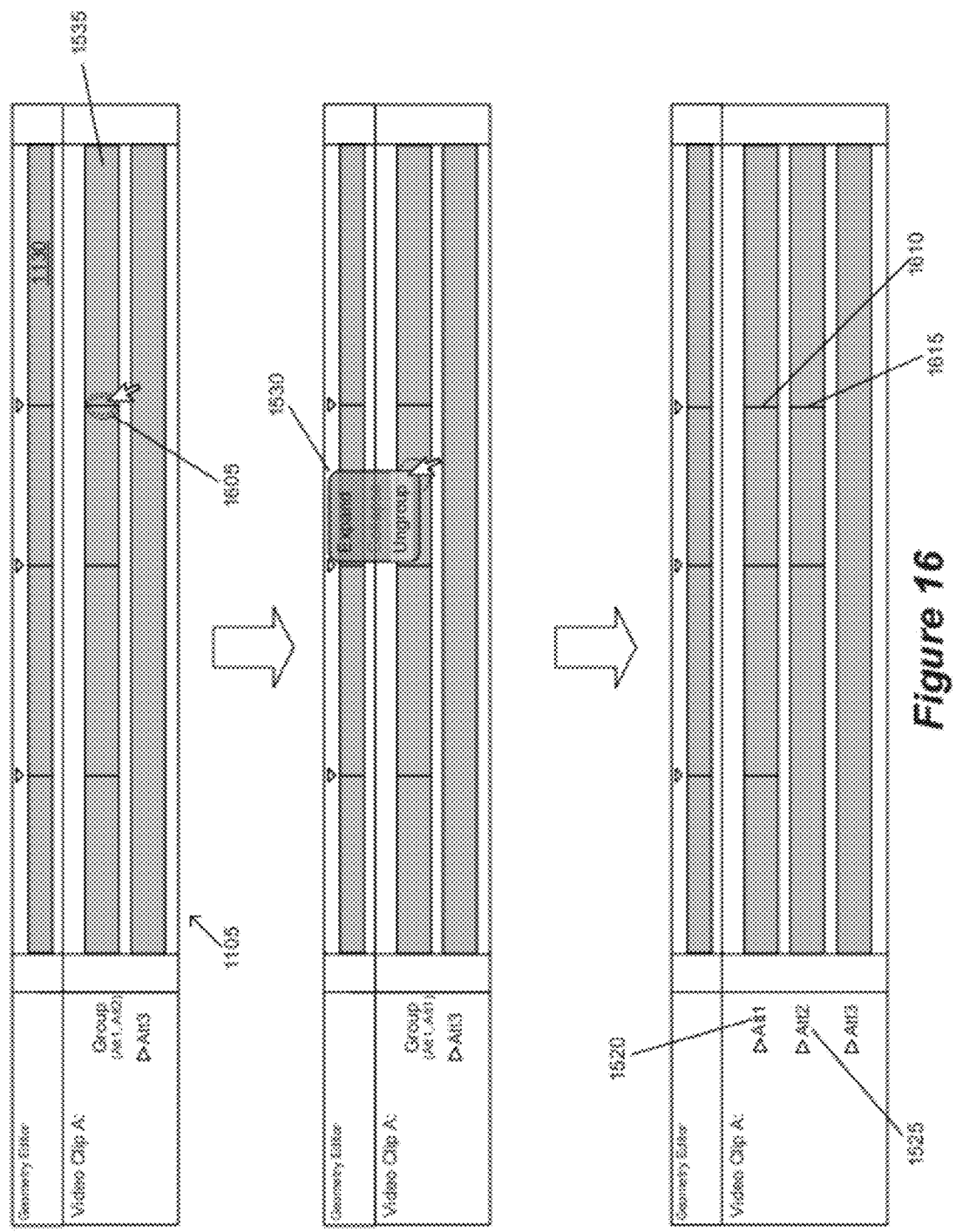
FIG. 16 illustrates an example of creating a new key index across all attributes associated with a multi-attribute timing bar in some embodiments.

FIG. 16 illustrates an example of creating key indices across the selected attributes associated with the multi-attribute timing bar 1535 created in FIG. 15. Specifically, it illustrates the cursor as selecting (e.g., through a double click operation) one location 1605 on the multi-attribute timing bar in the same fashion as illustrated in FIG. 3 and FIG. 11. The user can then ungroup the multi-attribute timing bar through a context menu 1530 or keyboard shortcut to reveal the individual shapes and/or timing bars representing each attribute that was associated with the multi-attribute timing bar. As shown, the selection to create a key index in the multi-attribute timing bar creates two new key index markers, where one key index marker 1610 is associated with Att1 1520, while the other key index marker 1615 is associated with Att2 1525. This method may be useful when a user is working with several attributes and wishes not to remove several attributes from the editor window 1105 or disassociate them from the global timing bar 1130 in order to manipulate only a few of the several attributes being edited.

Figure 17:
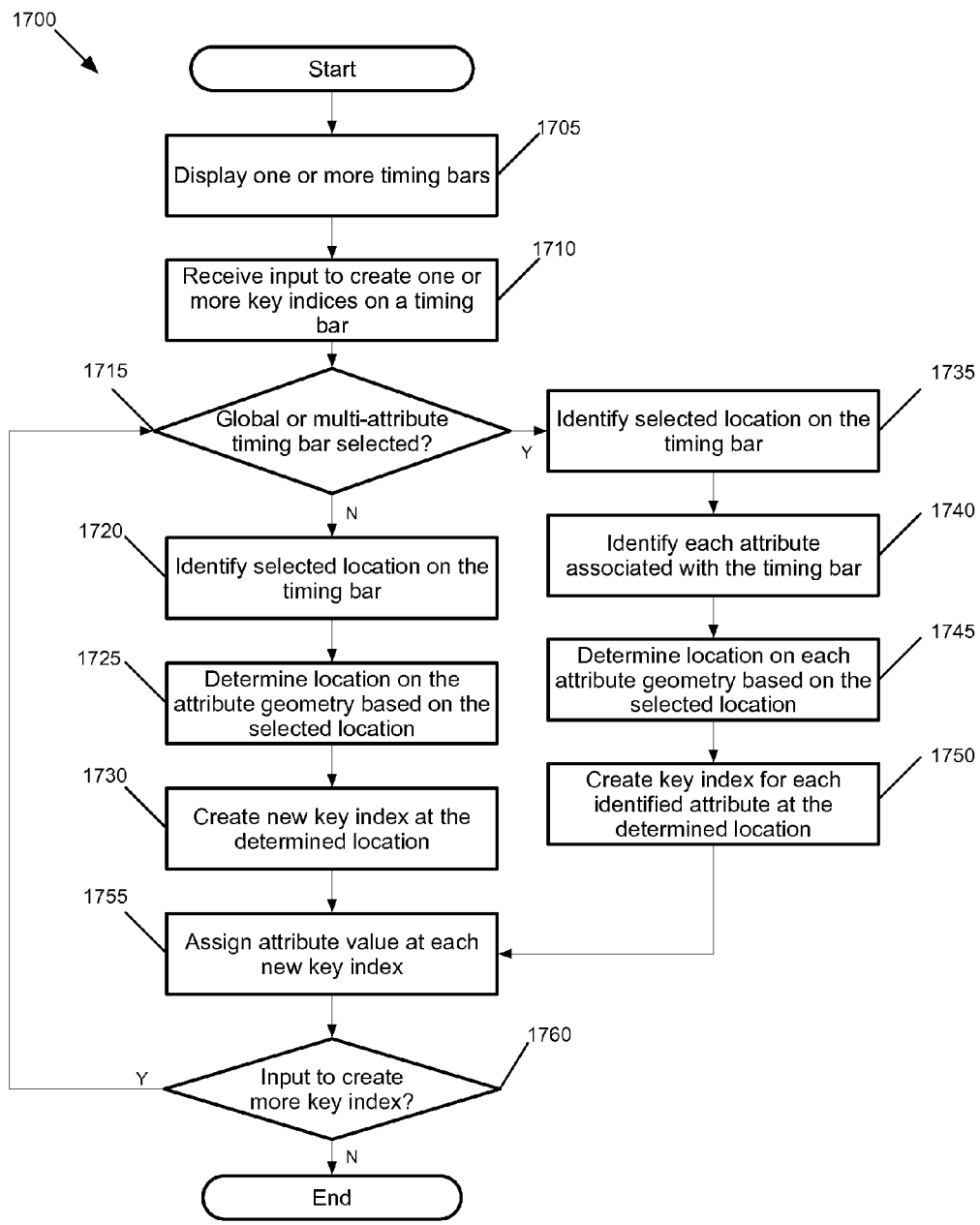
FIG. 17 illustrates a process for creating key indices using timing bars.

The preceding section described and illustrated various ways to create new key indices for one or more attributes of media content using timing bars. FIG. 17 conceptually illustrates a process 1700 of some embodiments for creating one or more new key indices. As shown, the process displays (at 1705) one or more timing bars. Several examples of displaying such timing bars in a geometry editing window are illustrated in FIGS. 11-16.

The process then receives (at 1710) an input to create one or more new key indices on a timing bar. In some embodiments, the input is received from the user interacting with a graphical user interface of the media editing application. Next, the process (at 1715) determines whether a multi-attribute timing bar or a global timing bar is selected as opposed to a single-attribute timing bar. An example of receiving a user's selection of a single-attribute timing bar is illustrated in FIG. 11. An example of receiving selection of a location on a global or multi-attribute timing bar is described above in FIGS. 12 and 16.

When a global or multi-attribute timing bar is selected, process proceeds to 1735, which is described below. Otherwise, the process identifies (at 1720) the selected location on a single-attribute timing bar. In some embodiments, such identification entails determining the input coordinate of the selected location. The process then determines (at 1725) a location on the attribute geometry for the new key index based on the selected location. For instance, when the user selects the interior location of a timing bar, some embodiments determine the location for the new key index at the horizontal coordinate of the selected location. The process then creates (at 1730) the new key index on the timing bar at the determined location. The process then proceeds to 1755 which is described below.

When the determination is made (at 1715) that a global or multi-attribute timing bar is selected, the process proceeds to 1735. The process identifies (at 1735) the selected location on the timing bar. In some embodiments, such identification includes determining the input coordinate of the selected location. The process then identifies (at 1740) each attribute that is associated with the selected timing bar.

The process then determines (at 1745) the location for each new key index on each identified attribute geometry. For instance, when the user selects the location on the global or multi-attribute timing bar, some embodiments determine the location for each new key index at the horizontal coordinate of the selected location. The process then creates (at 1750) a new key index for each identified attribute. For instance, as illustrated in FIG. 12, if a global timing bar was selected a new key index is created for every attribute being editing in the geometry editing window. If a multi-attribute timing bar was selected, as shown in FIG. 16, a new key index is created for each attribute associated with the multi-attribute timing bar.

When one or more key indices are created, the process assigns (at 1755) an attribute value at each new key index. In some embodiments, one or more of the new key indices are assigned a default value. For instance, when the new key index represents an opacity attribute, it might be assigned a value that defines the opacity as fully visible. Some embodiments assign a value at the key index that is equal to the value of the attribute at the horizontal coordinate of the key index before the creation of the key index as illustrated in FIG. 3. That is, the creation of the key index does not alter the key-indexed graph at that point. The process then awaits (at 1760) an input to create more new key indices. When such input is received, the process returns to 1715. Otherwise, the process ends.

One of ordinary skill in the art will realize that not all features for creating key indices need to be used together. Accordingly, some embodiments perform variations of the process 1700. In some embodiments, the operations of process 1700 might be performed by two or more separate processes. That is, some embodiments could have one process for creating a new key index through selection of single-attribute timing bar and a separate process for creation of a new key index on a global or multi-attribute timing bar.

The preceding section described and illustrated alternative ways to create new key indices through the use of various types of timing bars including single-attribute, multi-attribute and global timing bars. The next section will illustrate how key indices may be relocated using the various types of timing bars illustrated in the preceding sections.

B. Relocating Key Indices

FIGS. 18-22 provide several examples of relocating key indices on one or more key-indexed graphs. Specifically, these figures illustrate relocating key indices by selecting and moving: (i) a representation (e.g. key index marker) of a key index on a timing bar (single or multi-attribute), (ii) an interior location within such a timing bar, and (iii) representations of key indices on a global timing bar.

Figure 18:
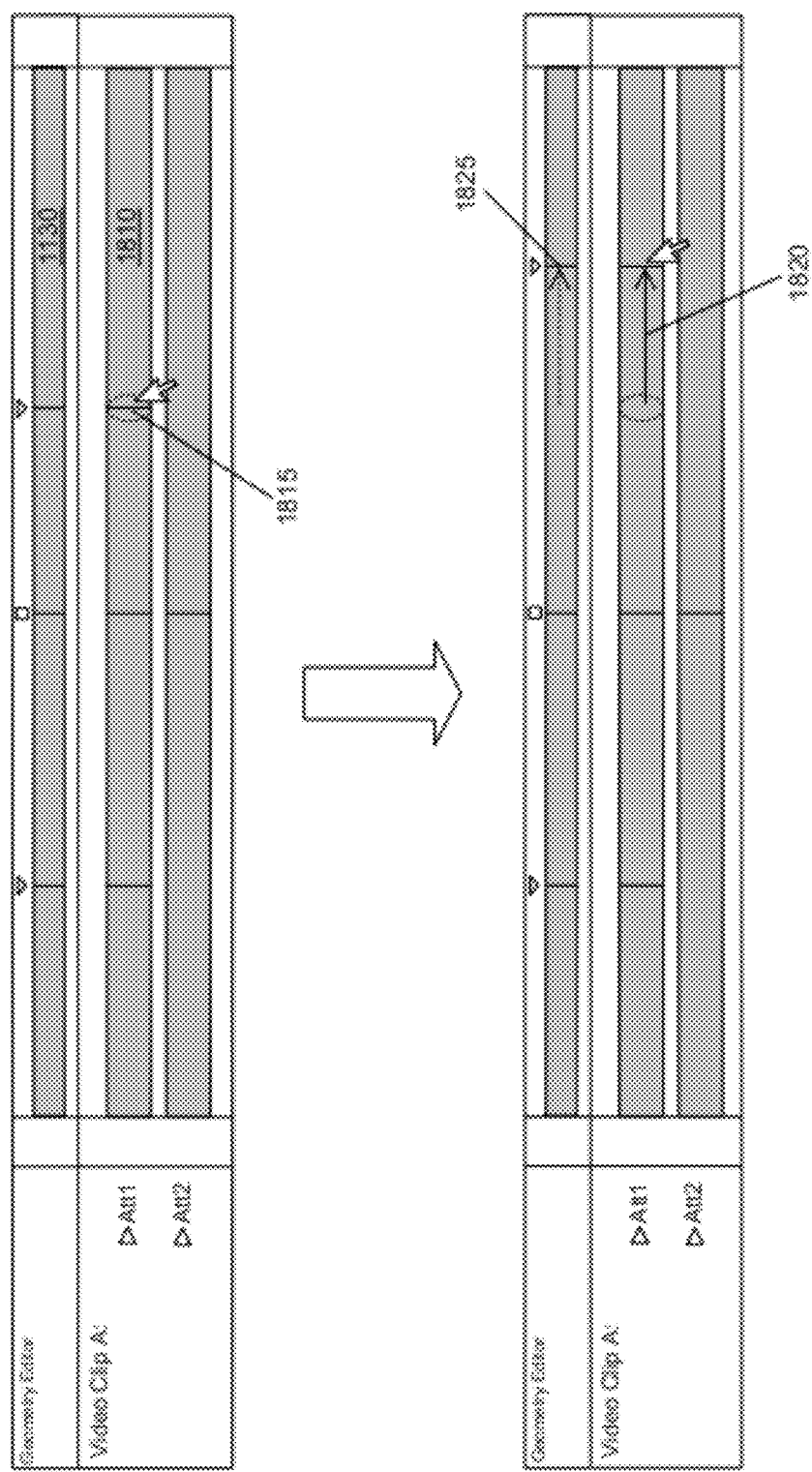
FIG. 18 illustrates relocating a key index using a timing bar in some embodiments.

FIG. 18 illustrates relocating a key index on the timing bar 1810 by selecting and moving a key index marker 1815 within the timing bar 1810. Specifically, to relocate the key index, this figure illustrates selecting and moving the marker 1815 which was similarly described above by reference to FIG. 5. To simplify these illustrations, a key index has not been shown on the key index marker as described in FIG. 5. In this example, when a user selects the marker 1815 (e.g., through a cursor click operation), the user can then move the marker (e.g., through a cursor drag operation 1820) to relocate the key index on the timing bar. Relocation of a key index will also be reflected in the global timing bar 1130 as illustrated by the relocation of the key index marker 1825 in the global timing bar 1130 in FIG. 18.

Figure 19:
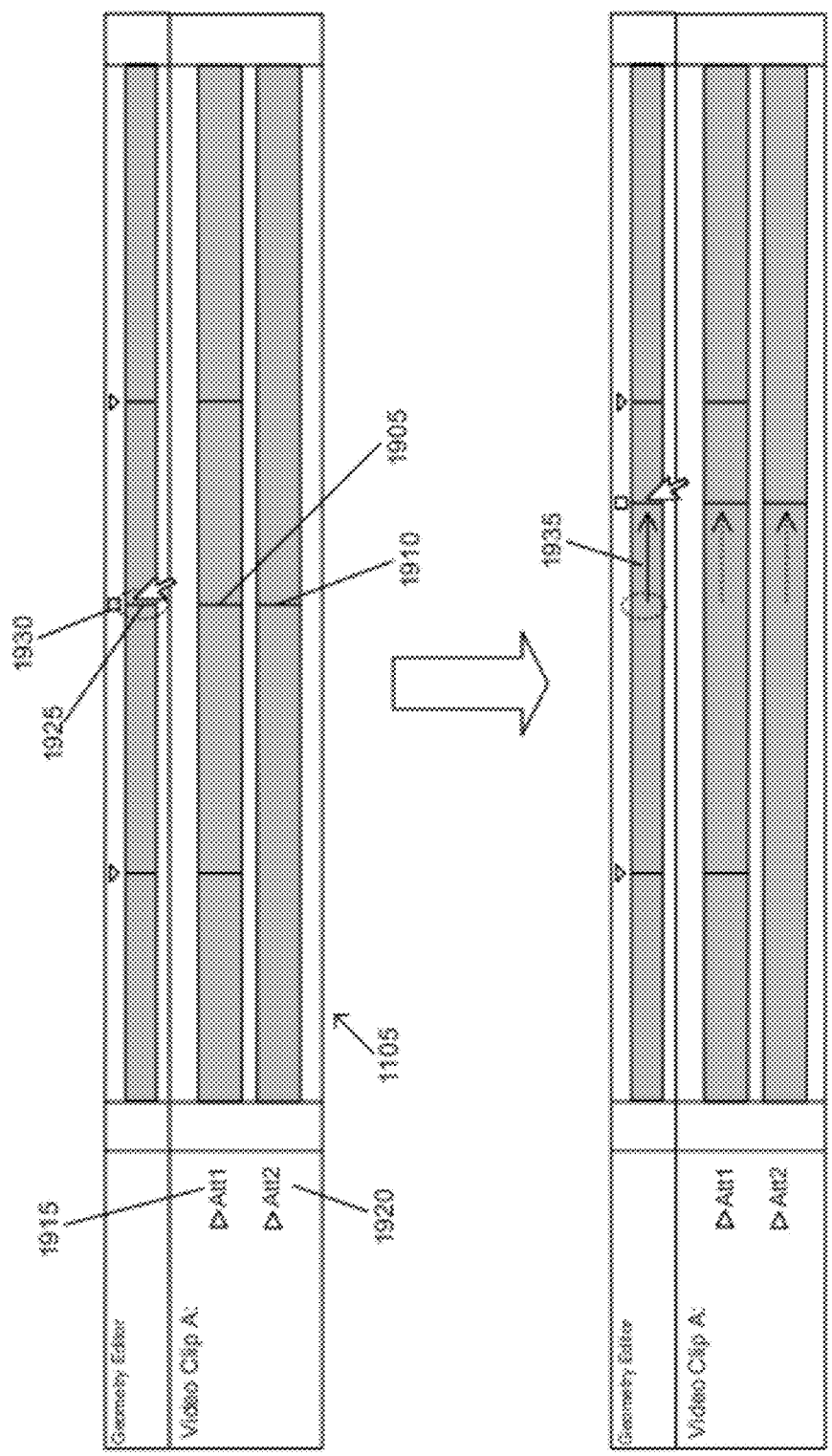
FIG. 19 illustrates relocating multiple key indices belonging to two attributes from the global timing bar in some embodiments.
Figure 20:
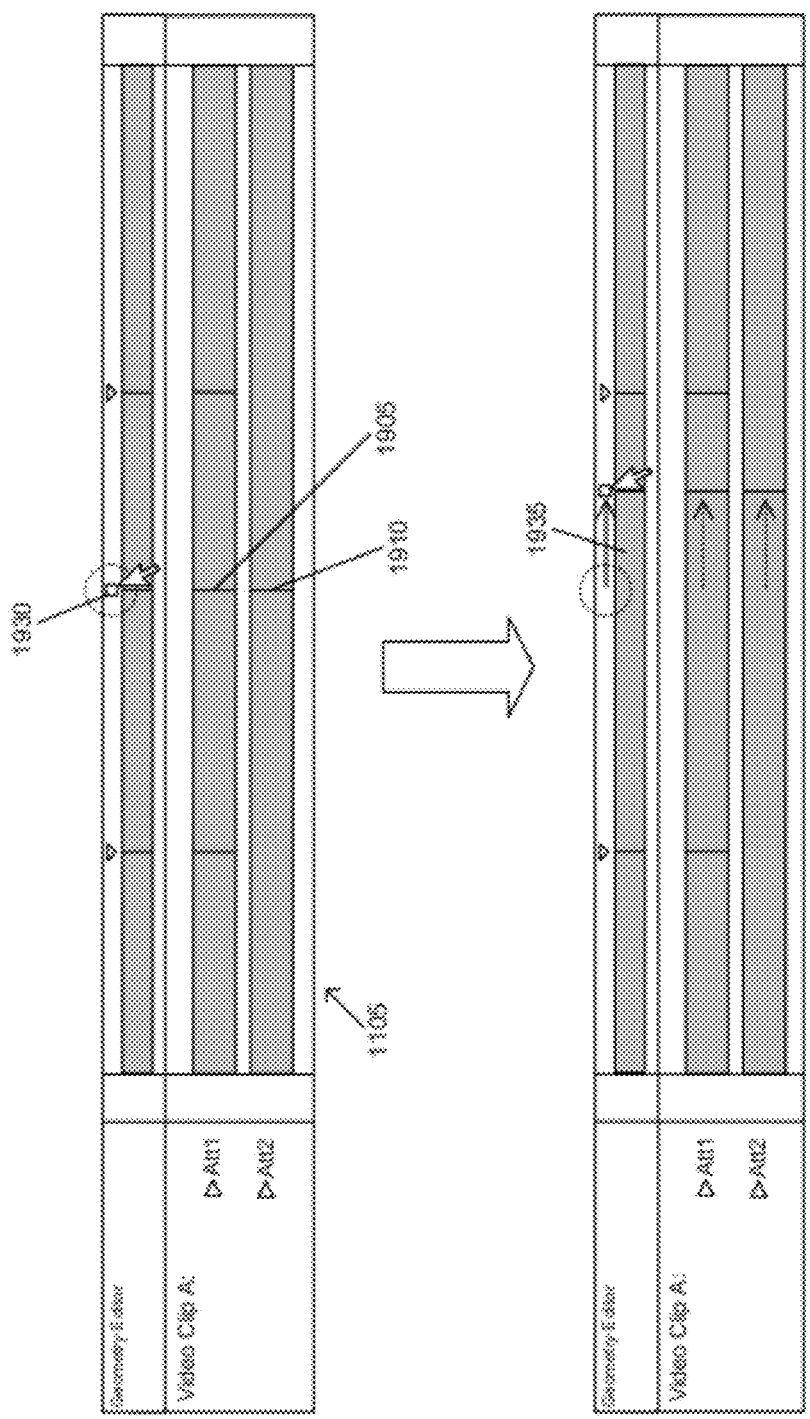
FIG. 20 illustrates relocating multiple key indices belonging to two attributes from the global timing bar in some embodiments.

Similarly, FIG. 19 illustrates relocating multiple shared key indices 1905 and 1910 from the global timing bar. Here, the shared location of a key index in Att1 1915 and Att2 1920 is represented by a key index marker 1925 dividing the global timing bar. The square icon 1930 above the timing bar represents that the particular key index at that location is shared between all active attributes (1915 and 1920) currently displayed in the geometry editing window 1105. FIG. 19 specifically illustrates the selection of the marker 1925 representing the location of a key index on the global timing bar, and through a cursor drag operation 1935, each key index, 1905 and 1910, represented by the marker 1925 in the global timing bar is relocated to a new position. This same operation can also be accomplished by selecting the icon 1930 and relocating its position. Such an example is illustrated in FIG. 19I.

Figure 21:
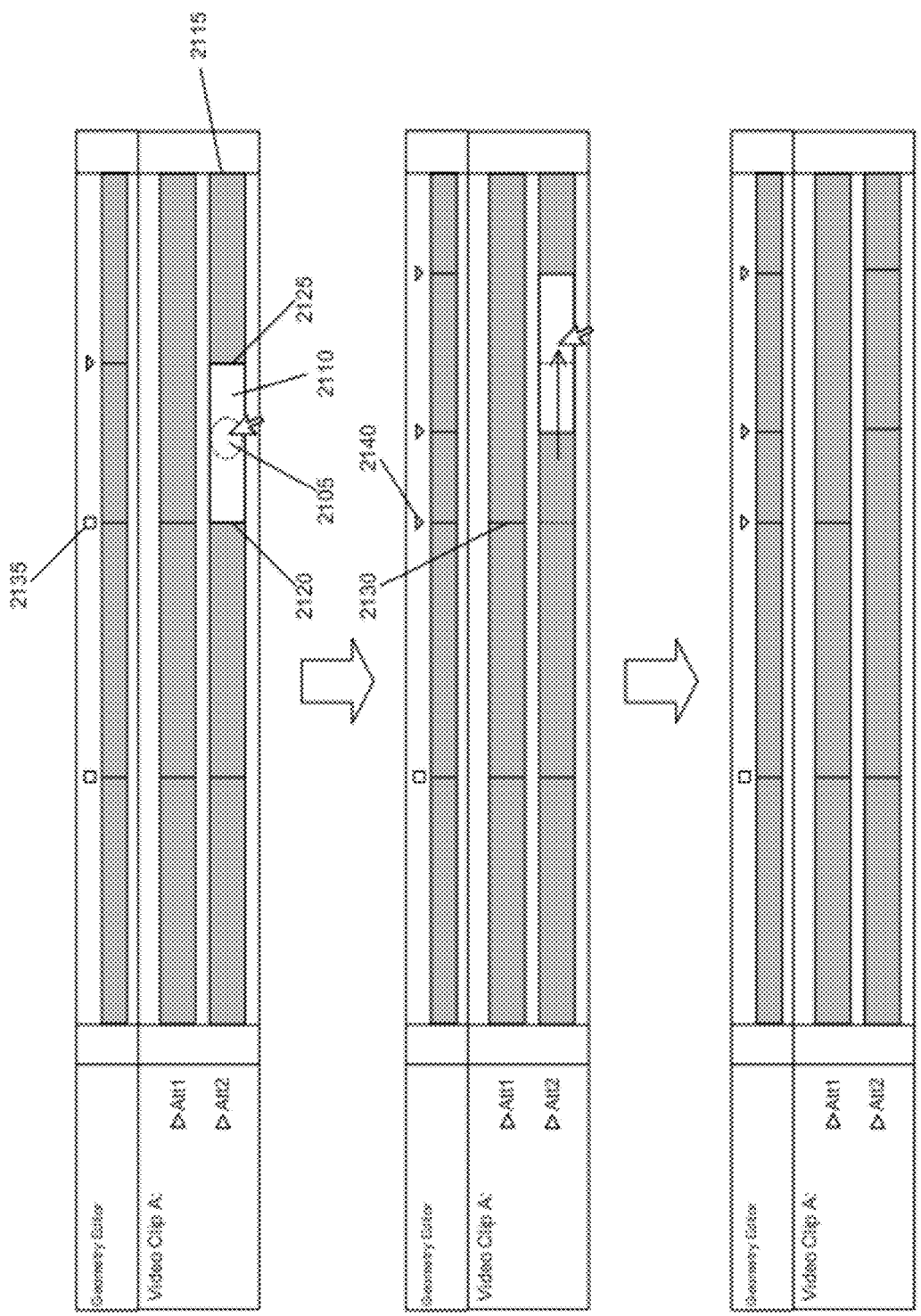
FIG. 21 illustrates the relocation of a segment, as defined by two key indices, for a single attribute from a timing bar in some embodiments.

When several key indices for several attributes overlap (i.e., are at the same point in the timeline), some embodiments display on the global timing bar one representation for the several key indices, as previously mentioned. When one of the two overlapping key indices is moved, some embodiments change the representation in the global timing bar to signify that the two key indices are no longer overlapping. One such example is illustrated in FIG. 21. Specifically, this figure illustrates an example of the grabbing the interior location 2105 of a segment 2110 in a timing bar 2115. This type of operation allows a user to move two key indices 2120 and 2125 that define the segment 2110 simultaneously without altering the duration between the two indices 2120 and 2125. Specifically, the segment is moved to a later or earlier position in the timeline while the duration between the two key indices 2120 and 2125 remains the same.

As illustrated in FIG. 21, relocating, with a click and drag cursor operation, the two key indices represented by key index markers 2120 and 2125 relocates key index 2120 that originally overlapped key index 2130. When key index 2120 is relocated, the representation in the global timing bar changes from a square 2135 to a triangle to signify that the two key indices 2120 and 2130 are no longer overlapping. As previously mentioned, the icons 2135 and 2140 may represent various types of information, and for illustration purposes the information being conveyed by the icons in FIG. 21 is the identification of overlapping and non-overlapping key indices.

Figure 22:
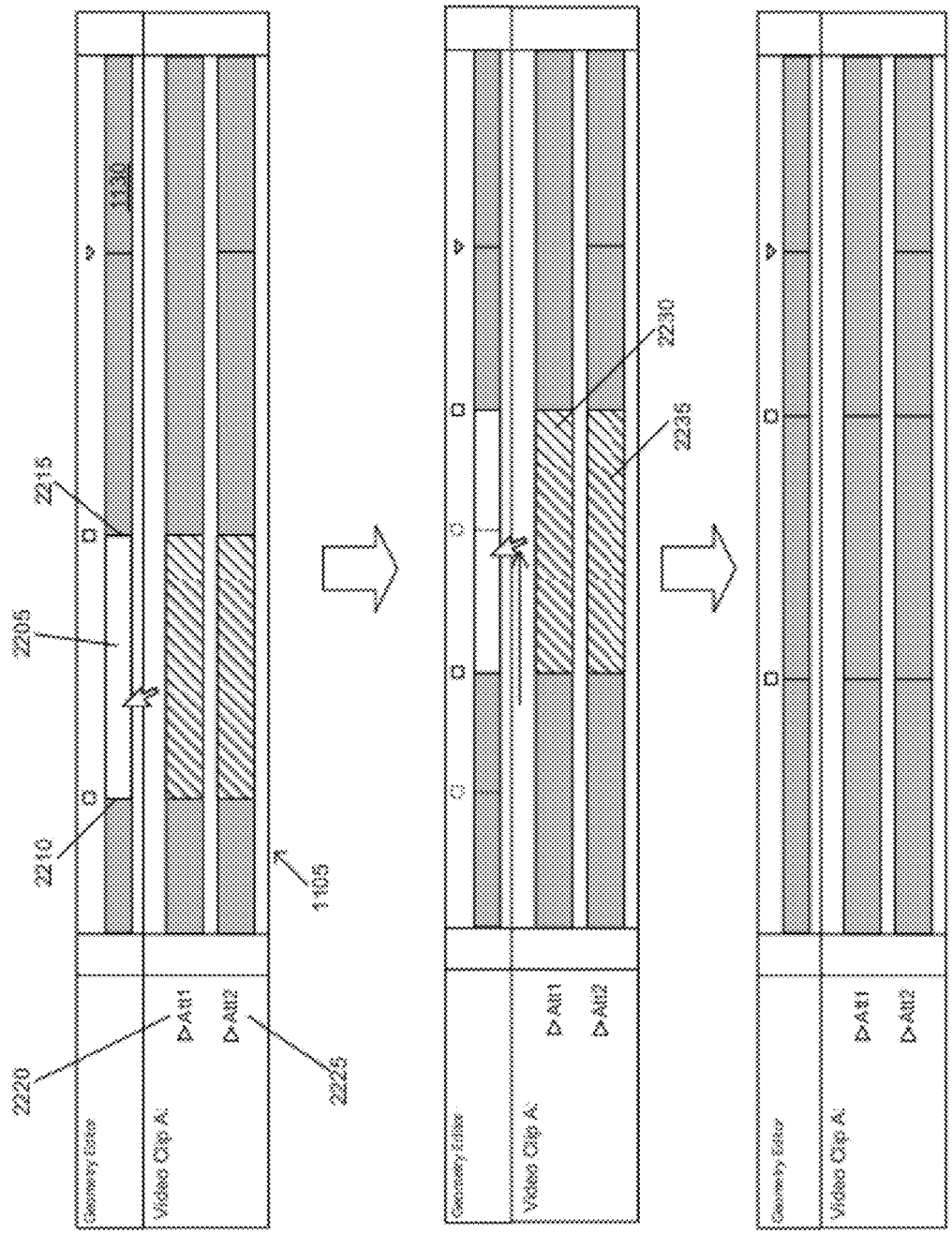
FIG. 22 illustrates the relocation of a segment, as defined by two key indices, for a multiple attributes from the global bar in some embodiments.

FIG. 22 illustrates the similar concept of relocating a segment defined by two key indices as shown in FIG. 21 from a global timing bar 1130. As shown, two attribute 2220 and 2225 are currently being edited in the geometry editing window 1105. The segment 2205 is defined by two key index markers 2210 and 2215 that are shared across the two attributes 2220 and 2225. Relocating a segment 2205 in the global timing bar 1130 shifts each corresponding segment as illustrates here with segments 2230 and 2235 for each attribute 2220 and 2225. This same operation could have also been performed from a multi-attribute timing bar having both attributes 2220 and 2225 grouped together. Some embodiments allow a modification of multiple attributes from a global or multi-attribute timing bar only when both starting and ending key indices are commonly shared at the same location as shown here. Other embodiments may allow this modification if only one key index is commonly shared, while some embodiments might not allow this operation altogether.

Figure 23:
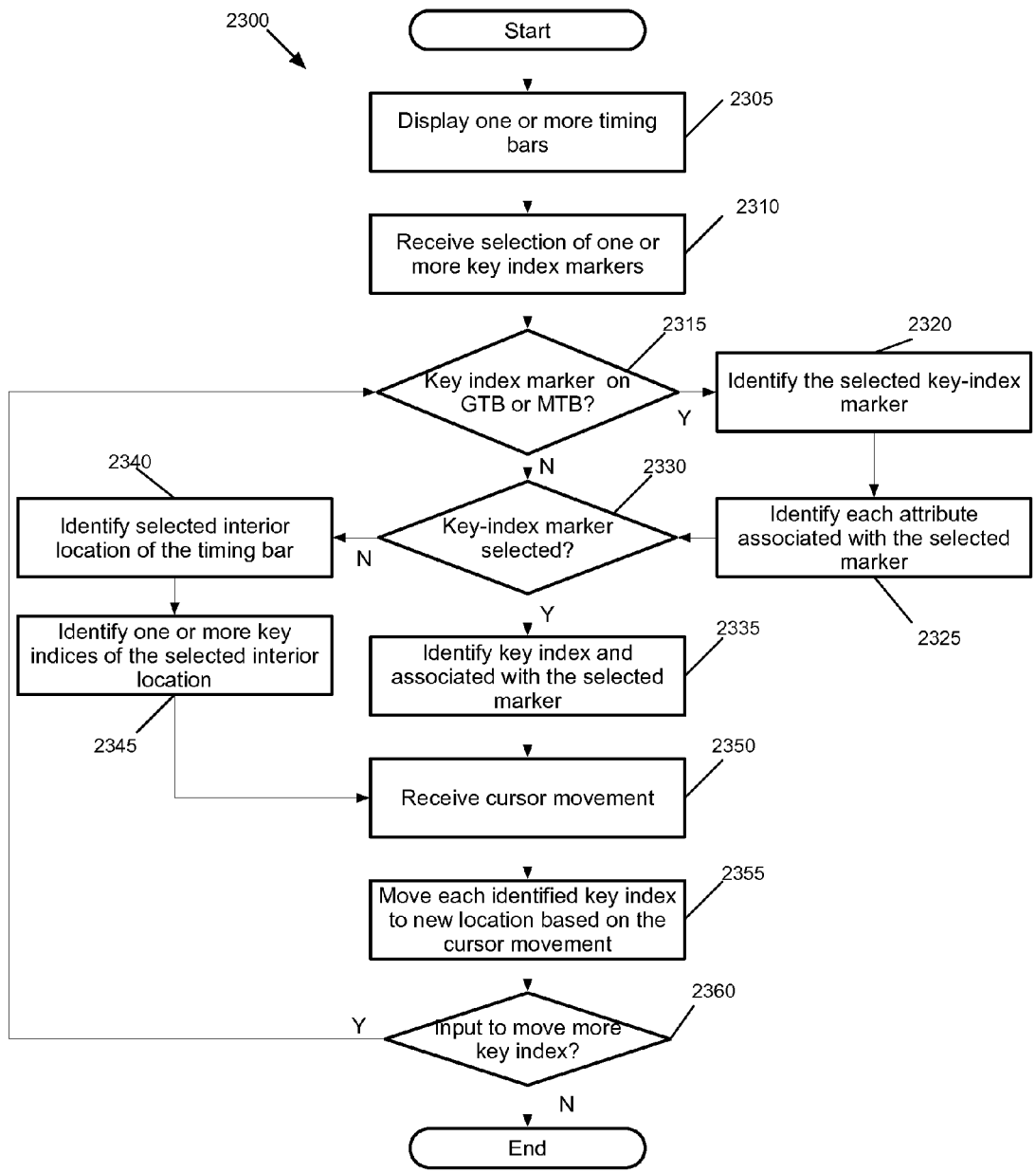
FIG. 23 illustrates a process for relocating key indices from a timing bar in some embodiments.

The preceding section described and illustrated various ways to relocate key indices on a timing bar. FIG. 23 conceptually illustrates a process 2300 of some embodiments for relocating one or more key indices on a timing bar. The process is performed by a media editing application in some embodiments. As shown, the process starts when it displays (at 2305) one or more timing bars. Several examples of displaying such timing bars are illustrated in FIGS. 18-22.

The process then receives (at 2310) a selection of one or more the key index markers on the timing bar. In some embodiments, the input is received from a user interacting with a graphical user interface of the media editing application. Next, the process determines (at 2315) whether the selected key index marker is on a global or multi-attribute timing bar.

When a key-index marker on either a global or multi-attribute timing bar is selected, the process proceeds to 2320. Otherwise the process proceeds to 2330. The process identifies (at 2320) the selected key-index marker. After identifying the selected marker, the process identifies (at 2325) each attribute associated with the selected key-index marker. An example of identifying key indices that are associated with multiple attributes on a on a global timing bar is described above by reference to FIG. 19.

When the determination is made (at 2315) that a single-attribute timing bar is selected (i.e. not a global or multi-attribute timing bar) or has identified all the attributes associated with a global or multi-attribute timing bar, the process determines (at 2330) whether the key index marker on a timing bar is selected as opposed to an interior region of the timing bar. When a single key-index marker or key index is selected, the process identifies (at 2335) the location of the key index associated with the key-index marker for each attribute.

When a determination is made (at 2330) that a key index marker or key index on the timing bar is not selected, the selected portion of the timing bar is an interior location on the timing bar. The process then identifies (at 2340) the selected interior location. Based on this identification, the process then identifies (at 2345) one or more key indices that are affected by the selected interior location. Examples of identifying such key indices are described above by reference to FIGS. 21 and 22. For instance, some embodiments identify the first key indices on either side of the selected location.

Once one or more key indices are identified, the process receives (at 2350) cursor movement. Based on the cursor movement, the process (at 2355) moves each identified key index for each identified attribute to a new location on a corresponding graph. The process then awaits (at 2360) input to relocate more key indices. When such input is received, the process returns to 2315. Otherwise, the process ends.

One of ordinary skill in the art will realize that not all features for relocating key indices need to be used together. Accordingly, some embodiments perform variations on the process 2300. In some embodiments, the operations of process 2300 might be performed by two or more separate processes. That is, some embodiments could have one or more processes for relocating key indices through selection of a single attribute timing bar and a separate process for relocating key indices through selection of a global or multi-attribute timing bar.

The preceding section described and illustrated various ways to relocate new key indices through the use of various types of timing bars including single-attribute, multi-attribute and global timing bars. The next section will illustrate how the attribute value at each key index may be modified using the various types of timing bars illustrated in the preceding sections.

C. Specifying Attribute Values

FIGS. 24-27 provide several illustrative examples of selecting key indices provided in a timing bar and modifying the attribute value at a particular key index. In particular, these figures illustrate modifying the value of one or more attributes at a key index from a timing bar by selecting the key index on the timing bar and positioning the key index vertically on its corresponding key index marker to represent the value of the attribute at the location of that particular key index.

Figure 24:
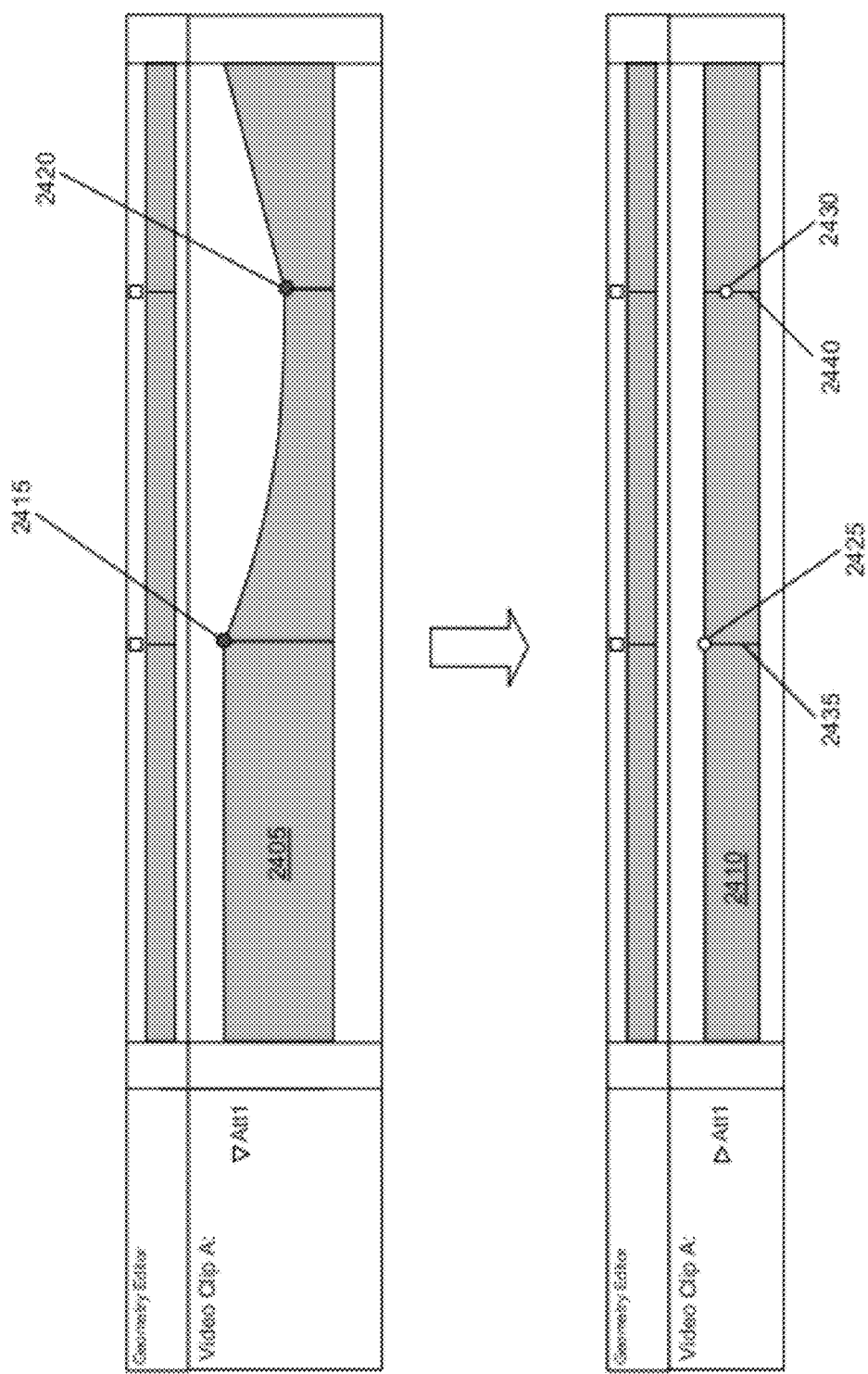
FIG. 24 illustrates key index marker and attribute value indicators on a timing bar in some embodiments.
Figure 25:
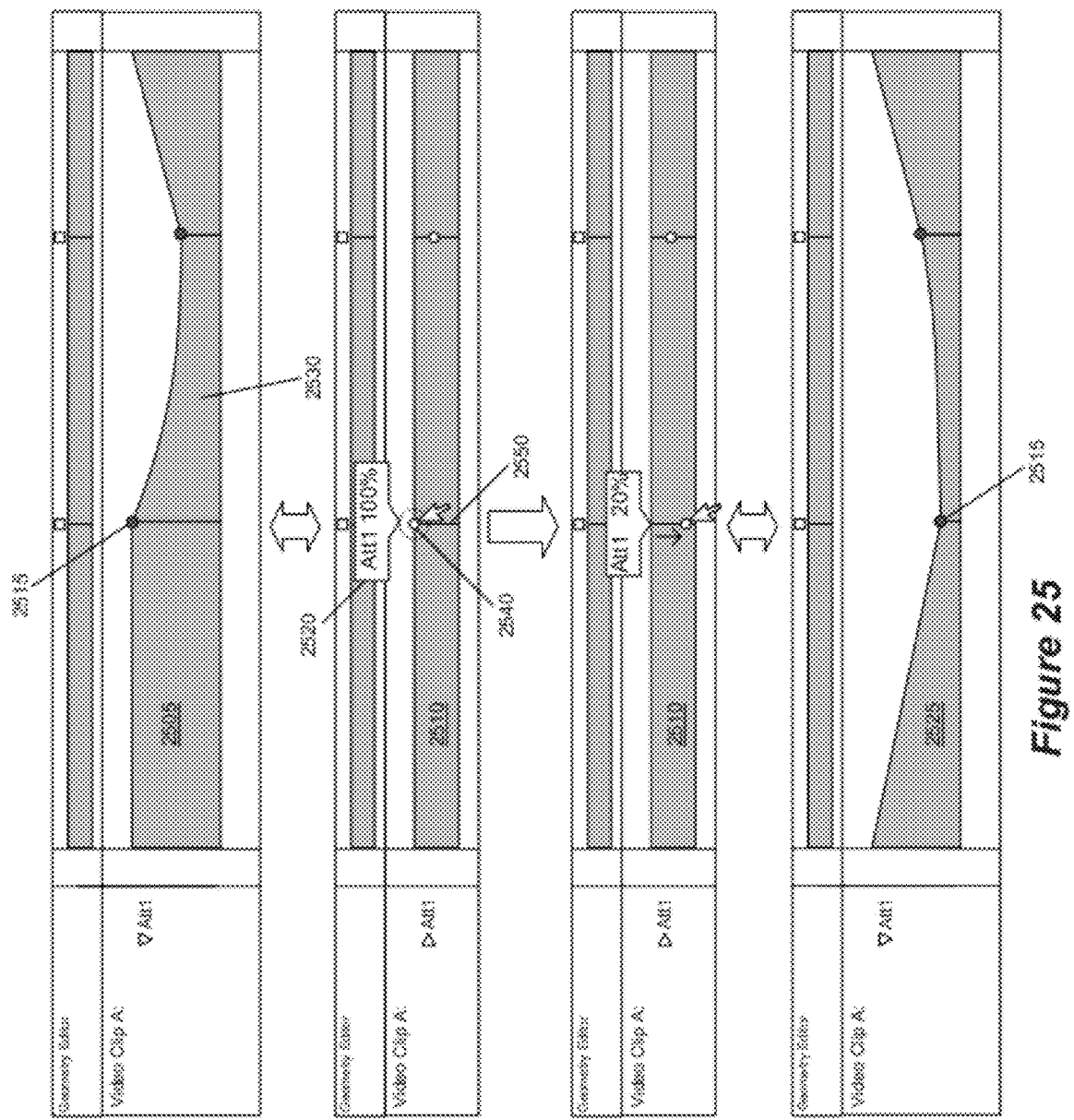
FIG. 25 illustrates modifying the value of an attribute using the attribute value indicator of a timing bar in some embodiments.

FIG. 24 illustrates a key-indexed graph 2405 and its collapsed timing bar representation 2410 where the attribute value at each key index 2415 and 2420 is represented by the vertical positions the key index 2425 and 2430 on their respective key index markers 2435 and 2440. As illustrated, key index 2415 is positioned at its maximum value on the key indexed graph 2405. The attribute value gradually decreases to key index 2420, as indicated by the position of key index 2430, before linearly increasing back towards its maximum value. The key-indexed graph is then shown collapsed into a timing bar. The key indices 2415 and 2420 are represented as selectable key indices 2425 and 2430 on the timing bar. FIG. 25 will demonstrate how these key indices can be moved vertically along a key index marker within the timing bar to change the attribute values at its particular location.

FIG. 25 illustrates modifying the attribute value of one key index from a timing bar. Specifically, FIG. 25 first shows a key-indexed graph 2505 and the graph collapsed into a timing bar 2510. Within the timing bar 2510, a cursor selection of the key index 2540 brings up a pop-up window 2520 displaying the current attribute value. As shown, the current value of the attribute is 100% at the selected location. The key index 2540 is then dragged in a downward direction by the cursor. As the key index 2540 is moved along its key index marker 2550, the pop-up window 2520 displays the value of the attribute as the value is modified. Some embodiments allow the user to drag the cursor outside the timing bar when manipulating an attribute value in this manner. This allows freedom of movement while editing and therefore doe not restrict the user to be bound by the small area within the timing bar when making such edits in a timing bar.

As shown, the key index 2540 is dragged towards the bottom of the timing bar 2510 which modifies the attribute value from 100% to 20%. The change in attribute value is reflected in the expanded graph shape of the attribute where the key-indexed graph 2525 now reflects the new attribute value of 20% at the first key index 2515. In some embodiments, the attribute values are displayed at all times through text labels within the timing bar rather than displaying the value in a pop-up window during selection of a key index. Such an example is shown in FIG. 26.

Figure 26:
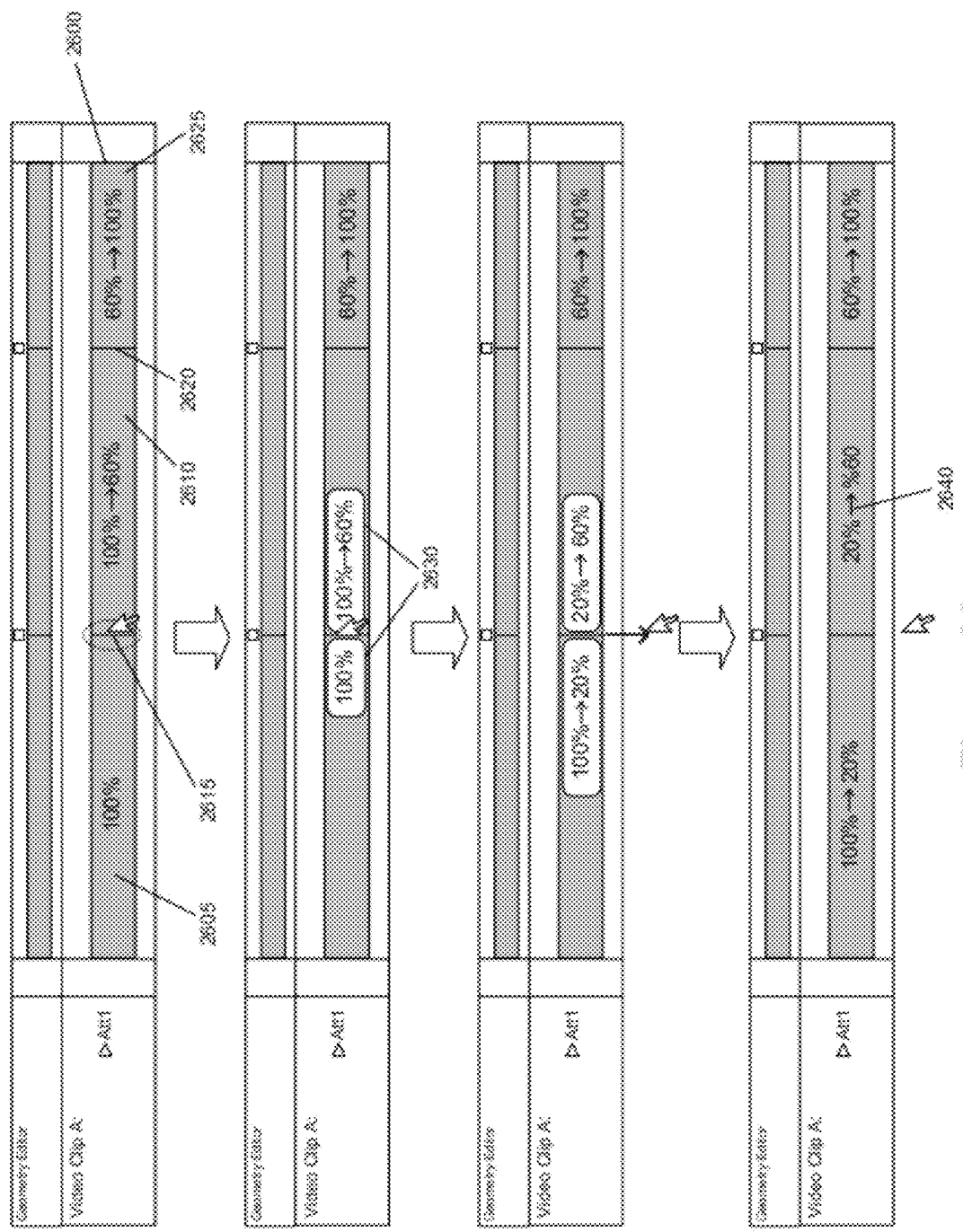
FIG. 26 illustrates attribute values text labels of a timing bar and modifying the value of an attribute using a key index marker in some embodiments.

FIG. 26 illustrates the same timing bar 2410 and 2505 of FIGS. 24 and 25 having text labels to reflect the attribute values at each key index. Specifically, FIG. 26 illustrates how the text labels react when editing the attribute value at a key index. In this illustration, the text conveys the attribute values in each segment of the timing bar, where each segment is defined by a starting and ending key index. When an attribute value is constant between two key indices, only the constant value of the attribute is displayed within the segment as illustrated in the first segment 2605 of the timing bar 2600. The second segment 2610 represents segment 2530 of the key-indexed graph 2505 of FIG. 25. This segment reflects the change in attribute value from 100% at the beginning key index 2615 to 60% at the ending key index 2620. The final segment 2625 illustrates the attribute value going back up to 100% from 60%.

The illustration initially shows the selection of key index 2615. After selection of the key index marker 2615, the text labels 2630 are highlighted and move towards the key index to visually inform a user of the selection of that particular key index for editing. Here, the illustration shows the same edit of FIG. 25 where the attribute value at key index 2615 is modified from an initial value of 100% to 20% at key index 2615 in segment 2605. The second segment 2610 also reflects the change in the same fashion by showing the attribute value now starting at 20% and changing to 60% between the two key indices 2615 and 2620 that define the second segment 2610 of the timing bar 2600. After releasing the key index marker 2615, the text labels return to their centered position within their respective segments and are no longer highlighted.

This illustration shows that the attribute values are changing from one value to another by displaying an arrow 2640 between the text that displays the attribute values. Some embodiments can also convey the type of transition or ease (e.g. ease out, ease in, linear) at which the attribute value changes through icons rather than displaying an arrow between the text. These icons can represent certain default or pre-set transitions that are available to the user in the media editing application. Furthermore the icon or arrow 2640 can be selectable in some embodiments, where selection of the arrow or icon reveals a context menu populated with pre-set transitions that can be applied to that particular segment.

Editing the transition, or interpolation, from a timing using other methods will be discussed in further detail in the following section.

Figure 27:
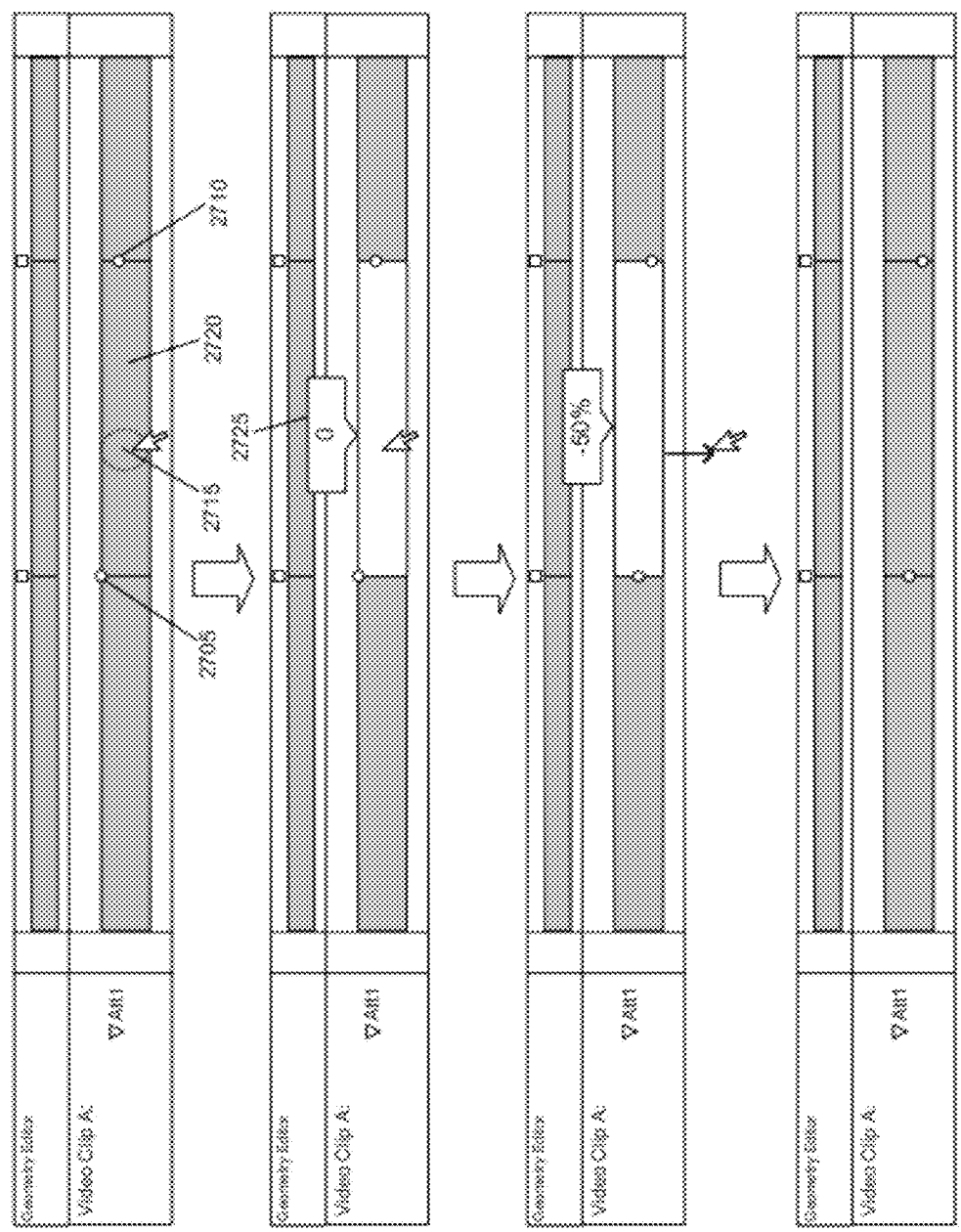
FIG. 27 illustrates modifying attribute values at two key indices through selection of a segment of a timing bar in some embodiments.

FIG. 25-26 illustrated how the attribute value at one key index can be specified. Some embodiments also allow the simultaneous modification of the value of an attribute at more than one key index, specifically the starting and ending key indices that define a segment within a timing bar or graph shape. This example is illustrated in FIG. 27. FIG. 27 shows the same timing bar of FIGS. 24-26 having an attribute value of 100% at the first key index 2705 and a value of 60% at the second key index 2710. First, the selection of an interior location 2715 of the segment 2720 is shown. This selection highlights the segment 2720 to indicate to the user that he is about to perform an edit operation on the entire segment. Previously, FIG. 21 illustrated a similar selection of a segment on the timing bar to show that the position of two key indices can be relocated to a different position in the timeline by dragging the segment left or right. In FIG. 27 the same concept applies, but instead the attribute value at each key index 2705 and 2710 is being modified by a vertical up or down movement by the cursor. Some embodiments provide the user with a keyboard control or hotkey to allow movement in only the vertical or horizontal direction to avoid the user from accidentally making edits in both the location and attribute value of each key index.

When modifying the attribute value, as illustrated, a pop-up box 2725 displays the relative change in value at each key index 2705 and 2710. Initially, the relative change is zero. When the cursor is dragged vertically in a downward direction, the pop-up box 2725 reflects the relative change at each key index. Here, the illustration shows that the attribute value has been decreased by a value of 50%. Therefore, the final position of key index 2705, which started at 100%, has changed to 50% and the value of key index 2710, which started at 60%, has changed to 10% as illustrated by the position of each key index along their respective key index maker within the timing bar.

The operations described above can also be translated in the same manner to a multi-attribute or global timing bar where the two or more attributes being represented share common key indices for a particular segment. When changing the value of multiple attributes in a similar fashion, the pop up displays 2520 and 2725 of FIG. 25 and FIG. 27 can be populated with each attribute and the current value of each attribute at that particular location.

Figure 28:
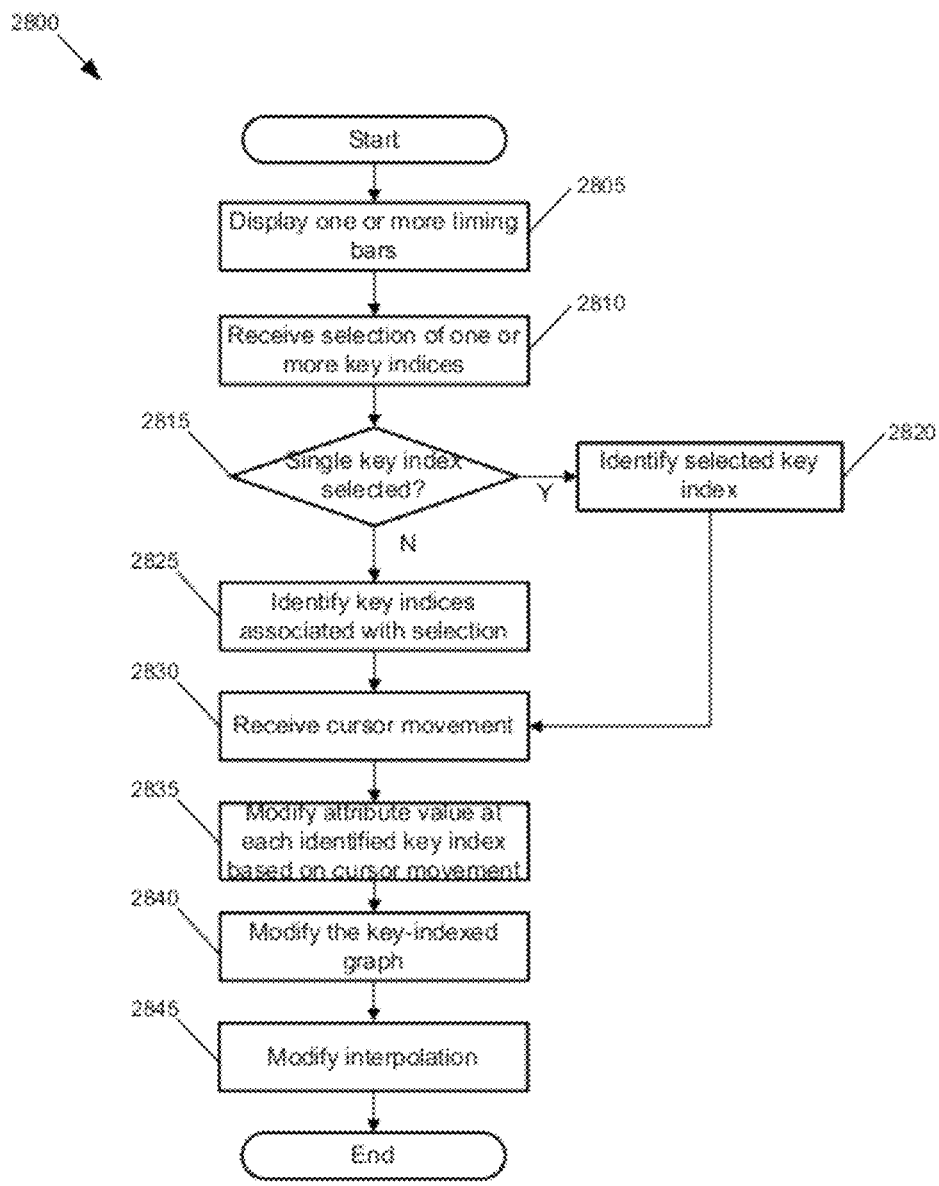
FIG. 28 illustrates a process for modifying the attribute value at a key index in some embodiments.

The preceding section described and illustrated various ways to modify attribute values at key indices. FIG. 28 conceptually illustrates a process 2800 of some embodiments for setting attribute values at one or more key indices. As shown, the process starts when it displays (at 2805) one or more timing bars in a geometry editing window of a media editing application as illustrated in all the previous figures.

The process then receives (at 2810) selection of at least one key index to set the attribute values at each key index. After receiving the selection, the process then determines (at 2815) whether the a single key index is selected as illustrated in FIGS. 25-26 as opposed to the selection of two key indices as illustrated in FIG. 27. Some embodiments make this determination based on whether a single key index or key index marker is selected or whether a segment, defined by a starting and ending key index is selected on the timing bar. When the selection corresponds to a single key index, the process then identifies (at 2820) the corresponding key index.

When the selection corresponds to multiple key indices (i.e. when a segment of the timing bar is selected), the process proceeds to 2825. The process identifies (at 2825) the key indices associated with the selected location on the timing bar. In some embodiments, the identification includes identifying the key indices that are adjacent to the selected segment of a timing bar. That is, when the selection is at a point within a timing bar between two key indices, the process identifies the key indices on either side of the selected point. This corresponds to the selection of a segment of the timing bar as illustrated in FIG. 27.

Next, the process receives (at 2830) cursor movement for the identified key indices. Based on the cursor movement, the process (at 2835) modifies the attribute value at each of the identified key indices. The process then modifies (at 2840) the key-index graph at each identified key index in accordance with the new attribute values at each key index. That is, as the attribute value at a key index is modified, the key-indexed graph is modified as well. Several examples of performing such modifications are described above by reference to FIGS. 25-27. The process also modifies (at 2845) the interpolation between key indices. For instance, in FIG. 25, the selection and movement of the key index 2540 causes the interpolation between adjacent sets of key indices to be modified. Modifying the attribute of one key index, as illustrated in FIG. 25, will modify the slope of the graph between key index 2515 and the neighboring key index before 2515 as well as the interpolation between key index 2515 and the neighboring key index after key index 2515.

One of ordinary skill in the art will realize that not all features described above for setting attribute at key indices need to be used together. Accordingly, some embodiments perform variations on the process 2800. That is, some embodiments could have one process for modifying attribute values at key indices through selection of one or more key indices and a separate process for modifying attribute values at key indices through the selection of text labels or the selection of the key-index markers on a global timing bar.

The above examples have illustrated how key indices can be relocated and how the attribute value at each key index can be modified from a timing bar. The next section will describe how the transition, or interpolation, between key indices can be directly modified from a timing bar without having to expand the timing bar into a full key-indexed graph.

D. Modifying Interpolation Between Key Indices

FIG. 29-36 illustrate examples of manipulating the transition (i.e. interpolation) between two key indices of a key-indexed graph with the use of a timing bar. Specifically, these figures illustrate (i) selection of an interpolation mode for editing interpolations using timing bars, (ii) interpolation marks for representing the speed or ease of a transition, and (iii) manipulation of the interpolation marks to affect the interpolation between two key indices.

Figure 29:
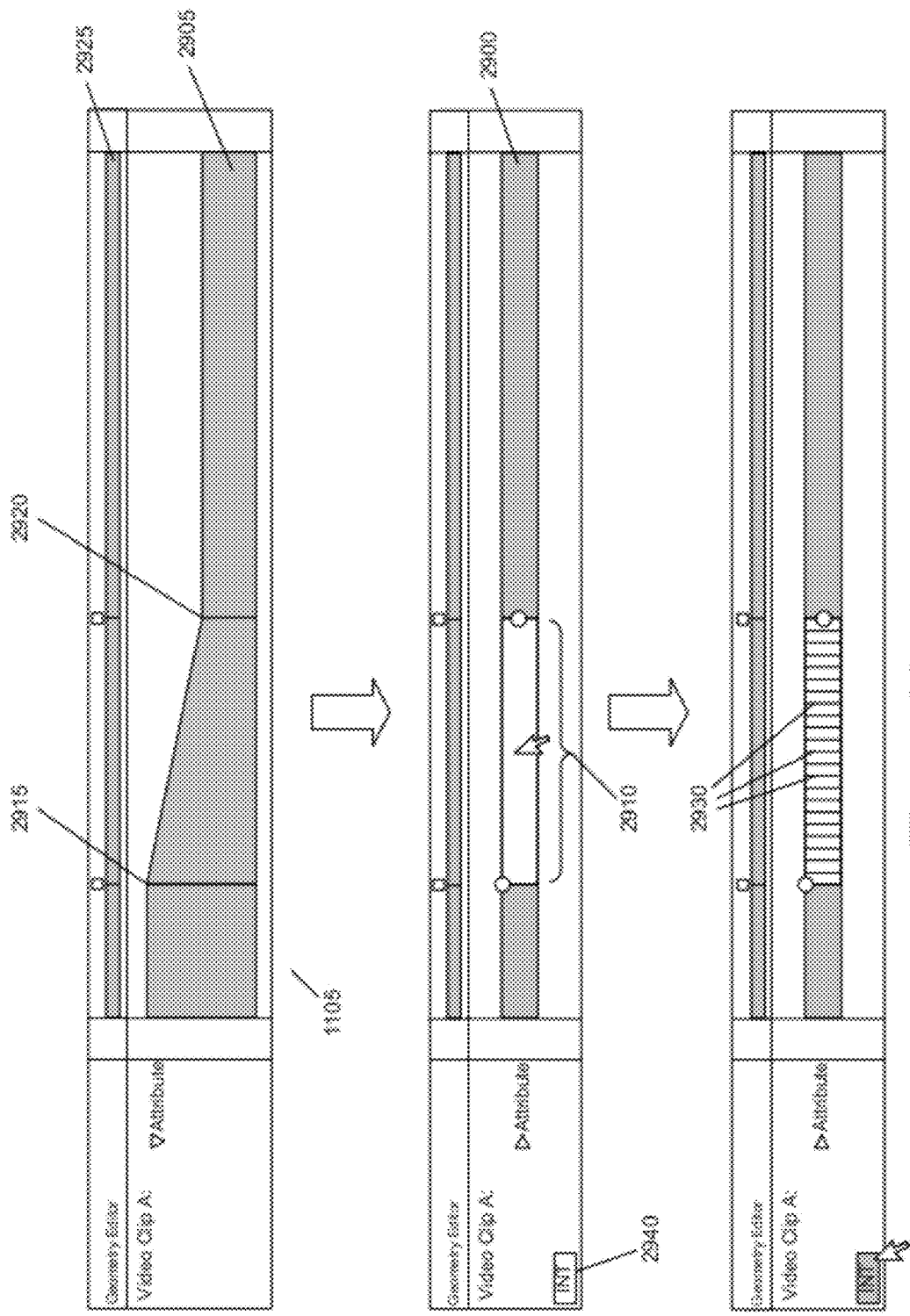
FIG. 29 illustrates interpolation mode editing for timing bars in some embodiments.

FIG. 29 illustrates a timing bar representation 2900 of a key-indexed graph 2905 with one segment 2910 selected for editing in interpolation mode. This figure includes a geometry editor widow 1105 for displaying a key-indexed graph representation 2905 or timing bar 2900, a global timing bar 2925, and an interpolation user interface (UI) item 2940. The interpolation UI item 2940 is a conceptual illustration of one or more UI items that allows the media editing application to enter a specific editing mode designed for affecting the transition of an attribute between two key indices. Different embodiments implement this UI differently. For instance, some embodiments implement it as an interpolation mode button, others as an interpolation mode command that can be selected in a pull-down or drop-down menu, and still others as an interpolation mode command that can be invoked through one or more keystroke operations.

Initially, FIG. 29 shows a key-indexed graph 2905 having two key indices 2915 and 2920. The graph 2905 is then collapsed into a timing bar 2900. Within the timing bar 2900, the segment 2910 defined by the key indices 2915 and 2920 is selected. Finally, the interpolation mode UI item 2940 is selected as indicated by the shading of UI item 2940. Initiating interpolation mode editing does not need to be invoked after the selection of a particular segment. Starting the interpolation editing mode can be invoked by a user anytime before selection of a segment as the user can freely choose any desired segment to edit once interpolation editing has been activated.

After a particular segment has been selected for editing in interpolation mode, several vertical lines (i.e. interpolation marks) 2930 are displayed. These marks convey the speed or ease at which the attribute value is changing over the duration of the segment. Some embodiments represent a slow, gradual change in attribute value with larger spacing between lines and a fast, swift change in attribute value with smaller spacing between each vertical line. As illustrated in the figures of this section, other embodiments may represent the speed of change in an opposite way by displaying faster, swift change in attribute value with larger spacing between lines and a slow, gradual change in attribute value with smaller spacing between each vertical line. Editing the transition between key indices in interpolation mode will now be illustrated by reference to FIGS. 30-34 which show a progression of multiple interpolation mode edits and its effect on the key-indexed graph.

Figure 30:
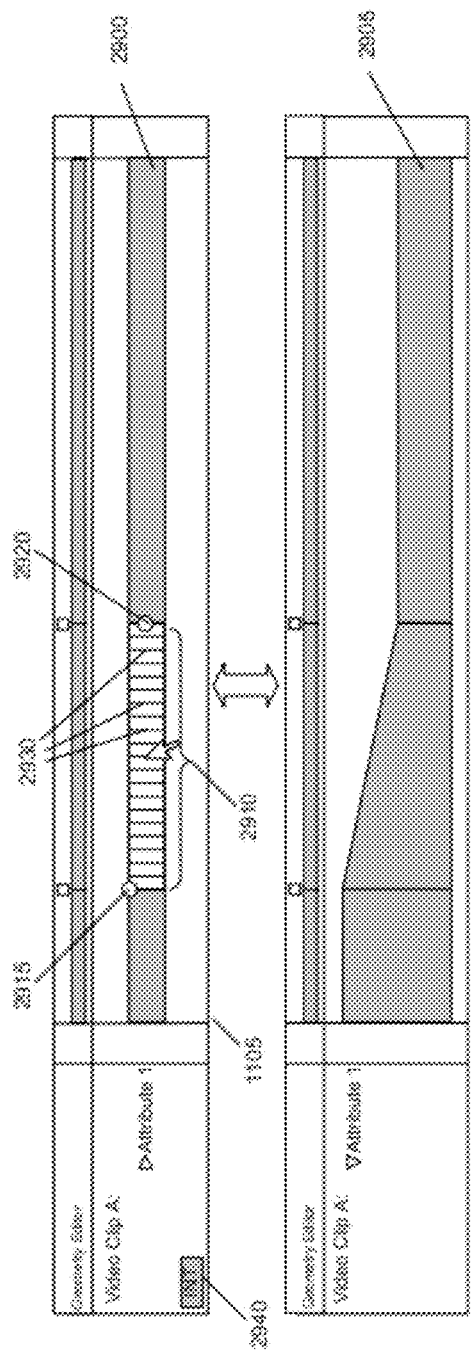
FIG. 30 illustrates interpolation marks for representing the interpolation between two key indices in some embodiments.

FIG. 30 shows the geometry editing window 1105 in interpolation mode, as indicated by the shaded interpolation UI item 2940, with the timing bar 2900 of FIG. 29 having segment 2910 selected. This figure, as well as each subsequent figure in this section, shows the timing bar 2900 expanded to illustrate the equivalent key-indexed graph 2905 and the modified transition between key indices 2915 and 2920. Here, the interpolation marks 2930 are evenly spaced representing a consistent change in attribute value, specifically a linear transition. The linear transition between key indices 2915 and 2920 is visually illustrated by the linear slope between the two key indices 2915 and 2920 in the key-indexed graph 2905.

Figure 31:
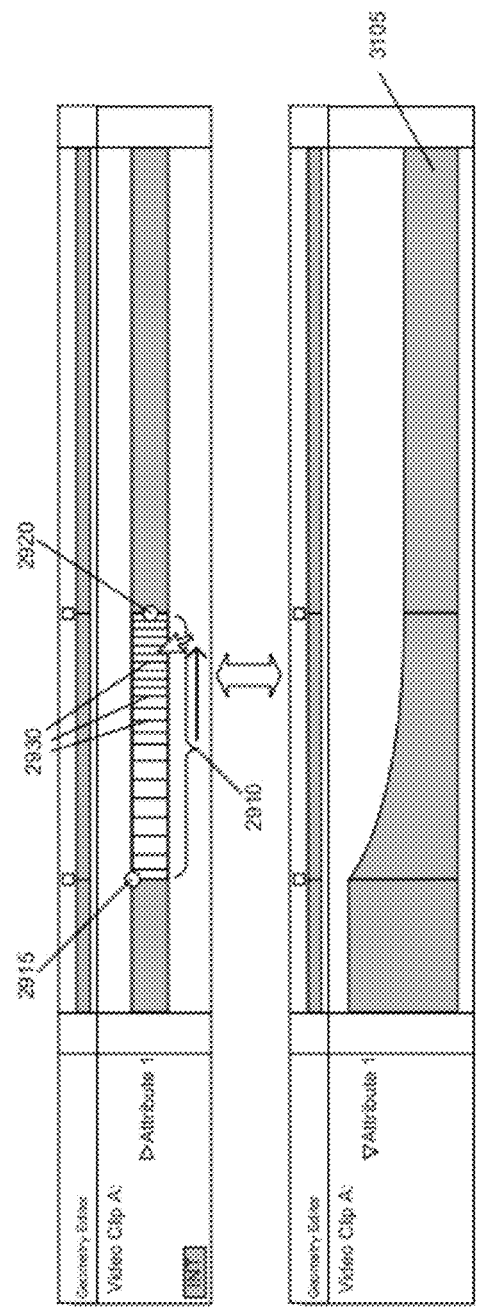
FIG. 31 illustrates modification of the interpolation between two key indices for a single attribute using interpolation marks on a timing bar for a single attribute in some embodiments.

FIG. 31 illustrates manipulation of the interpolation marks 2930 to create a non-linear transition between key indices 2915 and 2920. Here, the cursor has performed a click and drag movement within the segment 2910. Moving the cursor to the right squeezes the interpolation marks 2930 together, which, in this embodiment, represents a slower transition in the attribute value. In particular, the first edit illustrated in this figure represents an ease-out transition where the change in attribute value decreases in speed as it approaches the second key index 2920. The ease out transition between key indices 2915 and 2920 is visually illustrated in the key-indexed graph 3105.

Figure 32:
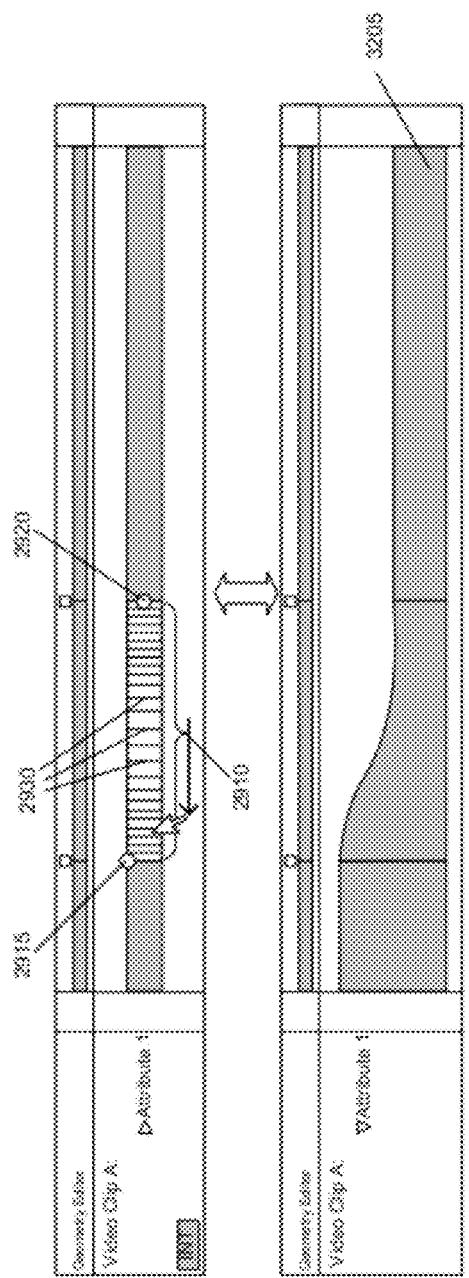
FIG. 32 illustrates further modification of the interpolation between two key indices using interpolation marks on a timing bar in some embodiments.

FIG. 32 continues from FIG. 31 and illustrates a second edit to the transition of the attribute between key indices 2915 and 2920. Here, the cursor has clicked the middle of the segment 2910 and dragged to the left creating an ease-in transition. This edit combines the ease-out transition from FIG. 31 with an ease-in transition to slow down the change in attribute values at the beginning and before the end of the transition over the duration of the segment 2910. The interpolation marks 2930 convey the ease-both transition by showing the marks squeezed together at towards the beginning and end of the segment 2910. The ease-both transition between key indices 2915 and 2920 is visually illustrated in the key-indexed graph 3205.

Figure 33:
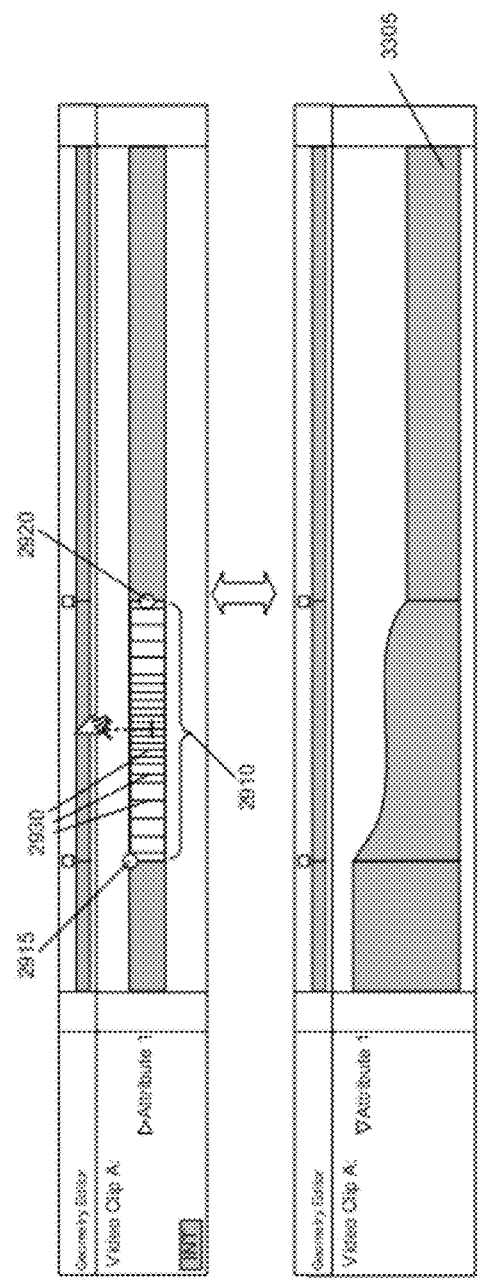
FIG. 33 illustrates accelerating and decelerating the interpolation between two key indices using interpolation marks on a timing bar in some embodiments.

FIG. 33 illustrates one further interpolation edit using interpolation marks. Here, the cursor has selected the middle of the segment 2910 and dragged the cursor up. An up and/or down cursor movement can accelerate and/or decelerate the speed of change in the attribute value. The operation illustrated here accelerates the transition at the beginning and towards the end of the segment 2910 while decelerating the change in value in the middle of the segment 2910. This is reflected by interpolation marks being closer together in the center and more spread apart towards each key index 2915 and 2920. The change in transition between key indices 2915 and 2920 is visually illustrated in the key-indexed graph 3305.

In FIGS. 30-33, the selected internal location of the segment 2910 was horizontally halfway in between key indices 2915 and 2920 and the ease of transition throughout the entire segment was modified equally. In some embodiments, the amount of modification to the transition is weighted depending on the location of the internal selection point on the segment. For instance, when the selection point is closer to a first key index than a second key index, the transition near the first key index will be modified by a greater amount than at the second key index.

Figure 34:
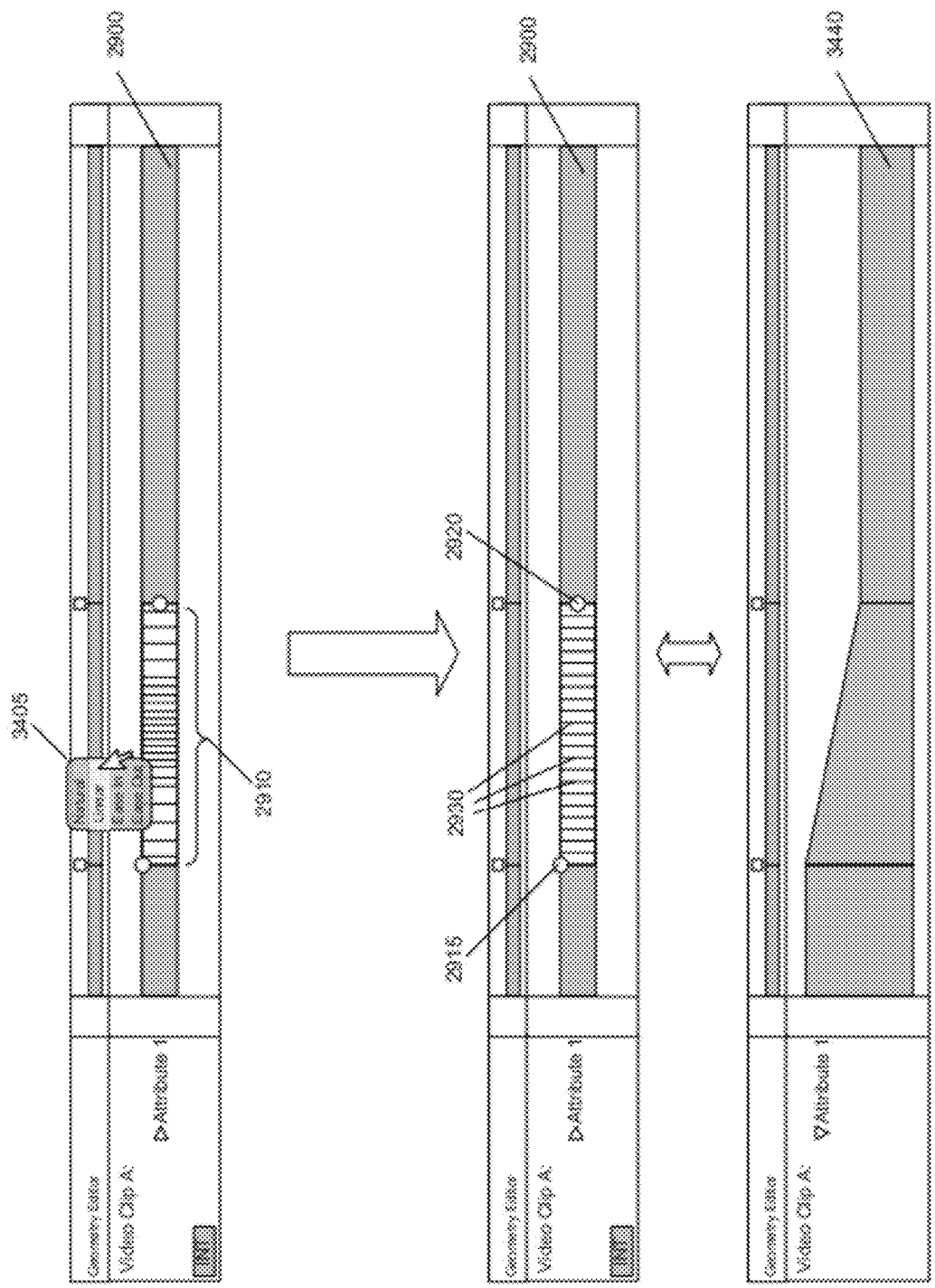
FIG. 34 illustrates application of a pre-set interpolation from a timing bar in some embodiments.

FIG. 34 illustrates the application of a pre-set transition from the timing bar 2900 in interpolation mode. Here, a user performs a control-click or right-click within the segment 2910 to reveal a context menu 3405 to display the different pre-set transitions available. In this example, a linear transition has been selected from the context menu 3405. Selection of a pre-set transition will replace all user edits in regards to the transition and instead use the pre-set transition selected. After selection of the linear transition, the interpolation marks 2930 become evenly spaced to represent the same linear progression within the segment 2910. The change in transition is visually illustrated in the key-indexed graph 3440 with a linear slope between key indices 2915 and 2920.

Figure 35:
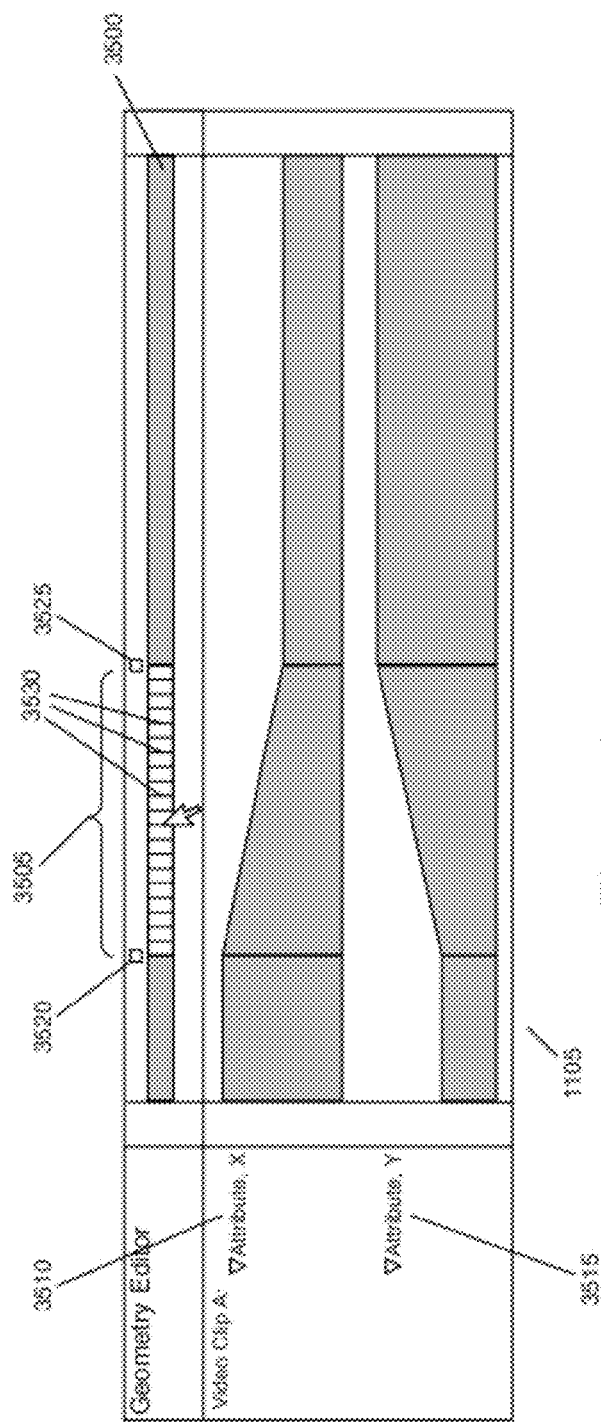
FIG. 35 illustrates interpolation mode editing from a global timing bar in some embodiments.
Figure 36:
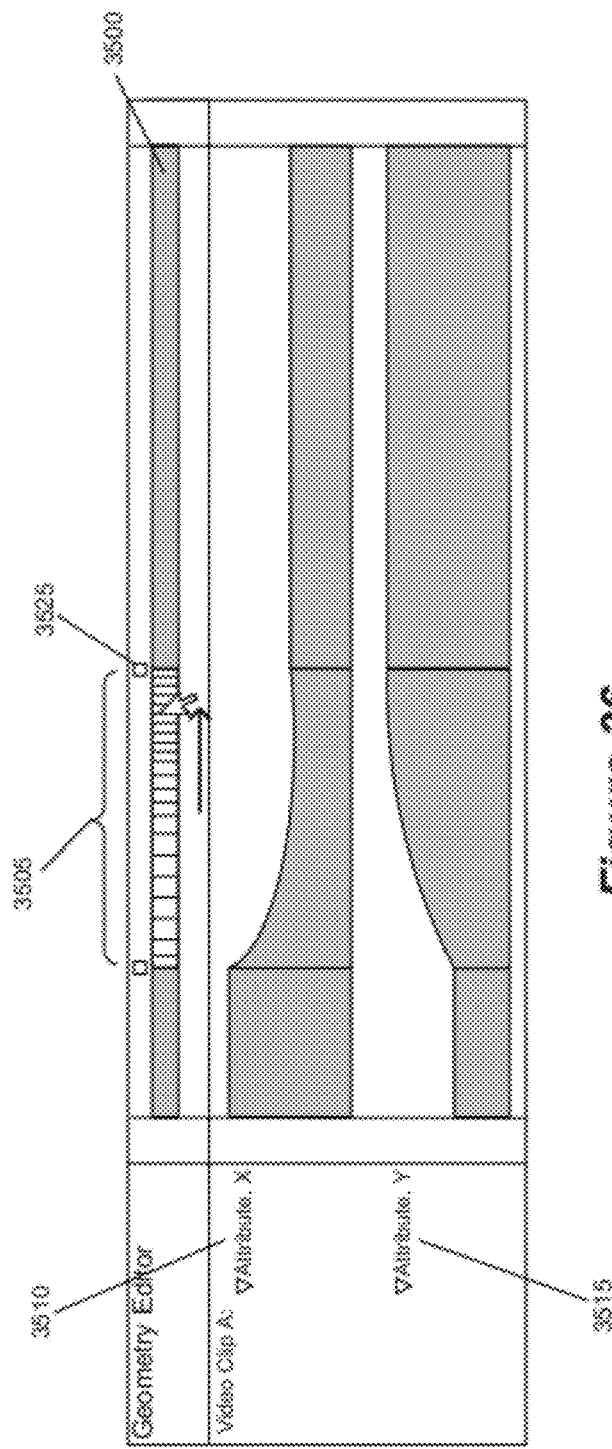
FIG. 36 illustrates modification of the interpolation between two key indices for multiple attributes using interpolation marks on a global timing bar in some embodiments.

Some embodiments allow editing a transition between two key indices in for two or more attributes. Such an edit would take place in within a multi-attribute timing bar or the global timing bar. An example of such an edit is illustrated in FIGS. 35 and 36. FIG. 35 illustrates segment 3505 on the global timing bar 3500 in interpolation mode. This could just as well be a multi-attribute timing bar in the geometry editing window where Attribute X 3510 and Attribute Y 3515 are grouped together. For simultaneous editing of a transition between two key indices of multiple attributes, it is essential that the attributes share common key indices so a transition can be applied uniformly over the shared duration. There is no need for the multiple attributes to share common attribute values since the transition only affects the speed of the transition between a starting and ending key index. Here, both attributes 3510 and 3515 share key indices 3520 and 3525, therefore the media editing application will allow a user to enter interpolation mode for that selected segment 3505 as illustrated by the interpolation marks 3530 in FIG. 35. As shown, both attributes 3510 and 3515 currently have a linear transition between the shared key indices 3510 and 3515.

FIG. 36 illustrates the same ease out modification of FIG. 31 applied from the global timing bar 3500 for two attributes 3510 and 3515. Here, the center of the segment 3505 is selected and dragged towards the ending key index 3525. As illustrated, the values for both attributes 3510 and 3515 change slower towards the ending key index as illustrated by the key-indexed graph.

Figure 37:
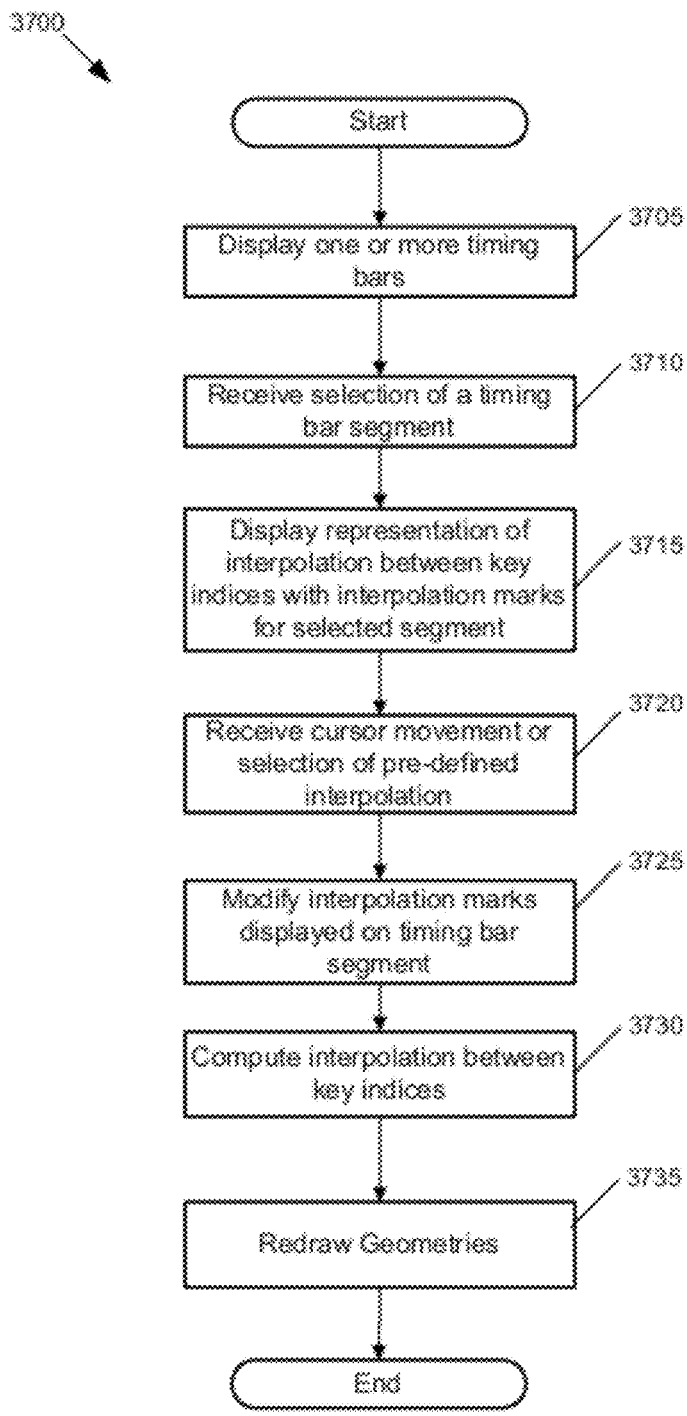
FIG. 37 illustrates a process for editing the interpolation between two key indices on a timing bar in an interpolation editing mode in some embodiments.

Having described editing the interpolation of an attribute between two key indices from a timing bar, FIG. 37 illustrates a process 3700 that some embodiments perform when modifying the interpolation between two key indices using interpolation marks on a timing bar. FIG. 37 will be described by reference to the examples that were described above in FIGS. 29-34. In some embodiments, the process of FIG. 37 starts after the interpolation mode editing has been enabled by a user.

In some embodiments, the process of FIG. 37 initially displays (at 3705) one or more timing bars in the media editing application. For example, in FIG. 29, the key-indexed graph 2905 is collapsed into a single attribute timing bar 2900 in the geometry editing window 1105.

Next, the selection of a segment of the timing bar is received (at 3710). A segment is defined by a starting and ending key index. As illustrated in FIG. 29, the selected segment 2910 is highlighted and defined by the starting key index 2915 and an ending key index 2920. After a segment has been selected, the process displays (at 3715) several vertical interpolation marks that span the selected segment of the timing bar. As illustrated in FIG. 29, the interpolation editing mode has not been enabled until after the selection of segment. The interpolation marks appear on the selected segment in interpolation editing mode, and it would be apparent to one skilled in the art that the enabling the interpolation editing mode can occur anytime before or after the selection of a desired segment.

Once a segment of the timing bar is displaying the interpolation marks, the process continues (at 3720) with the user manipulating the interpolation marks with click and drag cursor movements. Several different cursor movements within the segment 2910 were illustrated in FIGS. 30-33. For example, a user can click on any interior section of the segment and drag the cursor in any direction (i.e. up, down, left, or right). Furthermore, as illustrated in FIG. 34 a pre-set interpolation can also be applied in lieu of manually editing the interpolation marks.

Interacting with the interpolation marks 2930 in the process 3700 will modify (at 3725) the distance between each interpolation mark within the segment as illustrated in FIGS. 30-33. Applying a pre-set interpolation, as illustrated in FIG. 34, will similarly modify the distance between the interpolation marks. As previously described, the distance between each mark represents the speed at which the attribute value is changing over the duration. Accordingly, the process will compute (at 3730) the interpolation between the two key indices that define the segment with respect to the manipulation of the interpolation marks. After computing the interpolation, the process will (at 3735) redraw the key-indexed geometries for that particular segment to correspond with the computed interpolation.

Editing the interpolation between two key indices on a key-indexed graph was cumbersome before such an interpolation editing mode on a timing bar. Previously, a user created a curve, or interpolation, on the graph representing the value of an attribute through manipulation of key index control points to achieve a desired curve between two key indices. With interpolation mode editing on a collapsed representation of a key-indexed graph, a user can easily interact and receive visual feedback of the interpolation or curve between two key-indices without having to interact with an attribute graph. Accordingly, this novel feature allows greater ease when editing the interpolation between two key indices.

While all the examples described by reference to FIGS. 2-36 have illustrated editing key-indexed geometries, other permutations are possible. For instance, many collapsed geometric representations of key index geometries are describe by reference to single-attribute timing bars, multi-attribute timing bars, and global timing bars. However, for cases where the duration these bars span is defined over a frequency, similar bars would be characterized as frequency timing bars. Moreover, although the collapsed representations are shown as bars, any type of collapsed representation (e.g. a line) that would provide similar features can be used. Thus, the scope of the invention should be analyzed by reference to the claims.

VI. Applying Presets on Key-Indexed Graphs

As mentioned above, the media editing application of some embodiments provides thumbnails, thumbnails with text descriptions, and/or text-defined operations that represent presets for modifying key indices and/or interpolation between the key indices. Several examples of such presets will now be described by reference to FIGS. 38-51.

A. Modifying Interpolation Using Presets

Figure 38:
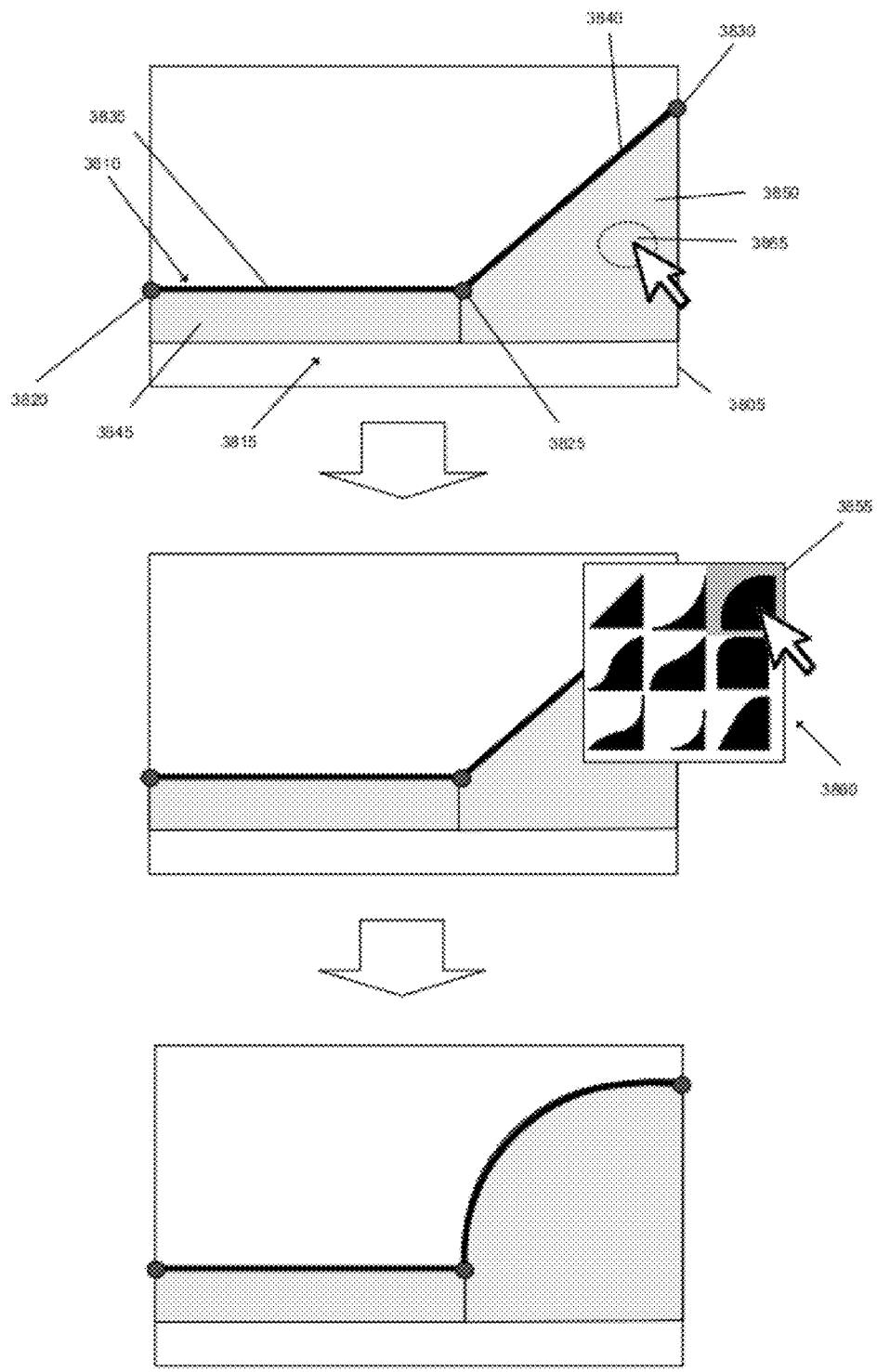
FIG. 38 illustrates modifying an interpolation between two key indices by selecting a thumbnail representation of a predefined interpolation.

FIG. 38 illustrates modifying an interpolation between two key indices by selecting a thumbnail representation of a predefined interpolation. In this example, a geometry editor 3805 displays a key-indexed graph 3810. The key-indexed graph 3810 represents an attribute of a media item over a duration and is defined by three key indices 3820-3830. Specifically, the key index 3825 defines a parallel segment 3835 along with the key index 3820, and also defines a sloped segment 3840 along with the key index 3830. To further express the change in the attribute over the duration, the geometry editor 3805 also displays a shape. The shape is defined by the key-indexed graph 3810. Specifically, the parallel segment defines a section 3845 of the shape to be rectangular, while the sloped segment defines a section 3850 of the shape to be trapezoidal.

As shown in FIG. 38, a cursor selection of a thumbnail 3855 from a preset window 3860 initiates the modification of the interpolation between the key indices 3825 and 3830. Specifically, the user selects (e.g., through a cursor click operation) an interior location 3865 within the trapezoid section 3850. When the user selects the interior location 3865, the user is presented with the preset window 3860. This preset window lists several thumbnails that represent different predefined interpolations. The user then selects the thumbnail 3855, which causes the interpolation between the key indices 3825 and 3830 to be modified. As a result of the modification, new attribute values are interpolated in between the key indices 3825 and 3830. This change in attribute values (i) causes the sloped segment 3840 to be curved and (ii) causes the section 3850 of the shape to be partially round.

In some embodiments, the media editing application provides thumbnails that display the change in attribute over a duration (e.g., time duration, frequency duration) using shapes. For instance, in FIG. 38, instead of displaying thumbnails of different line graphs, the preset window 3860 displays thumbnails of different shapes. As shown, each particular thumbnail not only provides a visual indication of the change in attribute values but also provides a visual indication of how the section 3850 of the key-indexed shape 3815 may appear when the particular thumbnail is selected.

Figure 39:
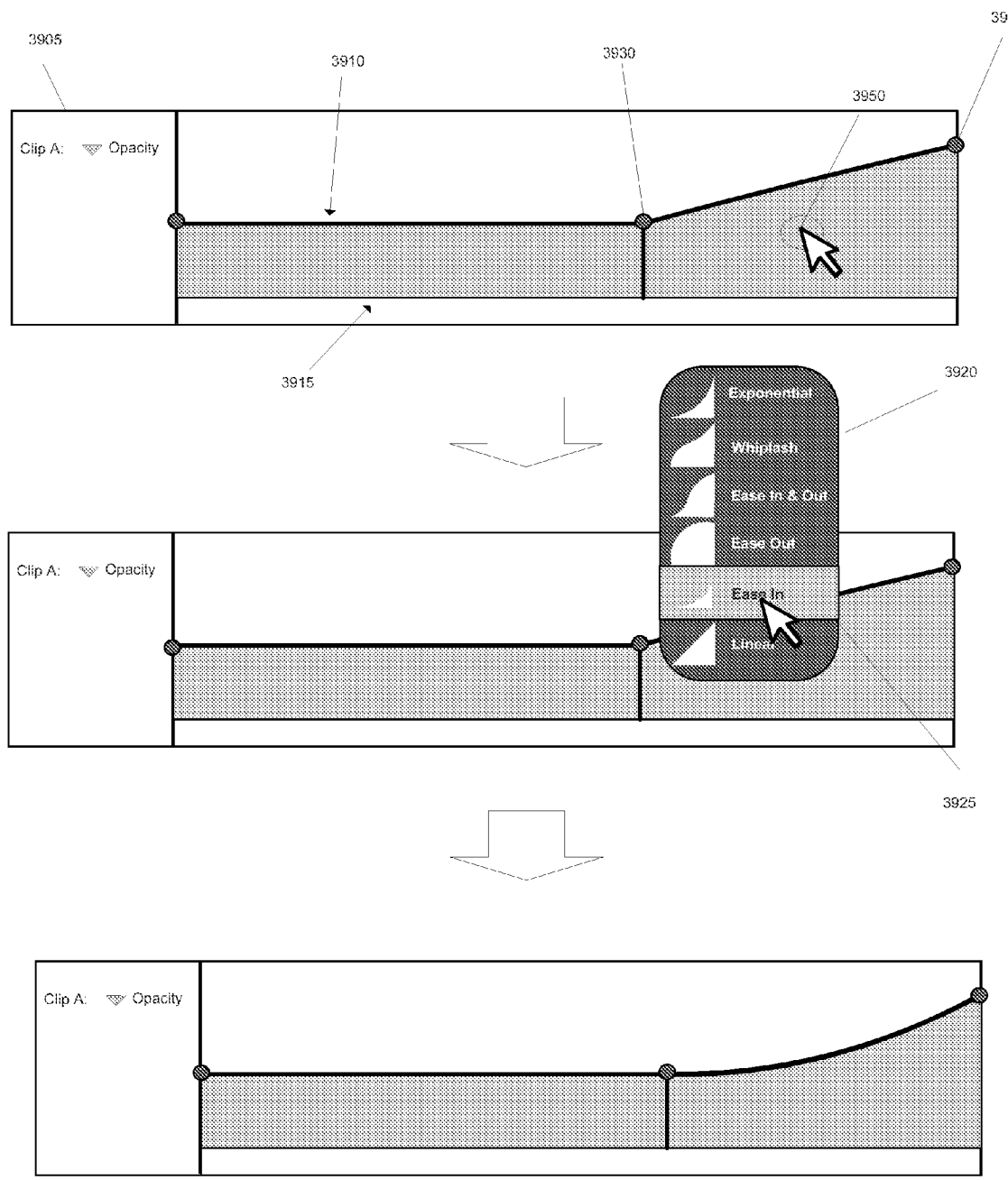
FIG. 39 illustrates modifying an interpolation between two key indices by applying an interpolation preset that is represented by both thumbnail and text.

In the previous example, several interpolation presets are represented by user-selectable thumbnail images. FIG. 39 illustrates modifying an interpolation between two key indices by applying an interpolation preset that is represented by both thumbnail and text. In this example, a geometry editor 3905 displays a key-indexed graph 3910 and shape 3915 that represent an opacity attribute of a video clip over a duration.

As shown in FIG. 39, a cursor selection of a thumbnail with text description 3925 from a preset window 3920 causes the interpolation between the key indices 3930 and 3935 to be modified. In particular, when a user selects (e.g., through a cursor click operation) an interior location 3950 within the shape 3915, the user is presented with the presets window 3920. Similar to the example described above, this preset window 3920 displays thumbnails of shapes that represent different interpolation presets. However, instead of displaying only the thumbnails, the preset window 3920 also lists descriptive text with each of the thumbnails. For instance, the preset window 3920 lists several of the interpolation presets as "exponential", "whiplash", "ease out", "ease in", "linear", etc. Once the preset window is displayed, the user then selects the "ease-in" preset in order to modify the interpolation between key indices 3930 and 3935.

In the example described above, the preset window lists several interpolation presets for modifying the interpolation of the opacity attribute of the video clip. Some embodiments provide different presets for different attributes. For instance, in some such embodiments, a preset window might display one set of presets for a scale attribute of a video clip, and another different set of presets for a position attribute of the video clip or a volume level attribute of an audio clip.

In some embodiments, the media application might provide a different default preset selection for different attributes. For instance, in FIG. 39, instead of scrolling down the list of presets to select the "ease in" preset, the "ease in" preset might be a default preset selection for the scale attribute and/or presented as a first selectable item in the list of presets. Alternatively, or conjunctively, some embodiments might allow the user to define the default preset selection through a preset option window and/or automatically define the default preset selection based on usage. For instance, in FIG. 39, when the user subsequently modifies a scale attribute of another video clip, the preset window 3925 might list the "ease in" preset as the default preset selection.

Figure 40:
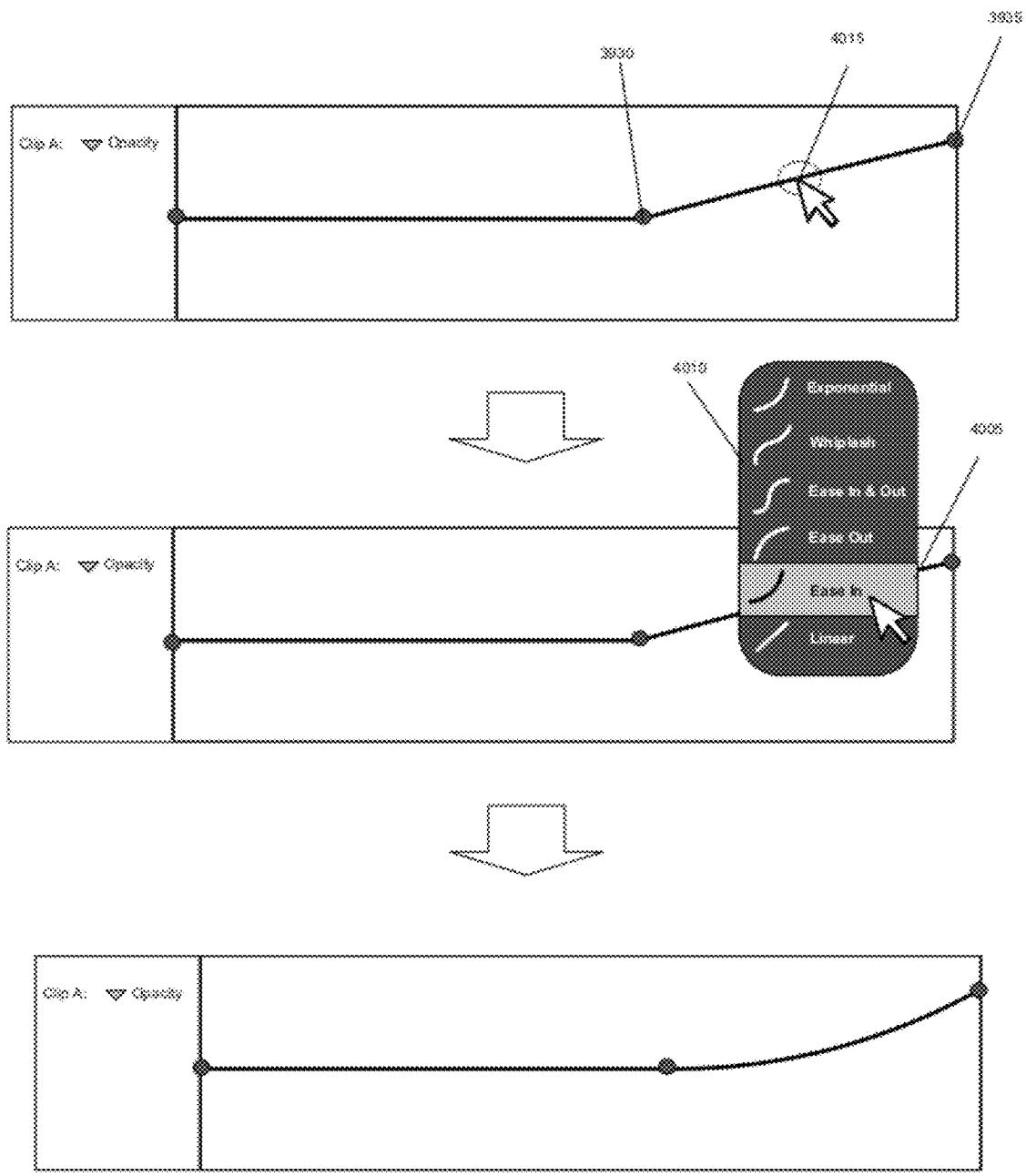
FIG. 40 illustrates modifying an interpolation between two key indices by applying an interpolation preset by manipulating a key-indexed graph.

In the previous two examples, the geometry editor displays a shape in order to express a change in the attribute values over a duration. Also, a preset window displays thumbnails that describe the change in relation to such shape. In some cases, the media editing application may not use such shape to express the change in attribute value and may only rely on a key-indexed graph that is defined in relation to key indices and interpolation between the key indices. For such approach, some embodiments still provide thumbnails and/or text that represent predefined operations. One such example is illustrated in FIG. 40. This figure is identical to the example illustrated in FIG. 39, with the exception of the shape 3915 that is not displayed in the geometry editor 3905.

As shown in FIG. 40, a user's selection of thumbnail and text 4005 from a preset window 4010 initiates the modification of the interpolation between key indices 3930 and 3935. Specifically, to display the preset window 4010, the user selects a part 4015 of the graph (e.g., a point along the graph) in between the key indices 3930 and 3935. Unlike the preset windows described above, this preset window 4010 displays thumbnails of several different lines (i.e., curved and straight lines) that represent the interpolation presets. The preset window 4010 also lists descriptive text for each of the interpolation presets. Similar to the example described above, once the preset window 4010 is displayed, the user then selects an "ease-in" preset to modify the interpolation between key indices 3930 and 3935.

Figure 41:
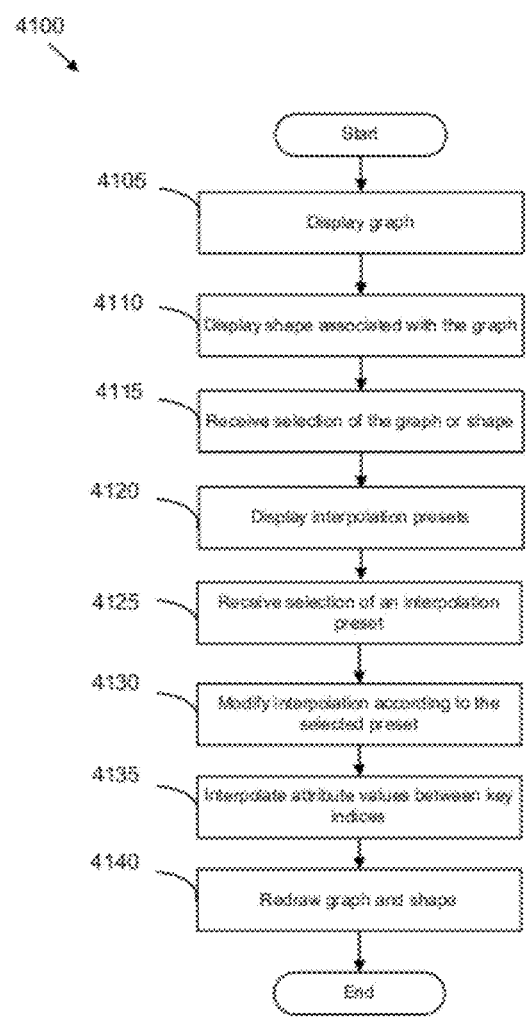
FIG. 41 conceptually illustrates a process of some embodiments for modifying the interpolation using a preset.

The preceding section described and illustrated various ways to modify an interpolation between key indices using interpolation presets. FIG. 41 conceptually illustrates a process 4100 of some embodiments for modifying the interpolation using a preset. The process 4100 is performed by a media editing application in some embodiments. As shown, the process displays (at 4105) a key-indexed graph. Several examples of displaying such key-indexed graph are described above by reference to FIGS. 38-40.

The process then displays (at 4110) a shape associated with the key-indexed graph. One example of such shape is the shape underneath the graph shown in FIG. 39. The process then receives (at 4115) selection of the graph or shape. Next, the process displays (at 4120) a list of interpolation presets. In some embodiments, the interpolation presets are represented as thumbnails, thumbnails with text descriptions, and/or text-defined operations.

Once the list of presets is displayed, the process receives (at 4125) selection of an interpolation preset from the list of presets. The process then modifies (at 4130) the interpolation between key indices in accordance with the selected preset. The process then (at 4135) interpolates attribute values between key indices. After interpolating the attribute values, the process redraws (at 4140) the key-indexed graph and shape. Several examples of redrawing key-indexed graphs and/or shapes are illustrated in FIGS. 38-40. The process then ends.

One of ordinary skill in the art will realize that not all features for modifying an interpolation between key indices using a preset need to be used together. Accordingly, some embodiments perform variations on the process. For example, in some embodiments, the media editing application might not use a shape to express the change in attribute value and may only rely on a key-indexed graph, or vice versa. Hence, in some such embodiments, the process may not display the shape or graph and receive its selection. Furthermore, in some embodiments, the operations of process might be performed by two or more separate processes. For instance, some embodiments may have one or more processes for displaying and redrawing the graph or shape, and a separate process for modifying interpolation when an interpolation preset is selected.

B. Modifying Attribute Values at Key Indices Using Presets

Figure 42:
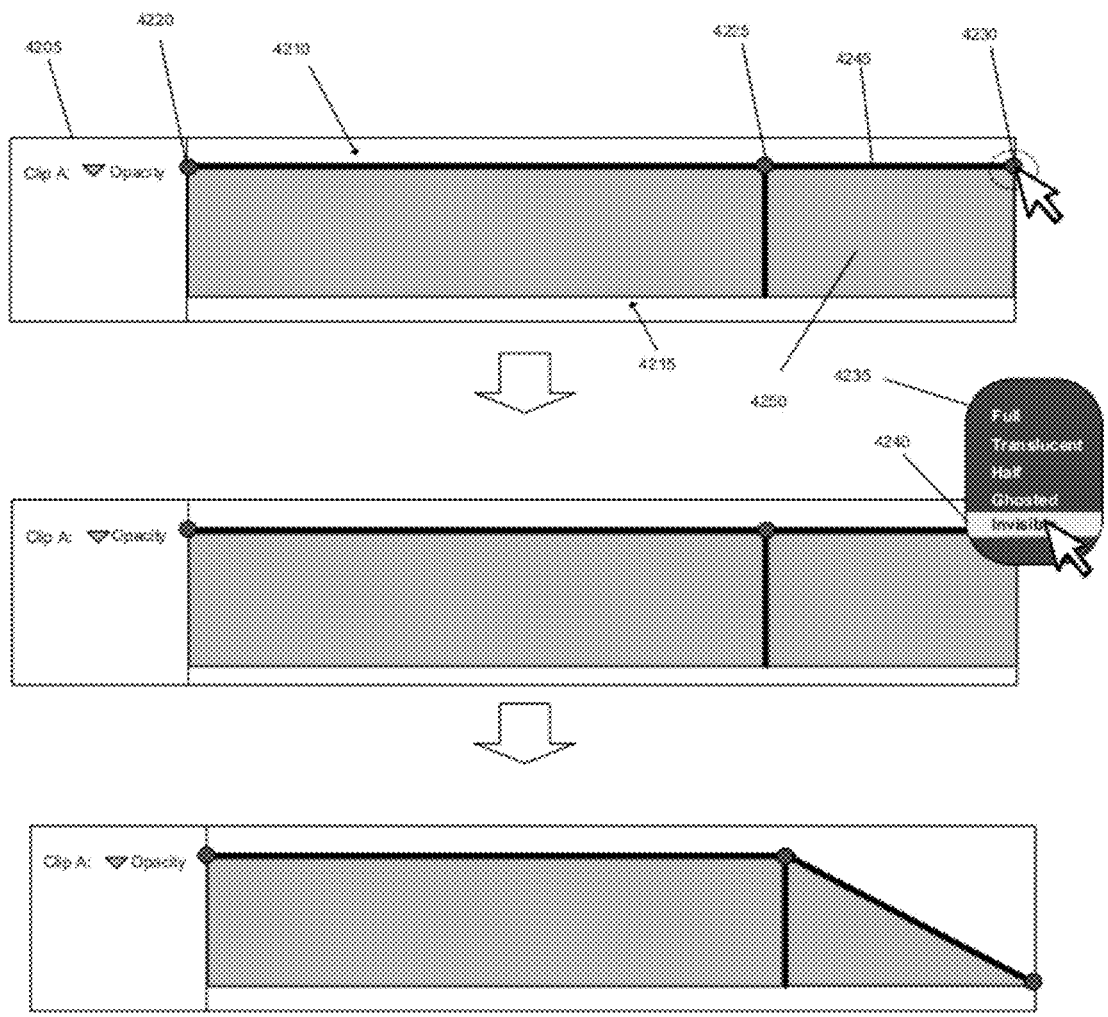
FIG. 42 illustrates modifying an attribute value at one key index by selecting text that represents a predefined attribute value
Figure 43:
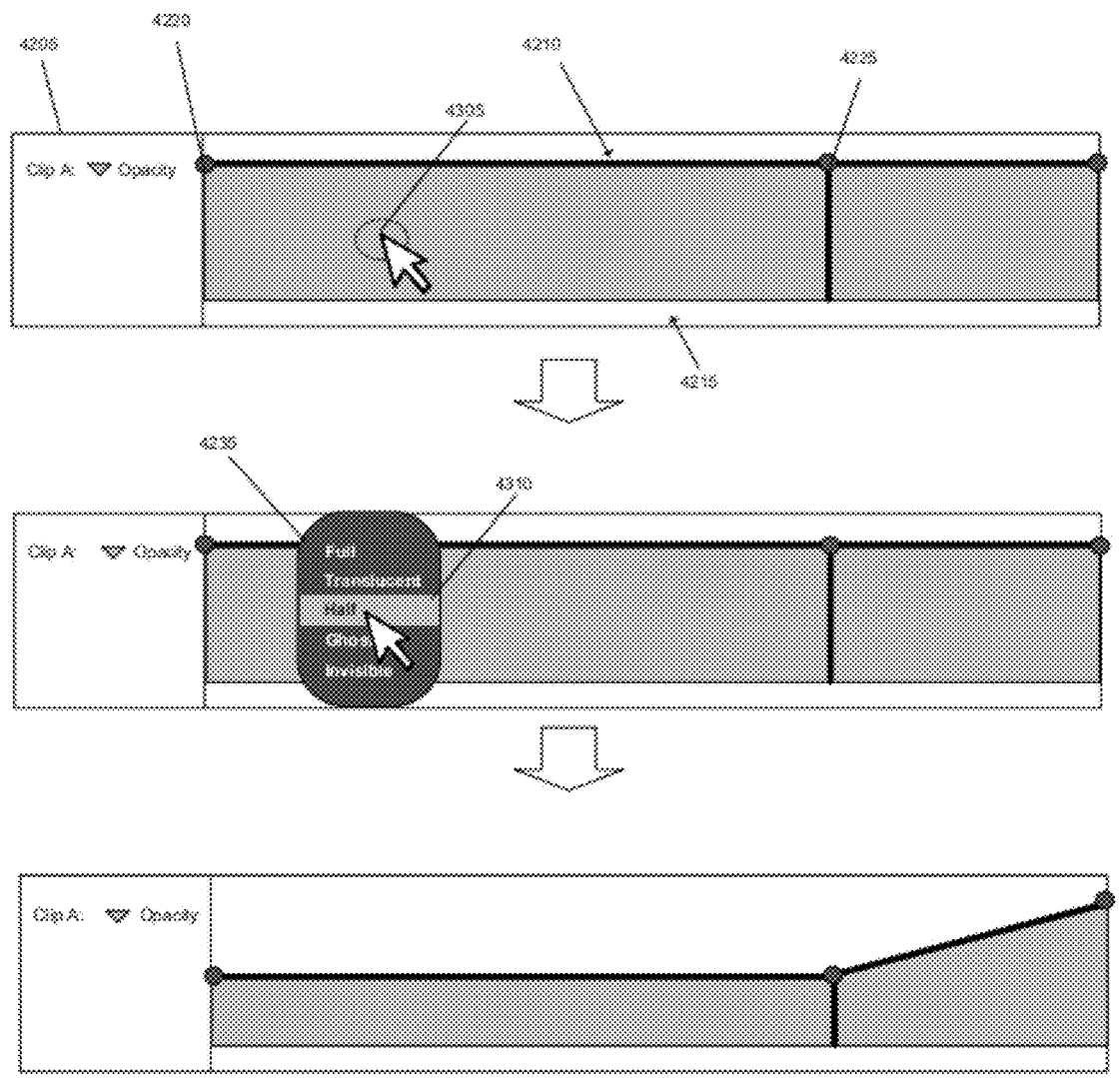
FIG. 43 illustrates modifying attribute values at multiple key indices by selecting text that represents a predefined attribute value.
Figure 44:
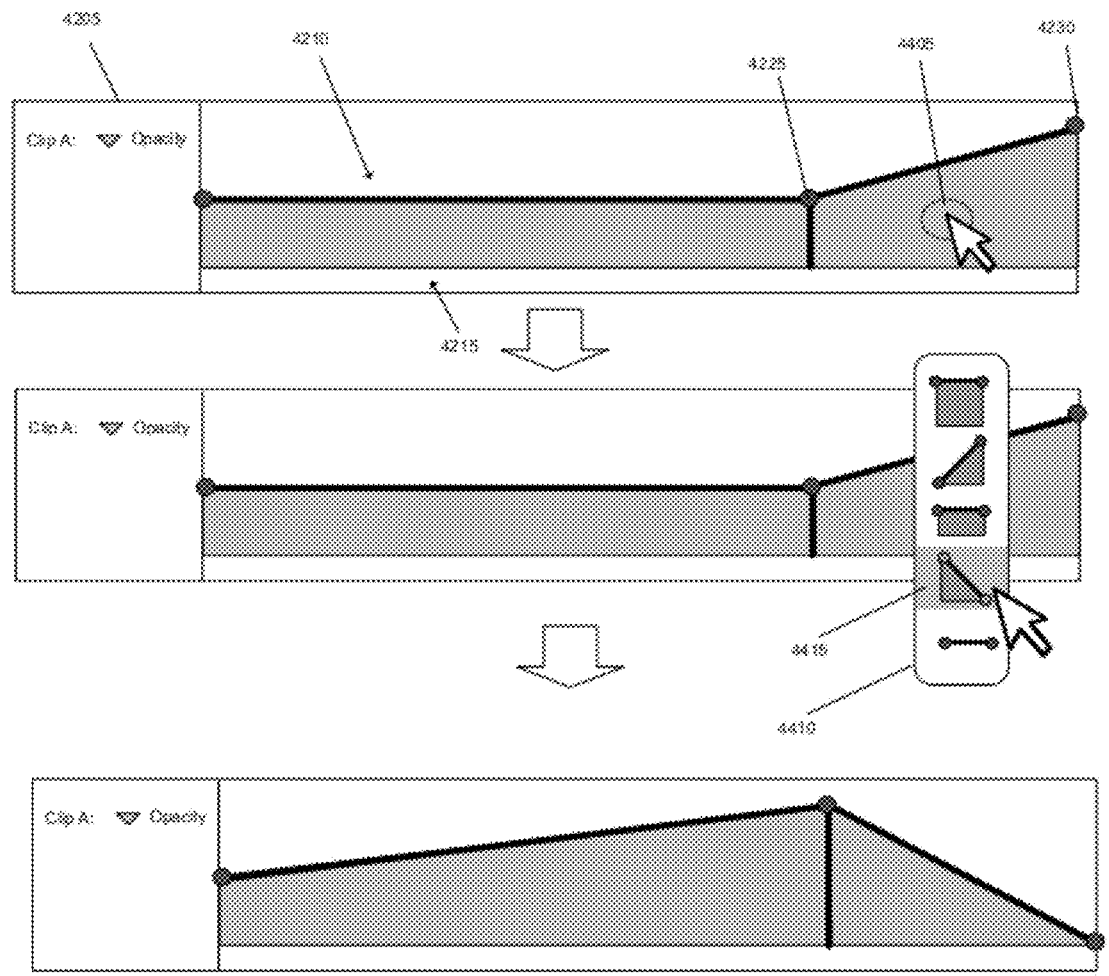
FIG. 44 illustrates assigning different attribute values to two key indices by selecting a thumbnail.

FIGS. 42-44 provide several illustrative examples of modifying attribute values at key indices using presets. Specifically, these figures illustrate specifying the attribute values at the key indices by selecting thumbnail and/or text that represent one or more predefined attribute values. In these examples, a geometry editor 4205 displays a key-indexed graph 4210 and shape 4215 that represent an opacity attribute of a video clip over a duration.

FIG. 42 illustrates modifying an attribute value at one key index by selecting text 4240 that represents a predefined attribute value. As shown, when a user selects (e.g., through a cursor click operation) the key index 4230, the user is presented with a preset window 4235. The preset window includes several selectable text that represent different attribute values. The user then selects text 4240 which causes the opacity value at the key index 4230 to fall to a value that equals "invisible" (e.g., the value 0). As a result of the modification to the attribute value at the key index 4230, new attribute values are interpolated between the key indices 4225 and 4230. This change in attribute values causes a segment 4245 to have a negative slope and also causes a rectangular section 4250 of the shape 4215 to become a triangular.

The text-defined operation described above causes an attribute value at one key index to be modified. In some embodiments, the media editing application allows the user to modify attribute values at multiple key indices by selecting one preset. One such example is illustrated in FIG. 43. In this example, instead of selecting any key index, the user selects the shape 4215 in order to designate two key indices 4220 and 4225 for modification. Specifically, the user makes the designation by selecting (e.g., through a cursor click operation) an interior location 4305 within the shape in between the two key indices 4220 and 4225. Alternatively, or conjunctively, some embodiments allow the user to designate several key indices for modification by directly selecting a part of the graph (e.g., a point along the graph) in between the two key indices 4220 and 4225.

As shown in FIG. 43, a cursor selection of text 4310 from the preset window 4235 causes the attribute values at the two key indices 4220 and 4225 to be modified. Specifically, to modify the attribute values, a user first selects the interior location 4305 which causes the preset window 4235 to appear on the geometry editor 4205. The user then selects the text 4310 labeled "half", which causes the attribute value at the two key indices 4220 and 4225 to be set at 50% opacity.

In the example described above, the selection of a preset modifies two key indices 4220 and 4225 by assigning each of the key indices a same attribute value. In some embodiments, the media editing application provides presets that assign different attribute values to different key indices. FIG. 44 illustrates assigning different attribute values to the two key indices 4225 and 4230 by selecting a thumbnail 4415. In this example, a cursor selection of an interior location 4405 of the shape causes a preset window 4410 to appear on the geometry editor 4205. The preset window 4410 displays several thumbnails that represent predefined attribute values at multiple key indices. For instance, a thumbnail 4415 represents predefined attribute values of 100% opacity for one key index and 0% opacity for another key index. After displaying the preset window 4410, the user then selects the thumbnail 4415. The selection of the thumbnail causes the attribute value at the key index 4225 to be set at 100% opacity, while causing the attribute value the key index 4230 to be set at 0% opacity.

The presets, in the examples described above, represent predefined attribute values for one or more key indices. However, one of ordinary skill will realize that the presets may be other operations such as equations that modify attribute values. For instance, instead of specifying an attribute value, a preset may initiate a division or multiplication operation in order to set the attribute value at a key index or multiple key indices.

Figure 45:
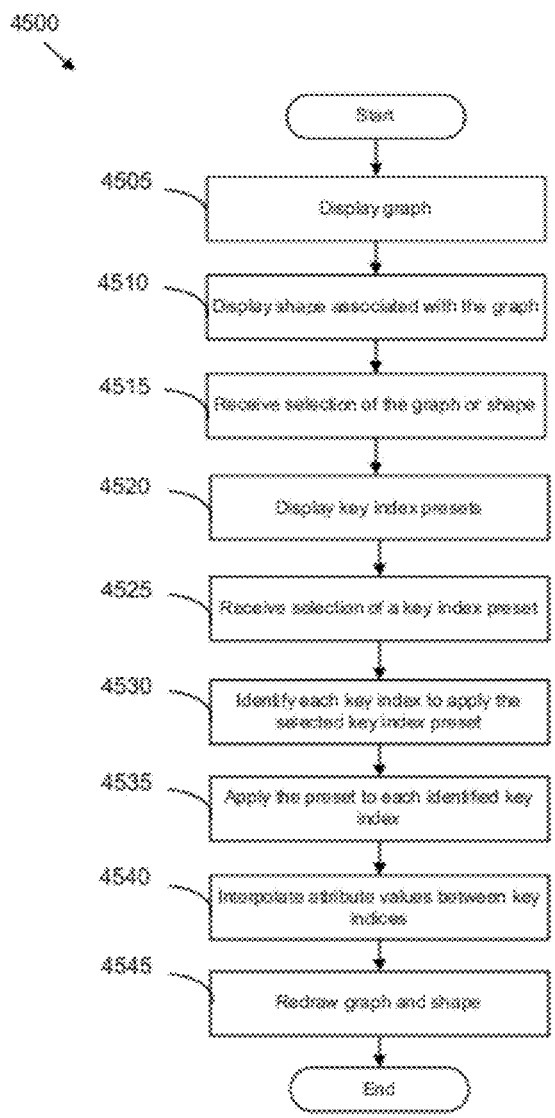
FIG. 45 conceptually illustrates a process of some embodiments for modifying attribute values at key indices using presets.

The preceding section described and illustrated various ways to modify attribute values at key indices using presets. FIG. 45 conceptually illustrates a process 4500 of some embodiments for modifying attribute values at key indices using presets. The process 4500 is performed by a media editing application in some embodiments. As shown, the process displays (at 4505) a key-indexed graph. Several examples of displaying such key-indexed graph are described above by reference to FIGS. 42-44.

The process then displays (at 4510) a shape associated with the graph. One example of such shape is the shape underneath the graph, as shown in FIGS. 42-44. The process then receives (at 4515) selection of a key-indexed graph or shape. One example of receiving selection of such graph is described above by reference to FIG. 42. Several examples of receiving selection of a shape are described above by reference to FIGS. 43-44.

Next, the process displays (at 4520) a list of key-index presets. In some embodiments, representations of the key-index presets are displayed as thumbnails, thumbnails with text descriptions, and/or text-defined operations. Several examples of such representations are illustrated in FIGS. 42-44. Once the list of presets is displayed, the process receives (at 4525) selection of a preset from the list of presets.

Process 4500 then identifies (at 4530) each key index to apply the preset. An example of identifying one key index to apply a preset is described above by reference to FIG. 42. Also, several examples of identifying multiple key indices to apply a key-index preset are described above by reference to FIG. 43-44. The process then applies (at 4535) preset to each identified key index. In some embodiments, a selection of a preset applies a same attribute value to multiple different key indices and/or applies different attribute values to the different key indices. The process then interpolates (at 4540) the attribute values between key indices. After interpolating the attribute values, the process redraws (at 4545) the key-indexed graph and shape. The process then ends.

One of ordinary skill in the art will realize that not all features for modifying attribute values of key indices using presets need to be used together. Accordingly, some embodiments perform variations on the process 4500. For example, in some embodiments, the media editing application might not use a shape to express the change in attribute value and may only rely on a key-indexed graph, or vice versa. Hence, in some such embodiments, the process 4500 may not display a shape or graph, and receive its selection. Furthermore, in some embodiments the operations of process 4500 might be performed by two or more separate processes. For instance, some embodiments may have one or more processes for displaying the graph, and a separate process for modifying the attribute value of key indices.

C. Modifying Key Indices and Interpolation Using Presets

In some embodiments, the media editing application provides presets that modify (i) one or more key indices and (ii) interpolation between the key indices. Several different examples of such presets will now be described by reference to FIGS. 46-49.

Figure 46:
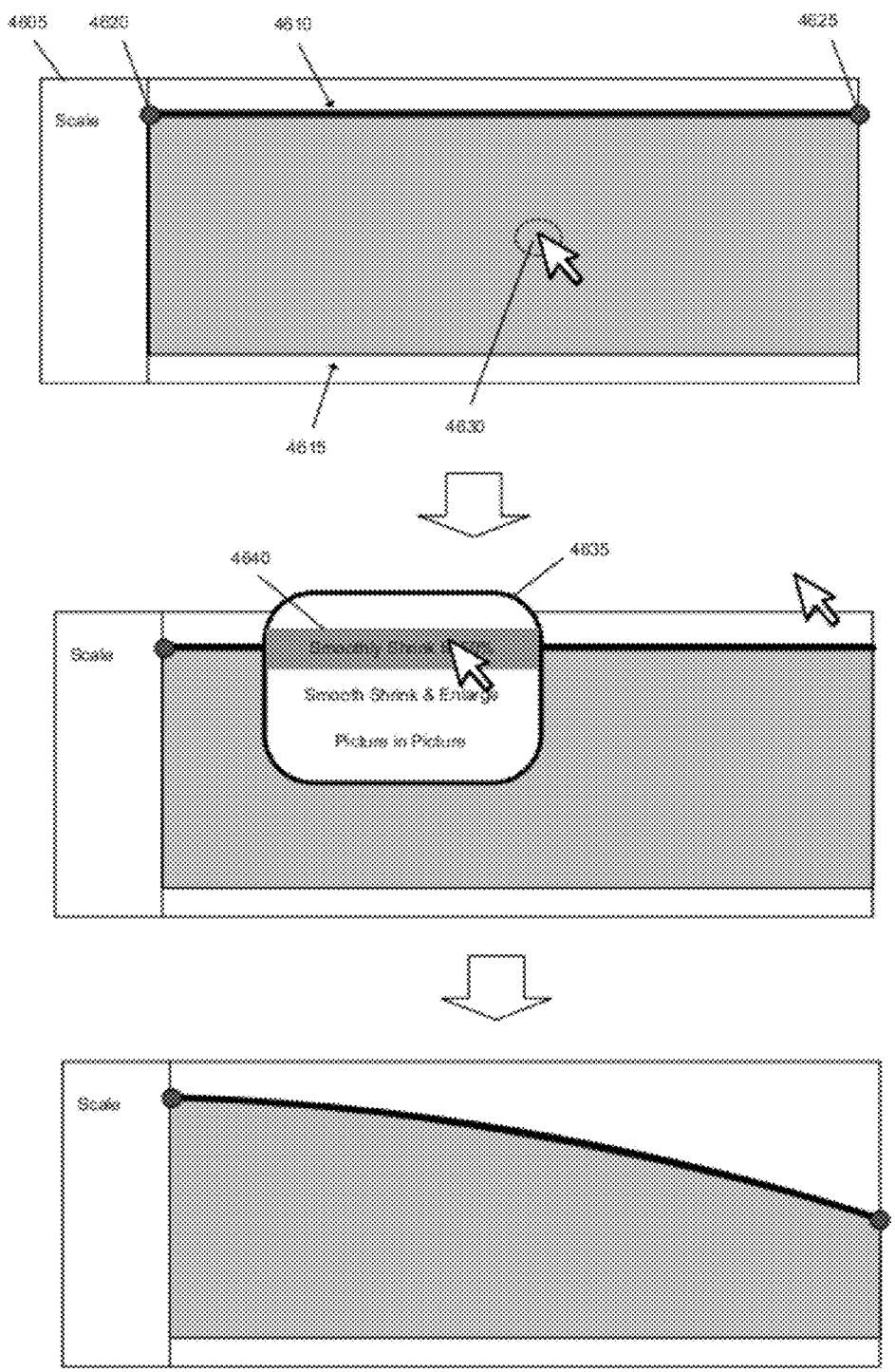
FIG. 46 illustrates modifying interpolation between two key indices an attribute value at one of the two key indices by selecting one preset.

FIG. 46 illustrates modifying interpolation between two key indices 4620 and 4625 and an attribute value at one of the two key indices by selecting one preset. In this example, a geometry editor 4605 displays a key-indexed graph 4610 and shape 4615 that represent a scale attribute of a video clip over a duration.

As shown in FIG. 46, a user selects (e.g., through a cursor click operation) an interior location 4630 within the shape 4615 in order to display a preset window 4635. This preset window includes several selectable text that represent different predefined operations. As will be described in detail in the following section, these predefined operations may be geometries (e.g., portion of a key-indexed graph, multiple different shapes) and/or key-index editing operations that a user of media editing might have selected and stored as a user-define preset to the preset library.

In FIG. 46, once the preset window 4635 is displayed, the user then selects a text 4640 to modify the scale graph. In particular, the selection of the text 4640 causes the attribute value at the key index 4625 to be set at 50% scale. The selection also causes the interpolation between the key indices 4620 and 4625 to be modified. As a result of the modification, new attribute values are interpolated between the key indices 4620 and 4625. This change in attribute values creates a curve on the key indexed graph 4610 and also modifies the form of the shape 4615 such that it becomes partially round.

In some embodiments, presets are stored as key-indexed geometries (i.e., key-indexed graph, key-indexed shape). In some such embodiments, instead of modifying attribute values at existing key indices and interpolation between these key-indices, the media editing application replaces one or more of the displayed geometries with stored geometries. For instance, in FIG. 46, instead of modifying the attribute value at the key index 4625 and modifying the interpolation between the key indices 4620 and 4625, the media editing application may replace the graph 4610 and/or the shape 4615 with a stored graph and/or a stored shape. This may entail replacing existing key indices and interpolation between the key indices.

Figure 47:
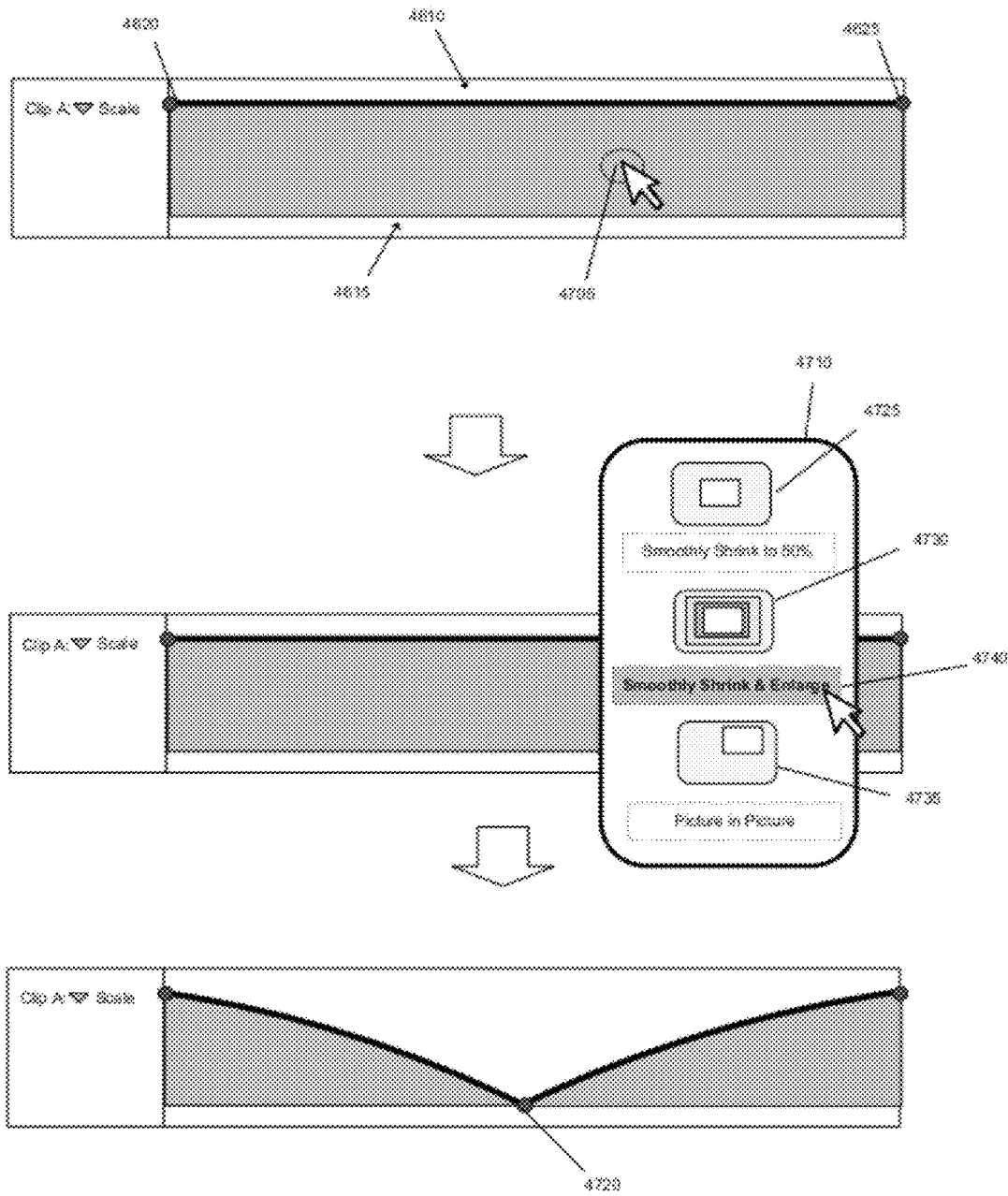
FIG. 47 illustrates an example of a preset that automatically creates a new key index.

In some embodiments, the media editing application provides a preset that not only modifies interpolation and attribute value at key index but also creates one or more new key indices. FIG. 47 illustrates an example of a preset that performs such key index creation. As shown, a user selects (e.g., through a cursor click operation) an interior location 4705 within the shape 4615 in order to display a preset window 4710. Once the preset window 4710 is displayed, the user then selects text 4740 that specifies the preset operation performs a smooth shrink and enlarge operations.

As shown in FIG. 47, the selection of the text 4740 causes several predefined operations to be performed on the scale attribute of the video clip. Specifically, in this example, the operations (i) create a new key index 4720, (ii) set the attribute value at the new key index to zero, (iii) define an interpolation between the key indices 4620 and 4720, and (iv) define an interpolation between the key indices 4720 and 4625. In some embodiments, the new key index is created at a location along a duration (e.g., time duration, frequency duration) in accordance with location information that is associated the preset. This location information in some such embodiments may specify that the location of the new key index is relative to one or more other key indices. For instance, in FIG. 47, the location information may specify that the new key index 4720 is in the middle of two outer key indices.

In many of the examples described above, the media editing application provides thumbnails that display different shapes and/or graphs. In some embodiments, the media editing application provides thumbnails that display different previews of effects that predefined operations have on a media item such as a video clip. An example of such thumbnails is illustrated in FIG. 47. Here, instead of displaying shapes or graphs, the thumbnails 4725-4735 display previews of how the predefined operations scales and/or relocates a video clip or image on a video display. For instance, the thumbnail 4725 shows that the predefined operation scales a video clip or image by half in the video display.

Figure 48:
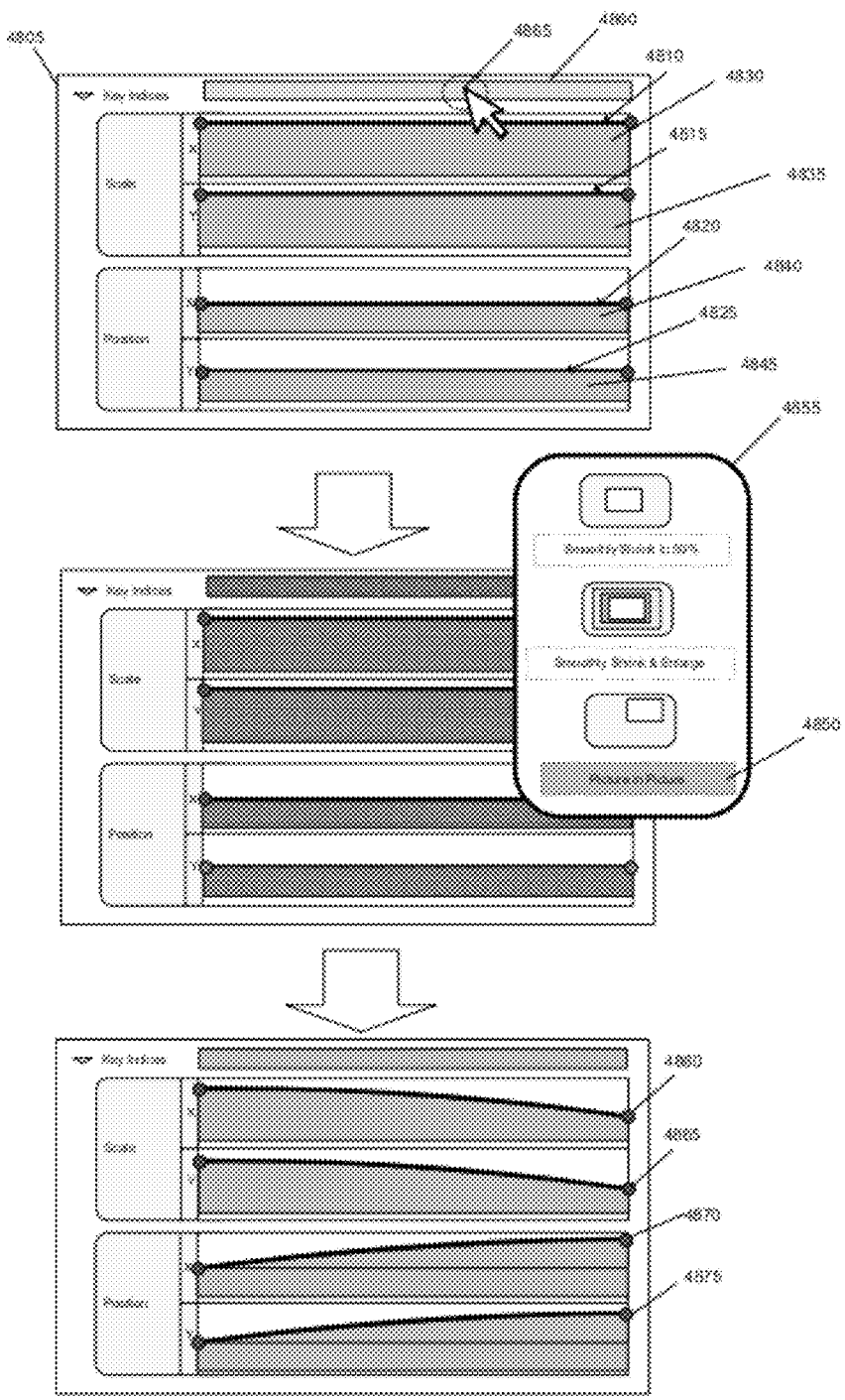
FIG. 48 illustrates an example of a preset that modifies key indices and interpolations associated with several different attributes of a video clip.

In the examples illustrated in FIGS. 46-47, a preset modifies key indices and interpolation between the key indices that are associated with a single attribute of a media clip or an editing operation over a duration. Some embodiments provide presets that modify multiple different attributes. FIG. 48 illustrates an example of one such preset that modifies key indices and interpolations associated with several different attributes of a video clip.

As shown in FIG. 48, a geometry editor 4805 displays a global timing bar 4860 for manipulating one or more key-indexed graphs and/or shapes. As mentioned above, in some embodiment, a global timing bar is tied to a geometry editor and is a timing bar that collectively represents each attribute that is displayed in the geometry editor. In some embodiments, the global timing bar is displayed at the top of the geometry editor by default, and represents every attributes and their respective key indices that are currently displayed in the geometry editor. Other embodiments allow user selection of which attributes to associate with the global timing bar. In some embodiments, the global timing bar spans across (e.g., horizontally across) one or more key-indexed geometries (e.g., graphs, shapes) and is a user-interface tool for selecting one or more entire key-indexed geometries, a portion of one geometry, and/or multiple portions of different geometries.

The geometry editor 4805, as shown in FIG. 48, also displays several key-indexed graphs and shapes that are associated with scale and position attributes of a video clip over a duration. Specifically, the geometry editor 4805 displays graph 4810 and shape 4830, which represent the width of the video clip, and displays graph 4815 and shape 4835, which represent the height of the video clip. Also, the geometry editor 4805 displays graph 4820 and shape 4840, which represent the x-coordinate of the video clip, and displays graph 4825 and shape 4845, which represent the y-coordinate of the video clip.

In the example illustrated in FIG. 48, the attributes of the video clip along a duration is selected by manipulating the global timing bar 4860. Specifically, the user selects (e.g., through a cursor click operation) an internal location 4865 within the global timing 4860. The selection of the internal location 4865 causes the attributes of the video clip to be selected. To provide a visual indication of the selection, the media editing application changes the appearance (e.g., color, pattern) of global timing bar, graph, and/or shape, in some embodiments. For instance, in FIG. 48, the selection of the internal location 4865 also causes the global timing bar 4860 and the shapes 4830-4845 to change their color.

As shown in FIG. 48, a cursor selection of a thumbnail with text 4850 from a preset window 4855 initiates the modification of the scale and potion attributes of the video clip. In particular, the user selects (e.g., through a cursor click operation) the global timing 4860 to display the preset window 4855. The user then selects the thumbnail with text 4850 to modify the attributes of the video clip. Specifically, the selection causes the attributes values at key indices 4860 and 4865 of the scale attribute to be reduced, while causing the attribute values at the key indices 4870 and 4875 of the position attribute to increase. Also, the selection of the thumbnail with text 4850 causes the linear interpolations of the scale and position attributes to be modified.

Figure 49:
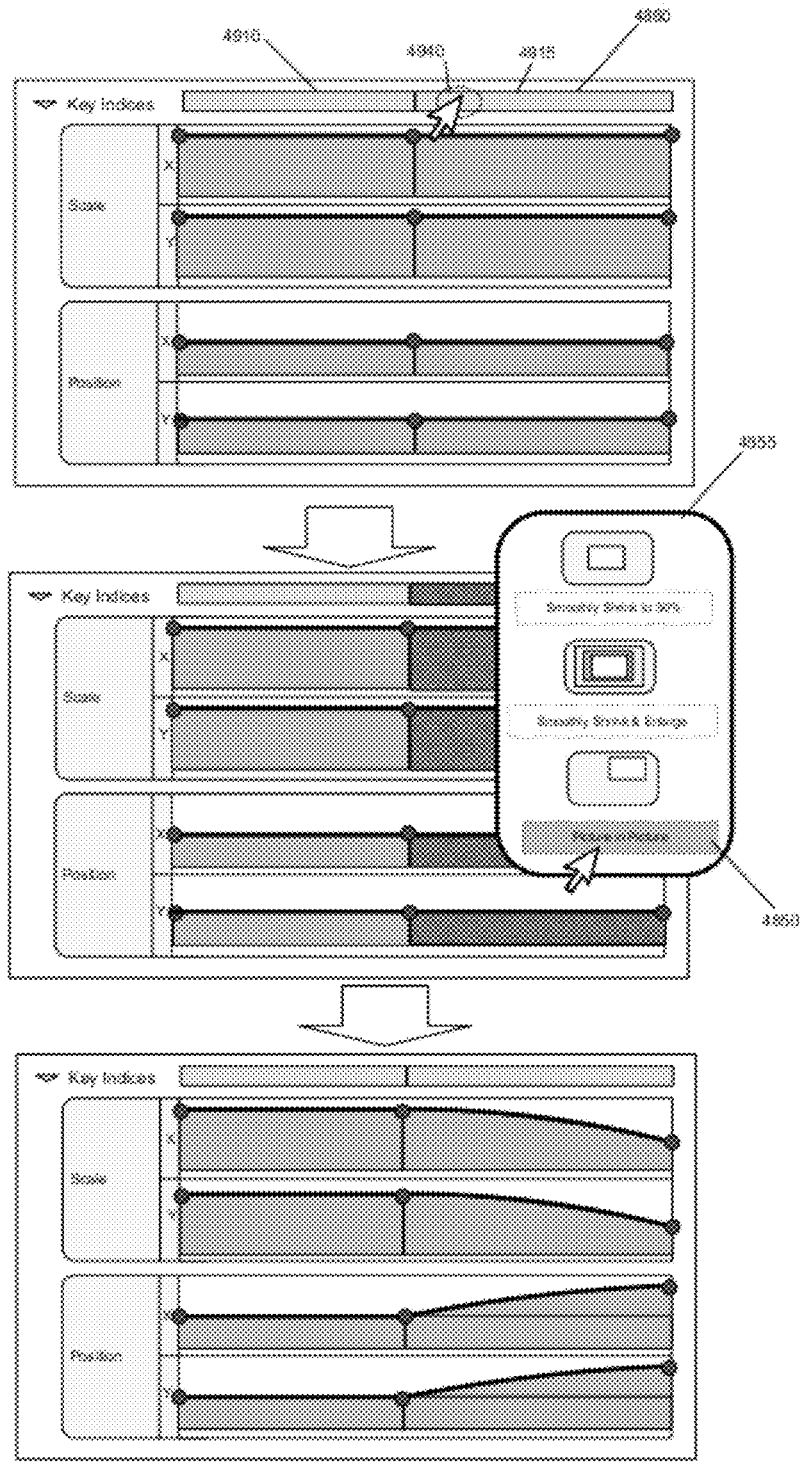
FIG. 49 illustrates specifying a location for a preset by utilizing a global timing bar.

In the example described above, the global timing bar 4860 is used to select several attributes of the video clip for modification. In some embodiments, the media editing application allows the user to specify a location along a duration for a preset by manipulating such global timing bar. FIG. 49 illustrates specifying the location for the preset by utilizing the global timing bar 4860. In this example, the global timing bar 4860 is divided into two distinct sections 4910 and 4915. Each section represents a particular span of time along the duration for the attributes of the video clip.

As shown in FIG. 49, the preset is inserted in the span of time that is represented by the section 4915. Specifically, to select a time span, the user selects (e.g., through a cursor click operation) an interior location 4940 within the section 4915. After the preset window 4855 is displayed, the user of media editing application then selects the thumbnail with text 4850. The selection causes the predefined operations to be replicated across the span of time represented by the section 4915.

Figure 50:
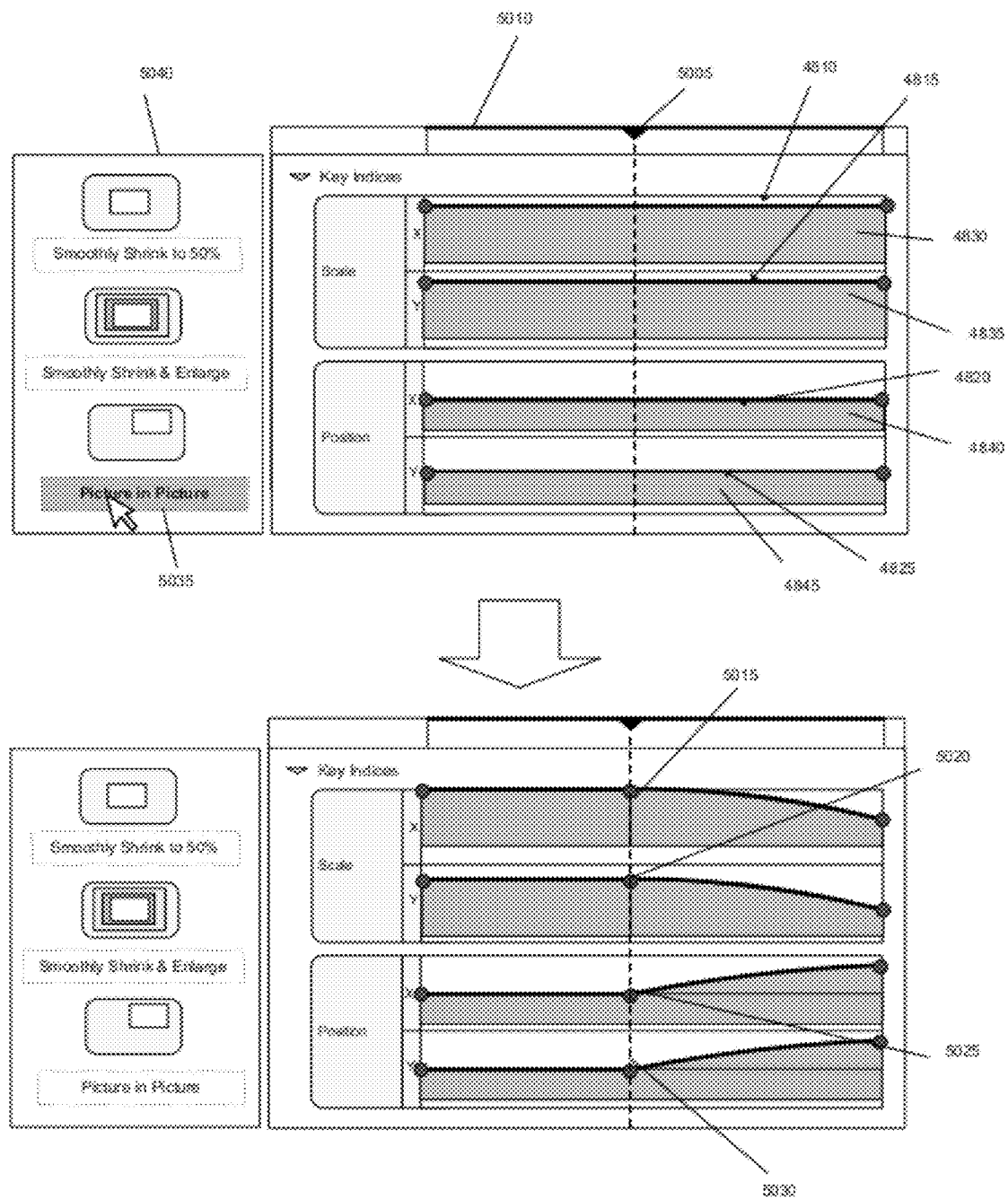
FIG. 50 illustrates specifying a location for a preset by utilizing a playhead.

Alternatively, or conjunctively, some embodiments provide other user-interface tools for specifying a location to insert a preset. FIG. 50 illustrates specifying a location by utilizing a playhead 5005. In this example, the playhead 5005 is situated on a timeline 5010. The user of the media editing application can drag the playhead 5005 along the timeline 5010 to specify a location along the duration to insert the preset.

As shown in FIG. 50, the playhead 5005 specifies the location by crossing each of the key indexed graphs 4810-4825 and shapes 4830-4845 at the horizontal coordinate of the playhead. The user of media editing application then selects the thumbnail with text 5035 from a preset display area 5040. The selection of the thumbnail with text 5035 causes the predefined operations to be replicated on the key-indexed graphs 4810-4825 and the shape 4830-4845 starting from the location specified by the playhead.

In some embodiments, when a location specified by a playhead does not correspond to a location of a key index, the media editing application facilitates preset replication by automatically creating new key indices at the specified location. For instance, in FIG. 50, when the preset is selected, several new key indices 5015-5030 are automatically created at the location specified by the playhead 5005.

Figure 51:
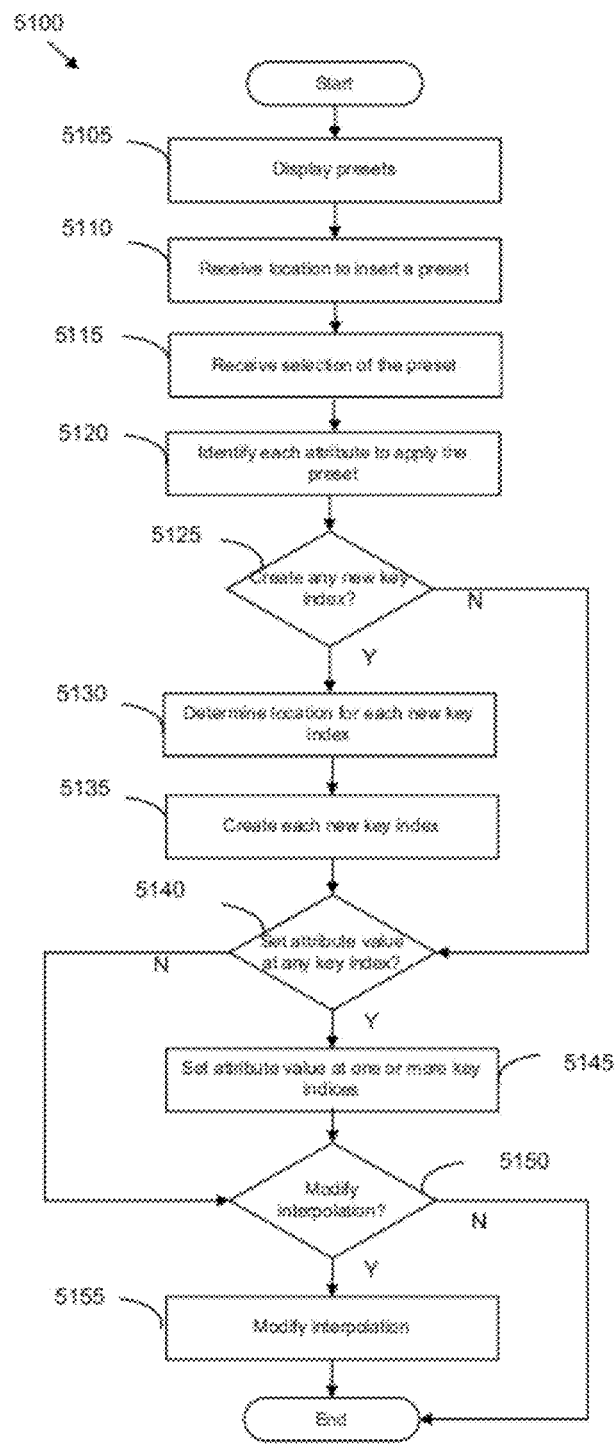
FIG. 51 conceptually illustrates a process of some embodiments for modifying key indices and interpolation between the key indices using a preset.

The preceding section described and illustrated various ways to modify key indices and interpolation between the key indices using a preset. FIG. 51 conceptually illustrates a process 5100 of some embodiments for modifying key indices and interpolation between the key indices using such preset. The process is performed by a media editing application in some embodiments. As shown, the process displays (at 5105) one or more text and/or thumbnails that represent presets. An example of displaying text-defined operations is described above by reference to FIG. 46, while another example of displaying thumbnails with text is described above by reference FIG. 47.

The process then receives (at 5110) a location along a duration to insert a preset. As mentioned above, in some embodiment, the media editing application allows the user specify the location by using different user-interface tools (e.g., a global timing bar, a playhead on a timeline). The process then receives (at 5115) selection of a preset. The process then identifies (at 5120) each attribute to apply the selected preset. Once one or more attributes are identified, the process then determines (at 5125) whether any new key index need to be created. When the determination is made that one or more new key indices need to be created, the process then determines (at 5130) a location for each new key index. The process then creates (at 5135) each new key index at the determined location. Several examples of creating new key indices are described above by reference to FIGS. 47 and 50.

When the determination is made (at 5125) that a new key index is not required, the process proceeds to 5135. The process then determines (at 5140) whether any attribute values need to be set at a key index. When the determination is that one or more attribute values need to be set, the process sets (at 5145) each attribute value. Several examples of setting attribute values at key indices are described above by reference to FIGS. 46 and 47.

When the determination is made (at 5140) that attribute value at a key index does not need to be set, the process proceeds to 5150. The process determines (at 51050) whether any interpolation needs modification. When the determination is that one or more interpolations need to be modified, the process modifies (at 5155) the interpolation. Otherwise, the process ends.

One of ordinary skill in the art will realize that not all features for modifying key indices and interpolation using a preset need to be used together. Accordingly, some embodiments perform variations on the process 5100. For example, in some embodiments, the media editing application might not allow a user to specify a location to insert a preset and may automatically specify the location. Hence, in some such embodiments, the process may not receive the location from the user. Furthermore, in some embodiments the operations of process might be performed by two or more separate processes. For instance, some embodiments may have one or more processes for creating new key indices, and a separate process for modifying the interpolation between the key indices.

VII. Saving Presents to a Library

Some embodiments of the invention provide media editing applications with novel techniques for saving one or more key-indexed geometries as a reusable preset to a preset library. For instance, in some such embodiments, the media editing application allows the user to select a part of one key-indexed geometry or multiple key-indexed geometries, and store it in the library as one retrievable unit. To facilitate such saving operations, some embodiments provide novel techniques for selecting key-indexed geometries. Several examples of selecting such saving and selecting techniques will now be described by reference to FIGS. 46-61.

A. Saving a Part of One Key-Indexed Geometry as a Preset

Figure 52:
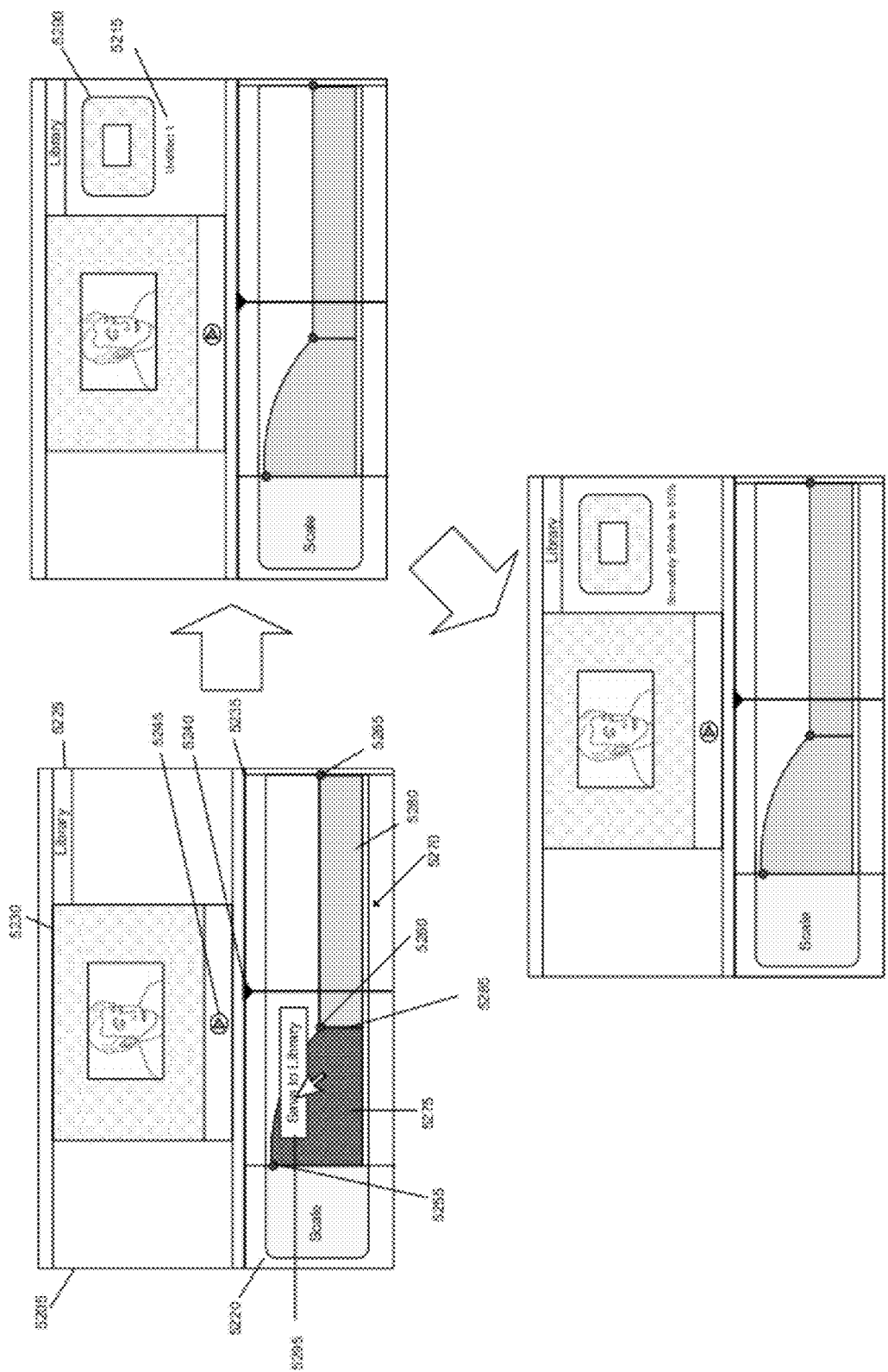
FIG. 52 illustrates saving a portion of a key-indexed shape as a user-defined preset.

FIG. 52 illustrates saving a portion of a key-indexed shape as a user-defined preset. As shown, the figure includes a graphical user interface (GUI) 5205 of a media editing application at three different stages, a first stage that is before saving the part of the key-indexed shape as the user-defined preset, a second stage that is after saving the part, and a third stage that is after receiving a description for the user-defined preset.

The GUI 5205 includes (i) a geometry editor 5220 for displaying one or more key-indexed shapes, (ii) a preview display area 5230 for displaying a preview of a composite presentation that the application creates, and (iii) a preset display area 5225 for displaying user-selectable presets. The GUI also includes a timeline 5235. A playhead 5240 is situated on the timeline 5235. The user of the media editing application can drag the playhead 5240 along the timeline to display a preview of the composite presentation at a particular point in time, or to play the preview starting from the particular point by selecting a play button 5245.

As shown in FIG. 52, the geometry editor 5205 displays a modified key-indexed shape 5270. A user of media editing might have modified the shape 5270 using any one of a number of different techniques described above. The shape 5270 represents a scale attribute of a video clip over a duration, and is defined by three key indices 5255-5265 and interpolations between these key indices. The key index 5255 is associated with an attribute value that represents 100% scale, while the key indices 5260 and 5265 are associated with an attribute value that represents 50% scale. A line 5285 that represents the location of the key index 5260 divides the shape into two sections 5275 and 5280. The interpolation between the key indices 5255 and 5260 defines the section 5275 to be partially round, while the interpolation between the key indices 5260 and 5265 defines the section 5280 to be rectangular.

The operations of the GUI will now be described by reference to the state of this GUI during the first, second, and third stages that are illustrated in FIG. 52. In the first stage, the geometry editor 5205 displays the key-indexed shape 5275. When the user selects an interior location within the section 5275, the user is presented with a user-interface control 5295 or saving tool for saving user-defined presets to a preset library. To save the selected section 5275 of the shape, the user then selects (e.g., through a cursor click operation) the saving tool 5295. In conjunction with this saving tool 5295, or instead of it, some embodiments provide other user-interface tools for saving a preset to a preset library. For instance, the media editing application might provide a selectable menu item in a pull-down menu and/or a selectable icon in a toolbar.

In some embodiments, when the media editing application saves a selected key-indexed geometry, it saves the key-index editing operations that are associated with the selected geometry. For instance, in FIG. 52, the user selection of the saving tool 5295 may causes the media editing application to save the key indices 5255 and 5260, the locations associated with the key indices, the attribute values associated with the key indices, and/or the interpolation between the key indices, as one user-defined preset.

As shown in FIG. 52, in the second stage, the preset display area 5225 displays user-selectable thumbnail 5290 and text 5215 that represent the saved preset. Specifically, in this example, the selection of the saving tool 5295 causes the media editing application to automatically generate and display the thumbnail 5290 and text 5215 in the preset display area 5225. Similar to the representations discussed above, a user of the media editing application can select the thumbnail 5290 and/or text 5215 in order to apply the preset on any number of different key-indexed geometries. For instance, the user of the media editing application can select another key-indexed shape and select the thumbnail in order to replace the shape and/or replicate the editing operations associated with the preset on the selected shape.

When a user-defined preset is created, some embodiments automatically assign a default name to the preset. This is illustrated in the second stage of FIG. 52, as the text 5215 specifies that the user-defined preset is an untitled preset. Conversely, in stage three, after a user inputs a description for the preset, the text 5215 specifies that the preset is associated with operations that smoothly shrink a media clip by 50%. In some embodiments, a preset display area is further for receiving the description for the text representation. For instance, in FIG. 52, a user of the media editing application might have inputted the description for the user-defined preset using the preset display area 5225.

As shown in FIG. 52, the thumbnail 5215 provides a visual indication of the editing operations associated with the saved preset. In some embodiments, the thumbnail 5290 is dynamically generated based on one or more rules. These rules might specify capturing a thumbnail of a media editing operations associated the user-defined preset. For instance, a rule might specify capturing a thumbnail image of one or more shapes and/or graphs that is associated with the preset. Alternatively, the rule might specify capturing a frame of video clip in a composite presentation that the media editing application creates.

Figure 53:
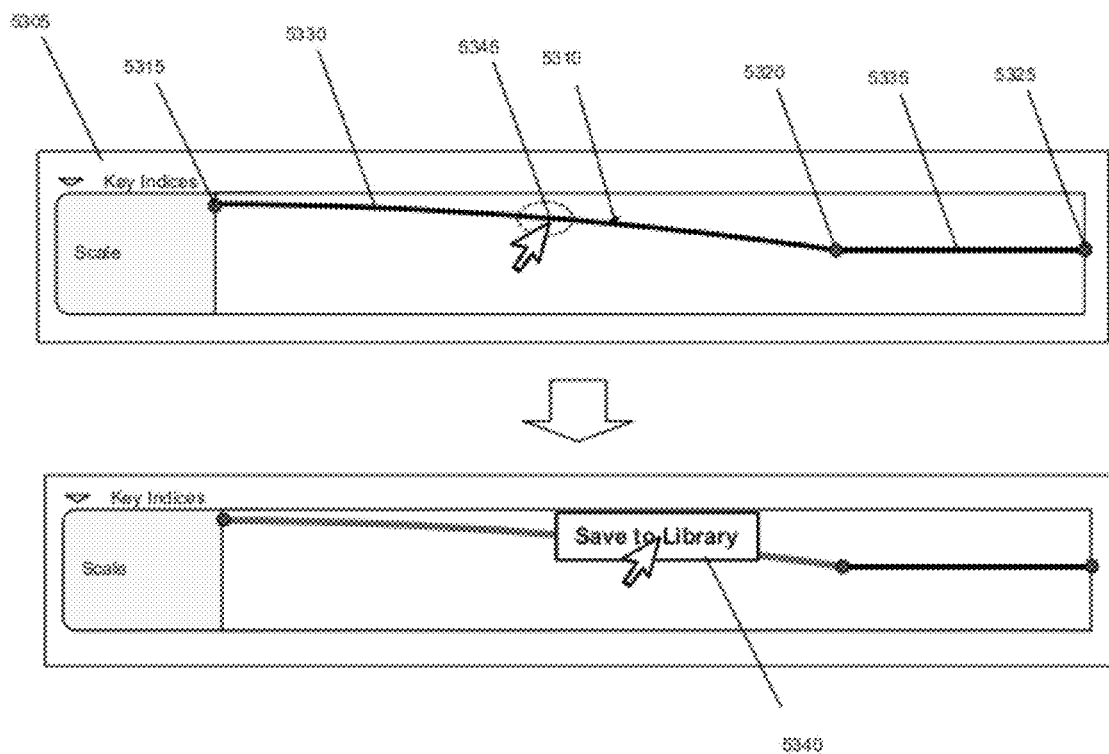
FIG. 53 illustrates saving a portion of a key-indexed graph as a user-defined preset.

In the example described above, a portion of the key-indexed shape 5275 is saved to a preset library. FIG. 53 illustrates saving a portion of a key-indexed graph 5310. In this example, a geometry editor 5305 displays the key-indexed graph 5310 that is associated with a scale attribute of a video clip over a duration. The graph 5310 represents a scale attribute of a media clip over a duration and includes three key indices 5315-5325. Specifically, the key index 5315 is associated with an attribute value that represents 100% scale, while the key indices 5320 and 5325 are associated an attribute value that represents 50% scale. The key index 5320 divides the graph 5310 into two segments 5330 and 5335. The curve segment 5330 is defined by the interpolation between the key indices 5315 and 5320, while the parallel segment 5335 is defined by the interpolation between the key indices 5320 and 5325.

As shown in FIG. 53, the user selects the curved segment 5330 and stores the segment, and/or stores the key-index operations associated with the curved segment to the preset library. Specifically, without selecting any key index on the graph, the user selects the curve segment 5330 by selecting a point 5345 on the curve segment 5330. The selection of the point 5345 causes a saving tool 5340 to appear on the geometry editor 5305. The user then stores the curve segment to the library as a preset by selecting the saving tool 5340. In conjunction with this graph selection capability, or instead of it, some embodiments allow the user select a segment of a key-indexed geometry by selecting key indices that border the segment. For instance, in FIG. 53, the curved segment 5330 may be selected by the user selecting (e.g., through cursor click operations) the two key indices 5315 and 5320 that border the segment.

In the example described above, a user of the media editing application manipulates a key-indexed geometry in order to select a part of the geometry. Some embodiments provide other user-interface tools for selecting a part of a key-indexed geometry or multiple parts of different geometries.

Figure 54:
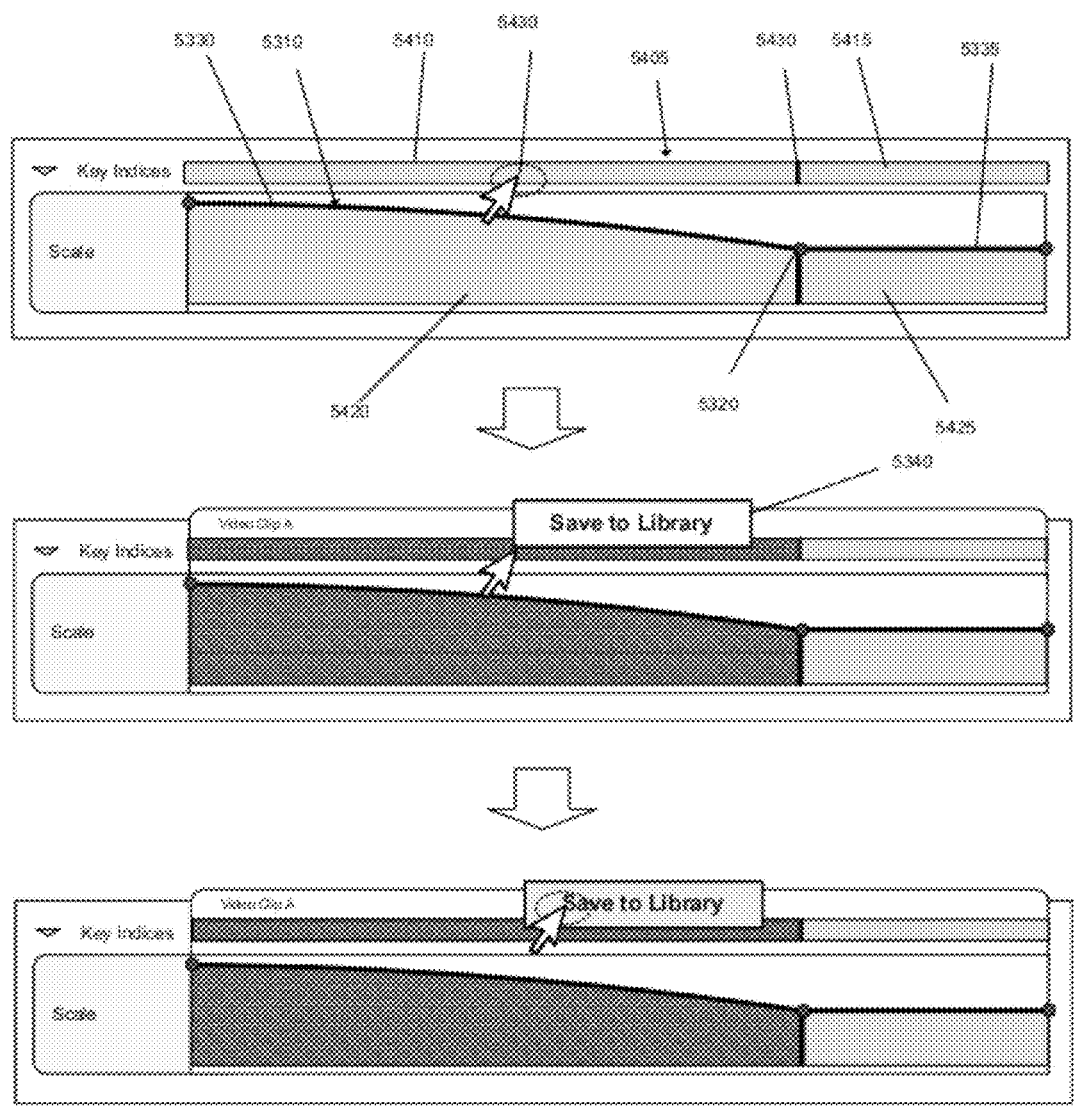
FIG. 54 illustrates saving a part of a key-indexed graph by manipulating a global timing bar.

FIG. 54 illustrates saving a part of the key-indexed graph by manipulating a global timing bar 5405. As mentioned above, in some embodiment, a global timing bar is tied to a geometry editor and is a timing bar that collectively represents each attribute that is displayed in the geometry editor. In FIG. 54, the global timing bar 5405 spans across the key-indexed graph 5310 and is divided into two sections 5410 and 5415 by a line 5430 that represents the location of the key index 5320. The section 5410 corresponds to the curve segment 5330 of the graph, while the section 5415 corresponds to the parallel segment 5335.

As shown in FIG. 54, the user stores the curved segment 5330 to a preset library by interacting with the global timing bar 5405. Specifically, the user selects the curve segment 5330 by selecting an interior location 5440 within the section 5410. The selection of the interior location 5440 causes the saving tool 5340 to appear on the global timing. In this example, the selection also causes the section 5410 of the global timing bar and a section 5420 of the shape to change their appearances. The user then stores the curve segment 5330 to the library by selecting the saving tool 5340.

Figure 55:
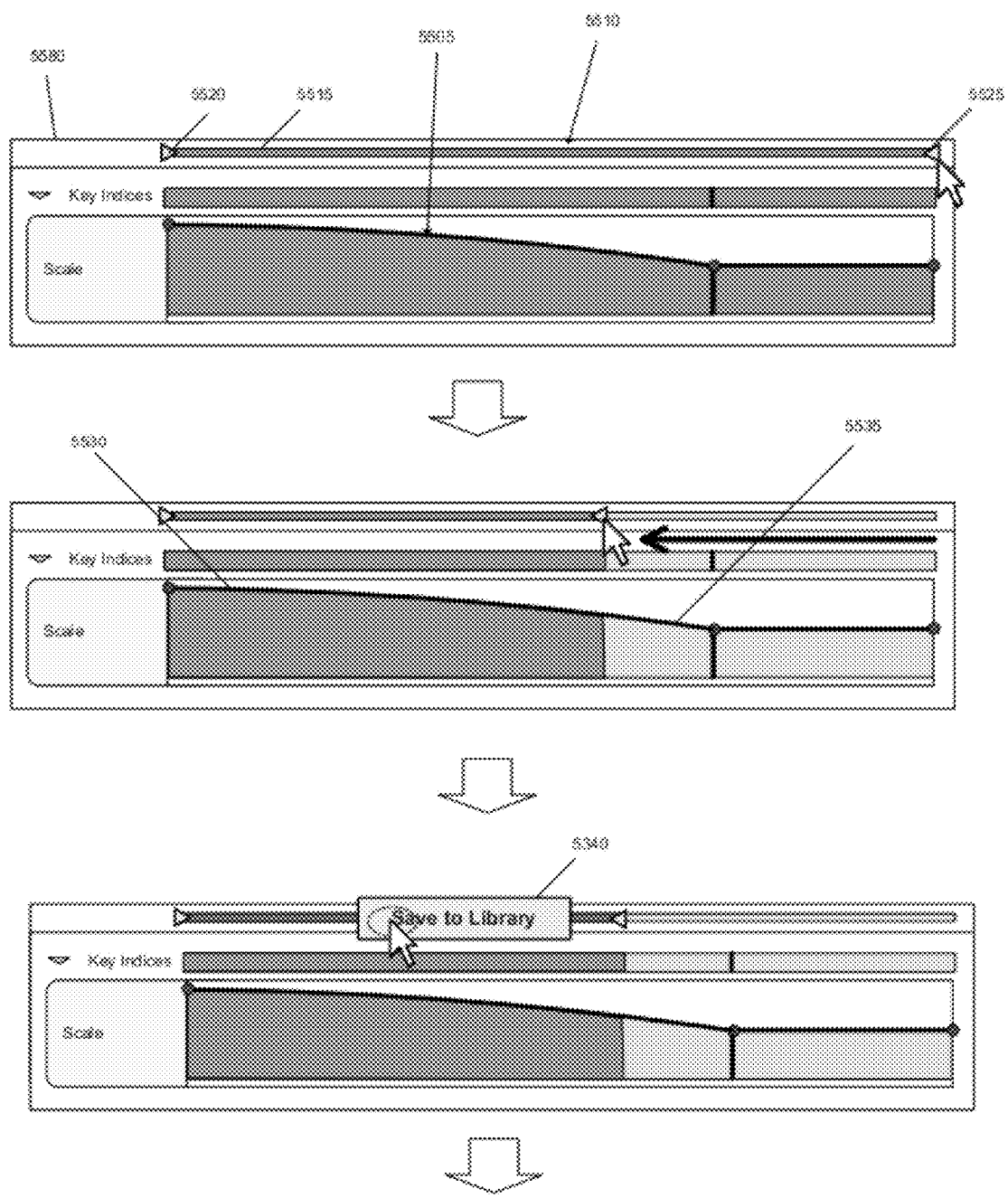
FIG. 55 illustrates saving a part of the key-indexed graph by manipulating a range selection tool.

In conjunction with the global timing bar, or instead of it, some embodiments provide a range selection tool that allows a user to select a part of one or more key-indexed geometries by defining a range. FIG. 55 illustrates saving a part of the key-indexed graph 5505 by manipulating a range selection tool 5510. As shown, the range selection tool 5510 includes a bar 5515 that spans across the key-indexed graph 5505. The range selection tool 5510 also includes a marker 5520 situated at one end of the bar and another marker 5525 situated at opposite end. A user of the media editing application can drag either one of the markers 5520 and 5525 along the bar 5515 to select a part of the graph 5505 by defining a range. In this example, with the markers 5520 and 5525 at opposite ends of the bar 5515, the entire key-indexed graph 5505 is initially selected.

As shown in FIG. 55, the user selects and saves a part 5530 of the graph to the preset library. Specifically, to select the part of the graph, the user selects and moves the movable marker 5525 horizontally along the bar 5515. The movement causes one part 5535 of the graph to be deselected, while the part 5530 of the graph remains selected. The user then selects an internal location within the range tool 5510 which causes the saving tool 5340 to appear on the geometry editor 5580. To save the part 5530 of the graph to the preset library, the user then selects the saving tool 5340.

In the example illustrated in FIG. 55, the marker 5525 is moved along the bar 5515 to a location on the graph 5505 that does correspond to any key index on the graph. When the location of a marker does not correspond to a location of a key index, some embodiments store a part of the key-indexed geometry by automatically creating a new key index at the location that corresponds to the marker. For instance, in FIG. 55, when the part 5530 of the graph is stored to the preset library, a new key index may automatically be created for the part at the horizontal coordinate of the marker. In some embodiments, the media editing application also computes and stores interpolation when one or more new key indices are automatically created.

Figure 56:
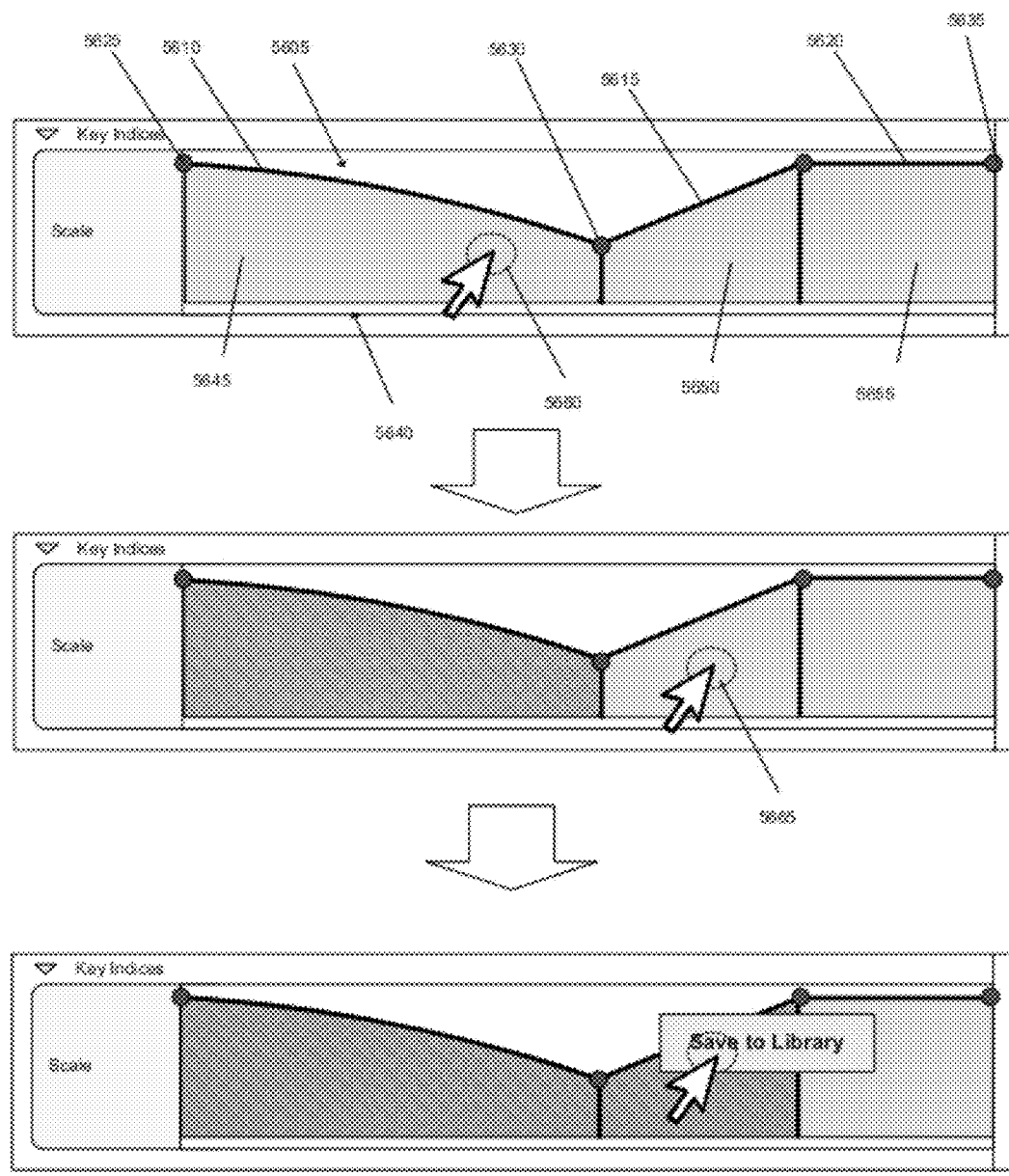
FIG. 56 illustrates selecting and saving two segments of a key-indexed graph as one user-defined preset.

In some embodiments, the media editing application allows the user to directly select multiple sections of a key-indexed geometry and store it as one retrievable unit in the preset library. FIG. 56 illustrates selecting and saving two segments of a key-indexed graph as one user-defined preset. In this example, the key-indexed graph 5605 is divided into three distinct segments 5610-5620 by key indices 5625-5635. Each segment of the graph also defines one section of a shape 5640. Specifically, the segment 5610 defines a section 5645, the segment 5615 defines a section 5650, and the segment 5620 defines a section 5655.

As shown in FIG. 56, the user selects the curve segment 5610 and the straight segment 5615 of the graph by first selecting an interior location 5660 within the section 5645 of the shape 5645 and then selecting an interior 5665 location within the section 5650. The selection of the interior location 5665 causes the saving tool 5340 to appear on the geometry editor 5305. The user then stores the selected segments 5610 and 5615 as the user-defined preset by selecting the saving tool 5340.

Figure 57:
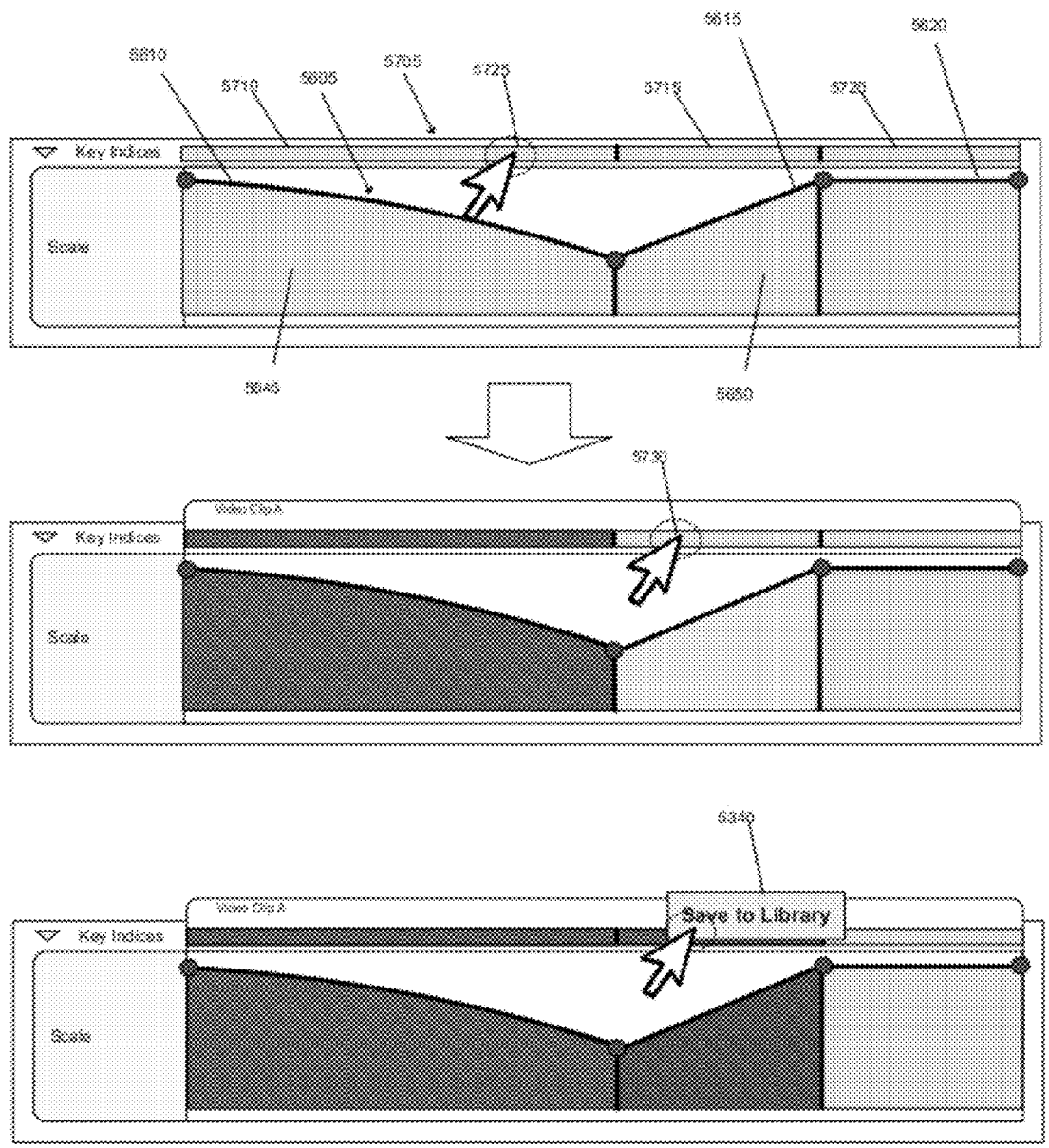
FIG. 57 illustrates saving two segments of a key-indexed graph by interacting with a global timing bar.

In the example described above, the two segments 5610 and 5615 of the graph 5605 are selected by manipulating the sections 5645 and 5650 of the shape 5640 underneath the graph. Correspondingly, FIG. 57 illustrates saving the two segments 5610 and 5615 of the key-indexed graph 5605 by interacting with a global timing bar 5705. In this example, the global timing bar 5705 is divided into three sections 5710-5720. Each section of the global timing bar 5705 represents a particular segment of the graph 5605. Specifically, the section 5710 corresponds to the segment 5610 of the graph, the section 5715 corresponds to the segment 5615, and the section 5720 corresponds to the segment 5620.

As shown in FIG. 57, the user stores the segments 5610 and 5615 as a user-defined preset to a preset library by interacting with the global timing bar 5705. Specifically, the user first selects the segment 5610 by selecting an interior location 5725 within the section 5710 and then selects the segment 5615 by selecting an interior location 5730 with the section 5715. The selection of the interior location 5730 also causes the saving tool 5340 to appear on the global timing. In this example, the selection also causes the sections 5710 and 5715 of the global timing bar and sections 5645 and 5650 of the shape to change their appearances. The user then stores the selected segments 5610 and 5615, and/or the editing operations associated with the segments, as a user-defined preset, by selecting the saving tool 5340.

B. Saving Multiple Key-Indexed Geometries as a Preset

Figure 58:
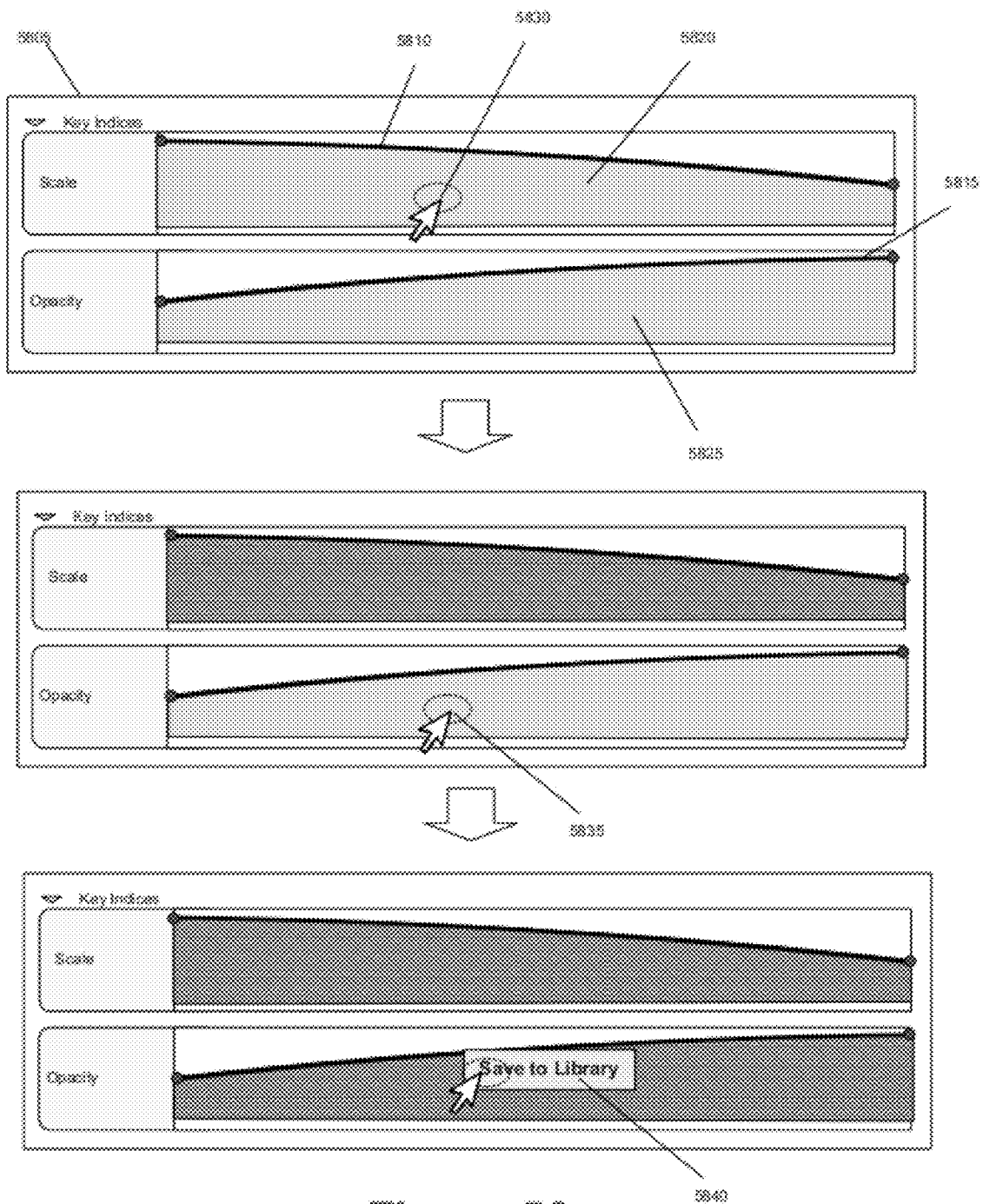
FIG. 58 illustrates selecting and saving two key indexed geometries as one unified preset to a preset library.

FIG. 58 illustrates selecting and saving two key indexed geometries as one unified preset to a preset library. In this example, a geometry editor 5805 displays a key-indexed graph 5810 and a shape 5820 that represents a scale of a video clip over a duration. The geometry editor 5805 also displays a key-indexed graph 5815 and a shape 5825 that represents opacity of the video clip over the duration.

As shown in FIG. 58, the user selects the two key-indexed graphs 5810 and 5815 by first selecting an interior location 5830 within the shape 5820 and then selecting an interior location 5835 within the shape 5825. The selection also causes each of the shapes 5820 and 5825 to change its appearance. When the user selects the shape 5825, the user is presented with a saving tool 5840. The user then selects the saving tool 5840 which causes the selected graphs 5810 and 5815 to be stored as one preset in the preset library.

Figure 59:
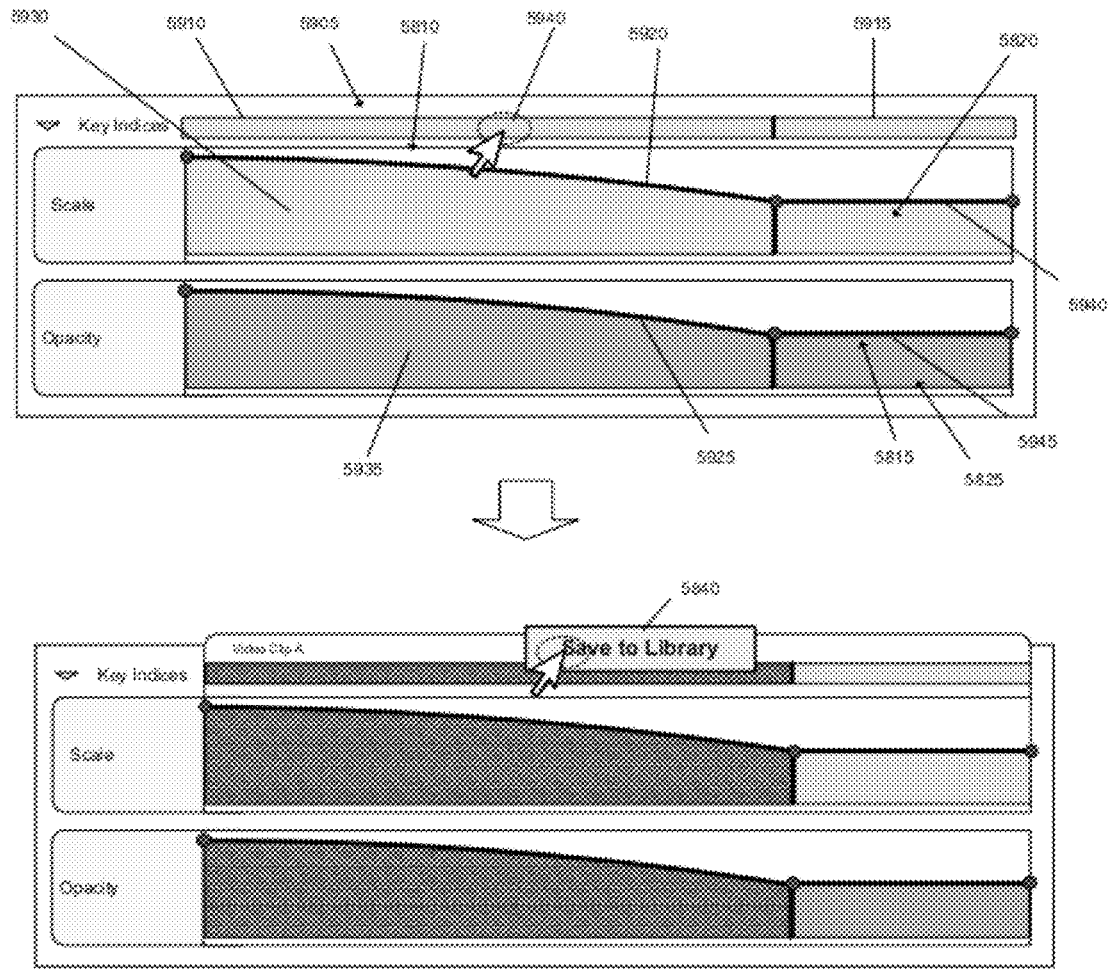
FIG. 59 illustrates saving two parts of two different key-indexed graphs by interacting with a global timing bar.

FIG. 59 illustrates saving two parts of two different key-indexed graphs by interacting with a global timing bar 5905. In this example, the global timing bar 5905 is divided into two sections 5910 and 5915. Each section of the global timing bar 5905 represents a particular segment of the scale graph 5810 and a particular segment of the opacity graph 5815. Specifically, the section 5910 represents the segments 5920 and 5925, while the section 5915 represents the segments 5940 and 5945.

As shown in FIG. 59, the user stores the segments 5920 and 5925 to a preset library as one user-define preset by interacting with the global timing bar 5905. Specifically, the user selects these segments 5920 and 5925 by selecting an interior location 5940 within the section 5910. In this example, the selection also causes the section 5910 of the global timing bar 5910 and the sections 5930 and 5935 of the shapes 5820 and 5825 to change their appearances. Also, the selection of the interior location 5940 causes the saving tool 5840 to appear on the global timing. The user then stores the selected segments 5920 and 5925 by selecting the saving tool 5840.

Figure 60:
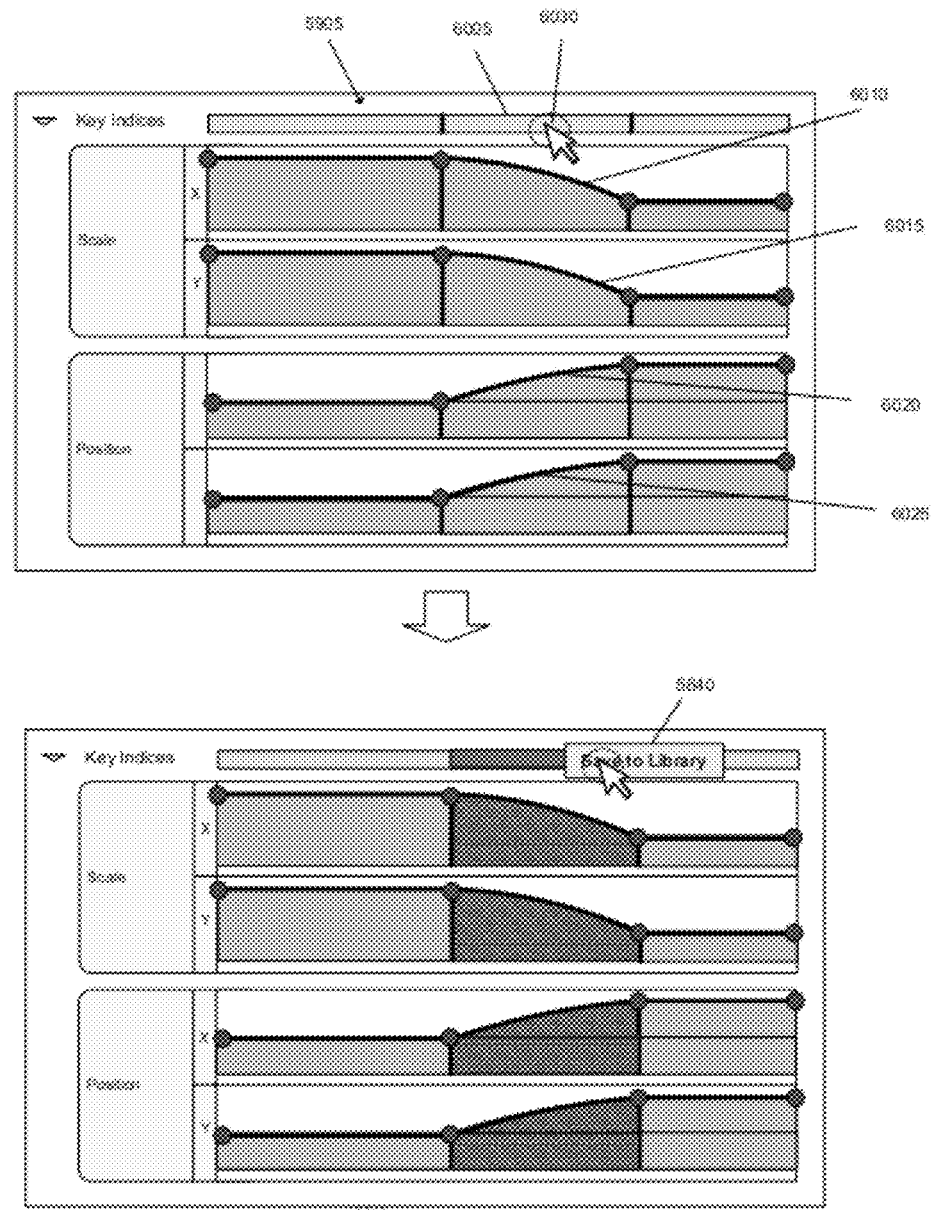
FIG. 60 illustrates saving middle segments of multiple key-indexed graphs by interacting with a global timing bar.

In the previous two example, the outer segments of multiple key-indexed graphs are saved to a library as one preset. FIG. 60 illustrates saving middle segments of multiple key-indexed graphs by interacting with the global timing bar. Specifically, it illustrates selecting segments 6010-6025 of several graphs by selecting a section 6005 of the global timing bar 5905. As shown, when the user selects an interior location 6030 within the section 6005, the user is presented with the saving tool 5840. The user then selects the saving tool 5840 which causes the segments 6010-6025 to be saved to the preset library as one user-defined preset.

Figure 61:
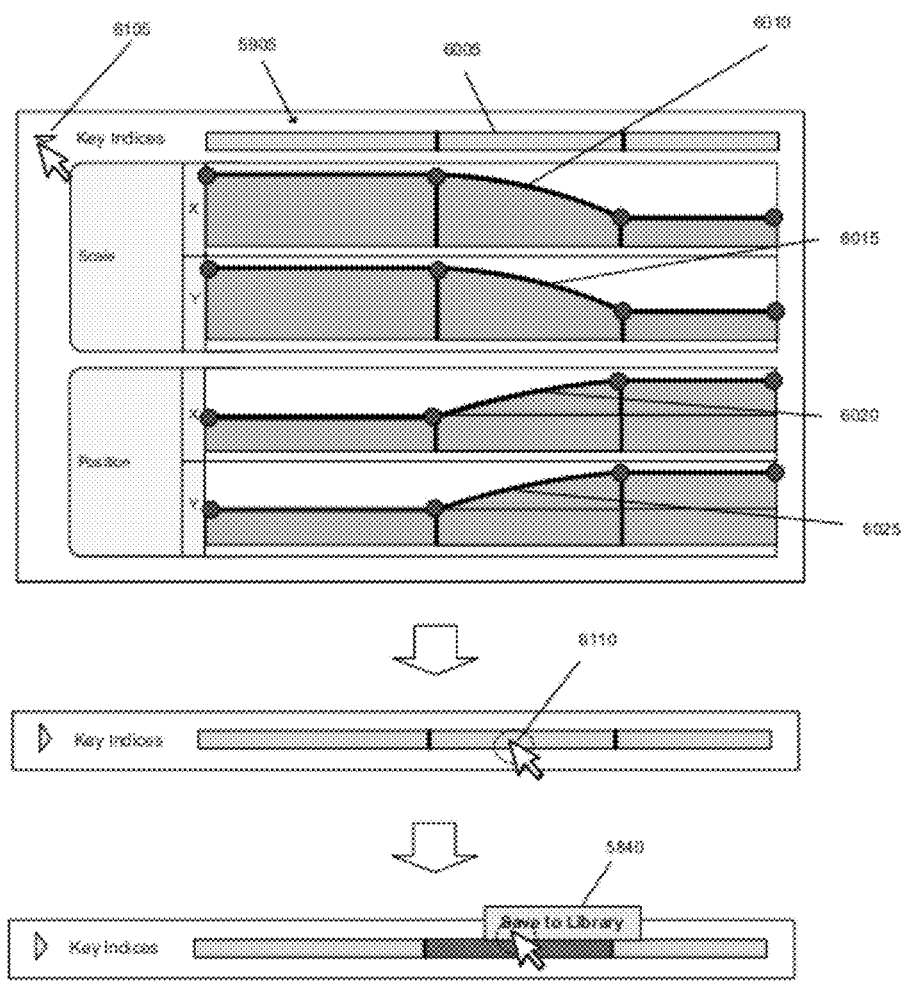
FIG. 61 illustrates an example of hiding multiple key-indexed graphs and saving segments of the graphs by interacting with the global timing FIG. 62 conceptually illustrates a process of some embodiments for selecting and saving a preset to the library.

In some embodiments, the media editing application allow the user to hide one or more key-indexed graphs and only display a global timing bar. FIG. 61 illustrates an example of hiding multiple key-indexed graphs and saving segments of the graphs by interacting with the global timing 5905. Specifically, this figure illustrates that a cursor selection of a user-interface control 6105 collapses the geometry editor such that only the timing bar 5905 is displayed. The user then selects an interior location 6110 within the section 6005 of the timing bar which causes the saving tool 5840 to appear. The user then selects the saving tool 5840 which causes the segments 6010-6025 to be stored in the preset library as one user-defined preset.

In the above described examples, the novel techniques for selecting a part of one or more key-indexed geometries are described for the purpose of storing user-defined presets to the library. However, these selection techniques can be used for other types of editing operations. For instance, several parts of different key-indexed geometries may be selected and modified together as one geometry. Also, the different parts may be selected using such techniques in order to apply a preset across each of the selected parts, perform copy and paste operations, etc.

Figure 62:
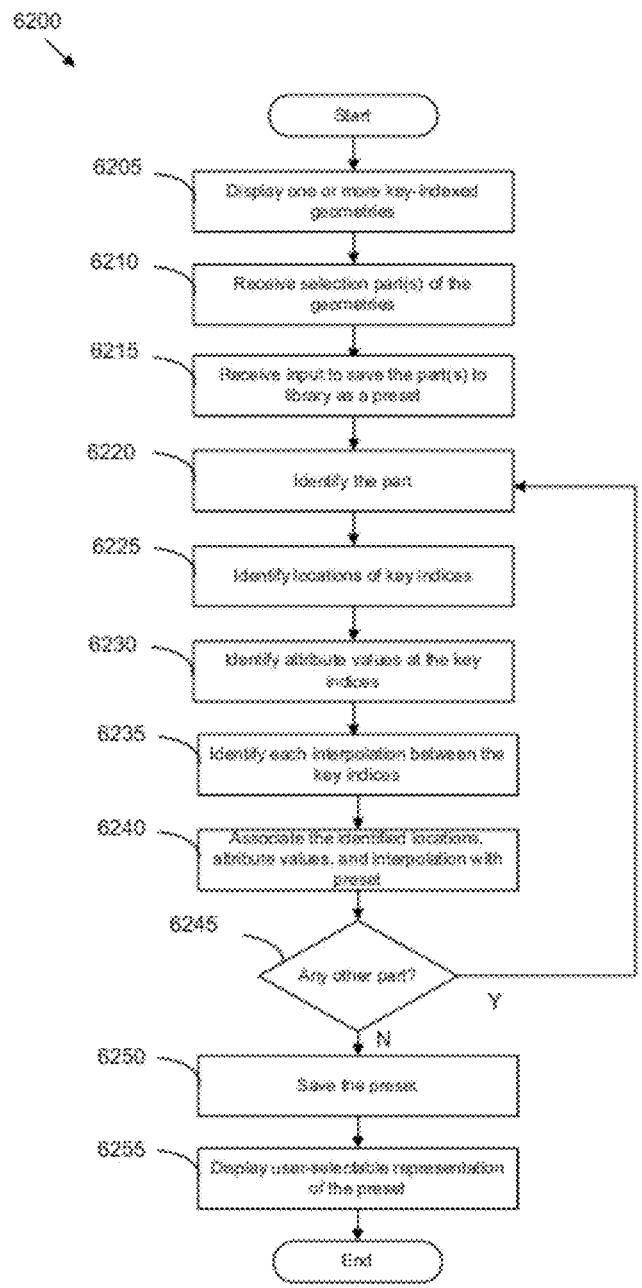

The preceding section described and illustrated various ways to select and store a user-defined preset to a preset library. FIG. 62 conceptually illustrates a process 6200 of some embodiments for selecting and saving such preset to the library. The process is performed by a media editing application in some embodiments. As shown, the process displays (at 6205) one or more key-indexed geometries. Several examples of displaying such key-indexed geometries are illustrated in FIGS. 53-61. The process then receives (at 6210) selection of one or more parts of the key-indexed geometries. Several novel selection techniques for selecting parts of one or more geometries are discussed above. For instance, some embodiments allow a user to directly manipulate a key-indexed geometry in order to select several parts of the geometries. Also, some embodiment provides different user-interface tools (e.g., global timing bar, range selection tool) for selecting parts of the geometries.

Process 6200 then receives (at 6215) input to save the selected parts to a library as preset. In some embodiments, the media editing application provides user-interface tools for receiving such input. Several examples of receiving such input using such saving tool are illustrated in FIGS. 53-61.

After receiving the input to save the preset, the process identifies (at 6220) the selected part of the geometry. The process then indentifies (at 6225) locations of key indices for the selected part. In some embodiments, the location of a key index is relative one or more other key indices. For instance, when saving multiple key-indices, the location of a key index may be identified as an actual duration (e.g., time duration, frequency duration) between the key index and another key index. Alternatively, or conjunctively, in some embodiments, the location of the key index may be identified by a ratio or a proportion. For instance, in some such embodiments, the duration between two end-point key indices may be 100%, while the duration between one of the end-point key indices and another key index may be a fraction of the 100%. Such proportional definition allow a user-defined preset to be inserted along any duration, even when the duration is limited.

Process 6200 then indentifies (at 6215) attribute values at the key indices. After identifying the attribute values, the process (at 6235) identifies each interpolation between the key indices. The process then associates (at 6240) each indentified locations, attribute values, and interpolation with the preset.

The process determines (at 6245) whether any other part of another geometry needs to be saved. When the determination is made that another part needs to be saved, the process returns to 6220; otherwise, it proceeds to 6250. The process then (at 6250) saves the preset. Once the preset is saved, the process then displays (at 6255) a user-selectable representation of the preset. As mentioned above, some embodiments display the representation as a thumbnail, thumbnail with text description, and/or text-defined operations.

One of ordinary skill in the art will realize that not all features for selecting storing a user-defined preset need to be used together. Accordingly, some embodiments perform variations on the process 6200. For instance, some embodiments might not allow a user to select and store multiple parts of different geometries as one preset. Hence, in some such embodiments, the process may not need to determine whether any other part of another geometry is selected. Furthermore, in some embodiments, the operations of process might be performed by two or more separate processes. That is, some embodiments could have one or more processes for receiving selection of geometries, and a separate process for saving a preset to a preset library.

VIII. Collapsed Mode Selection and Operations

In some embodiments, the media editing application provides timing bars that represent the changing value of the attribute over the duration. For instance, in some such embodiments, the timing bars in a compressed form represent key-indexed graphs and/or their associated key-indexed shapes, which specify the changing values of attributes along a duration. Several examples of selecting and applying presets by using such collapsed timing bar will now be described by reference to FIGS. 63-65. Many of these examples will correspond to the examples given above for applying a preset on a key-indexed graph and/or shapes that is not in a collapsed view.

Figure 63:
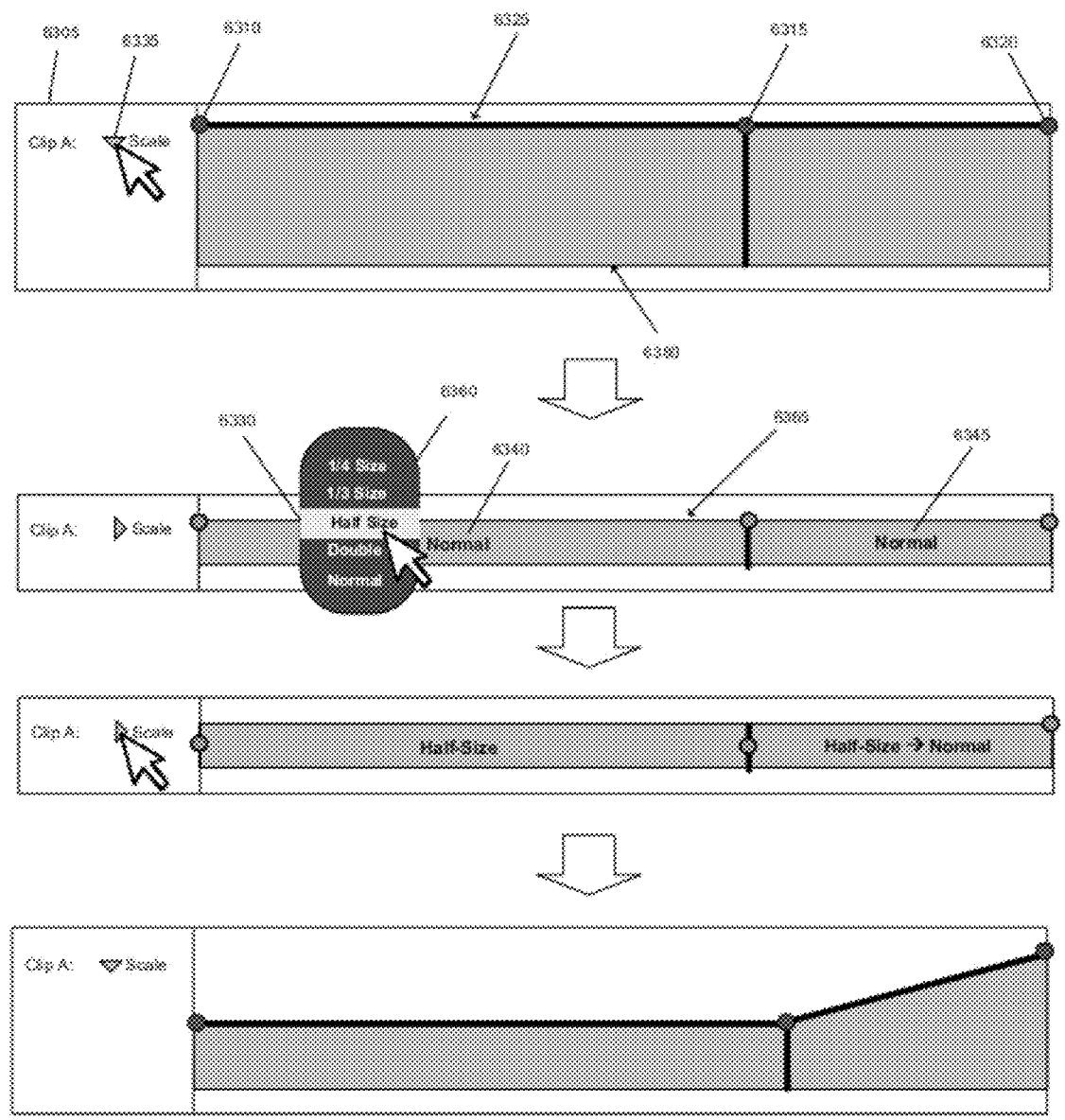
FIG. 63 illustrates modifying attribute values at multiple key indices by applying a key index preset using an attribute timing bar.

FIG. 63 illustrates modifying attribute values at multiple key indices by applying a key index preset using an attribute timing bar 6365. In this example, the geometry editor 6305 initially displays a key-indexed graph 6325 and a shape 6380 that represents scale of a video clip over a duration. The key-indexed graph 6325 and shape 6380 are defined by three key indices 6310-6320 and the interpolations between these key indices.

As shown in FIG. 63, when a user selects (e.g., through a cursor click operation) a control 6335 on the geometry editor, the user is presented with the timing bar 6365. Specifically, in this example, the selection of the control 6335 causes the key-indexed graph 6325 to collapse into the compressed timing bar 6365. The timing bar 6365 displays each of the key indices 6310-6320 as selectable items. In the timing bar 6365, the vertical position of each of the key indices 6310-6320 conveys the corresponding attribute value. The attribute timing bar 6365 also displays several descriptive text 6340 and 6345 that expresses the change in attribute values over the duration. The text 6340 and 6345 describe that the scale attribute across the duration is at normal scale.

In FIG. 63, a user's selection of a text 6330 from a preset window 6360 initiates the modification of the attribute values at the key indices 6310 and 6315. Specifically, when the user selects an interior location within the timing bar 6365, the user is presented with the preset window 6360. This preset window 6360 list several text that represent different predefined attribute values. The user then selects text 6330 labeled "half size" which causes the attribute values at the key indices 6310 and 6315 to be set at half scale. As a result of the modification to the attribute values, the key indices 6310 and 6315 on the timing bar are moved vertically. Also, the text 6340 specifies that the attribute values starting from the key index 6310 and ending at the key index 6315 is at half scale, and the text 6345 specifies that the attribute values starting from the key index 6315 and ending at the key index 6320 changes from half scale to normal scale. After modifying the attribute value at the key indices 6310 and 6315, the user then selects the control 6335 which causes the modified key-indexed 6325 graph and shape 6380 to be revealed.

Figure 64:
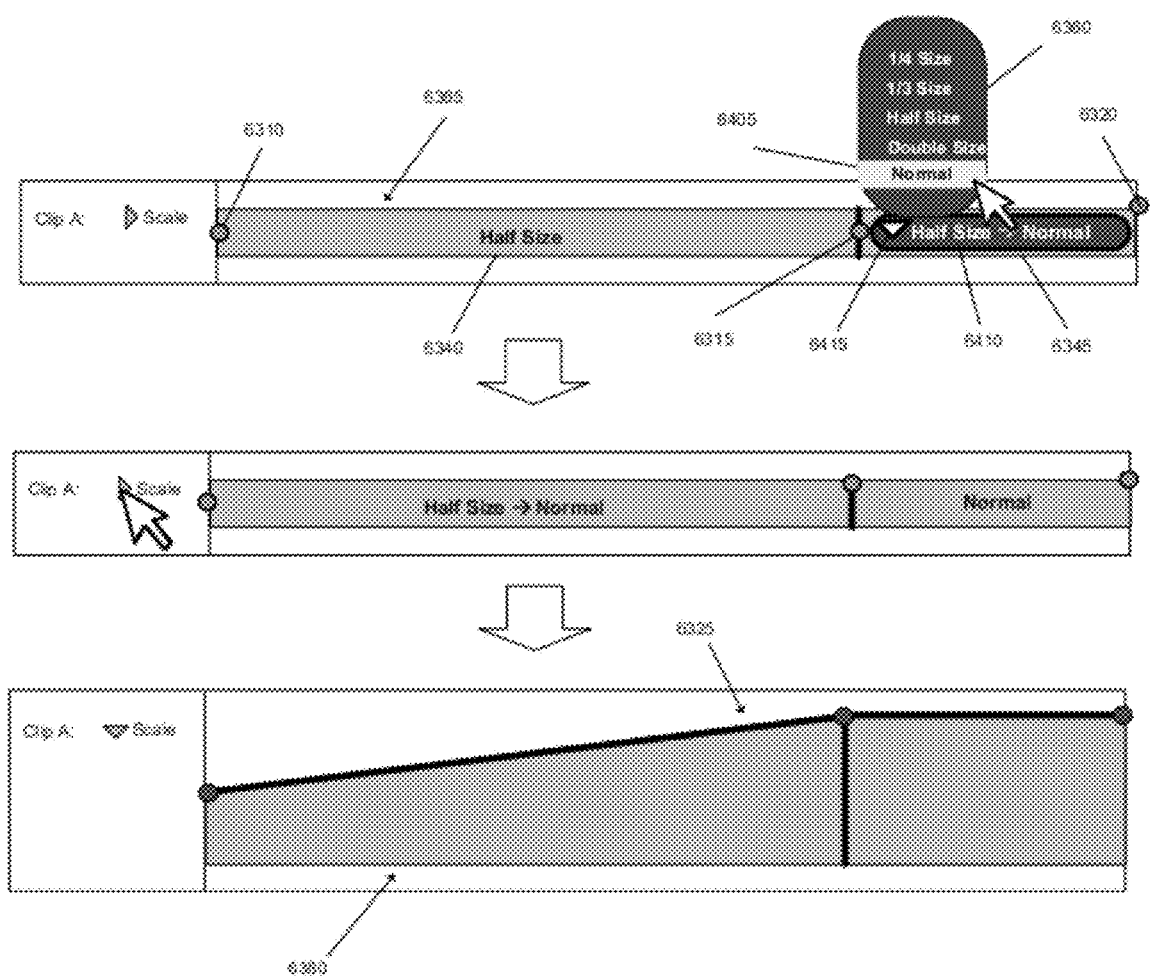
FIG. 64 illustrates modifying an attribute value at one key-index by applying a preset using an attribute timing bar.

In the example described above, the selection of a preset modifies two key indices by assigning each of the key indices a same attribute value. Some embodiments allow a user of the media editing application to modify attribute value at one key index by applying a preset using an attribute timing bar. FIG. 64 illustrates modifying an attribute value at one key-index by applying a preset using the attribute timing bar 6365. As shown, a cursor selection of (or cursor movement over) a part 6410 of the text 6345 causes a preset menu selector 6415 to appear on the attribute timing bar 6365.

When the user selects the menu selector 6415, the preset window 6360 appears as a menu on the attribute timing bar 6365. The user then selects text 6405 labeled "normal" which causes the scale attribute value at the key index 6315 to rise to normal scale. Similar to the example described above, the selection of the text 6405 causes the text (6340 and 6345) and the vertical position of the key index 6315 to be modified. After modifying the attribute value at the key index 6315, the user then selects the control 6335 which causes the modified key-indexed graph 6325 and shape 6380 to be revealed.

In the previous two examples, the cursor selection of an interior location within the timing bar 6365 or the menu selector 6410 initiates the display of the preset window 6360. Alternatively, or conjunctively, some embodiments display such preset window when a key index on an attribute timing bar is selected. For instance in FIG. 64, instead of selecting the menu selector 6410, the preset window may be displayed by selecting any one of the key indices 6310-6320 on the attribute timing bar 6365.

Figure 65:
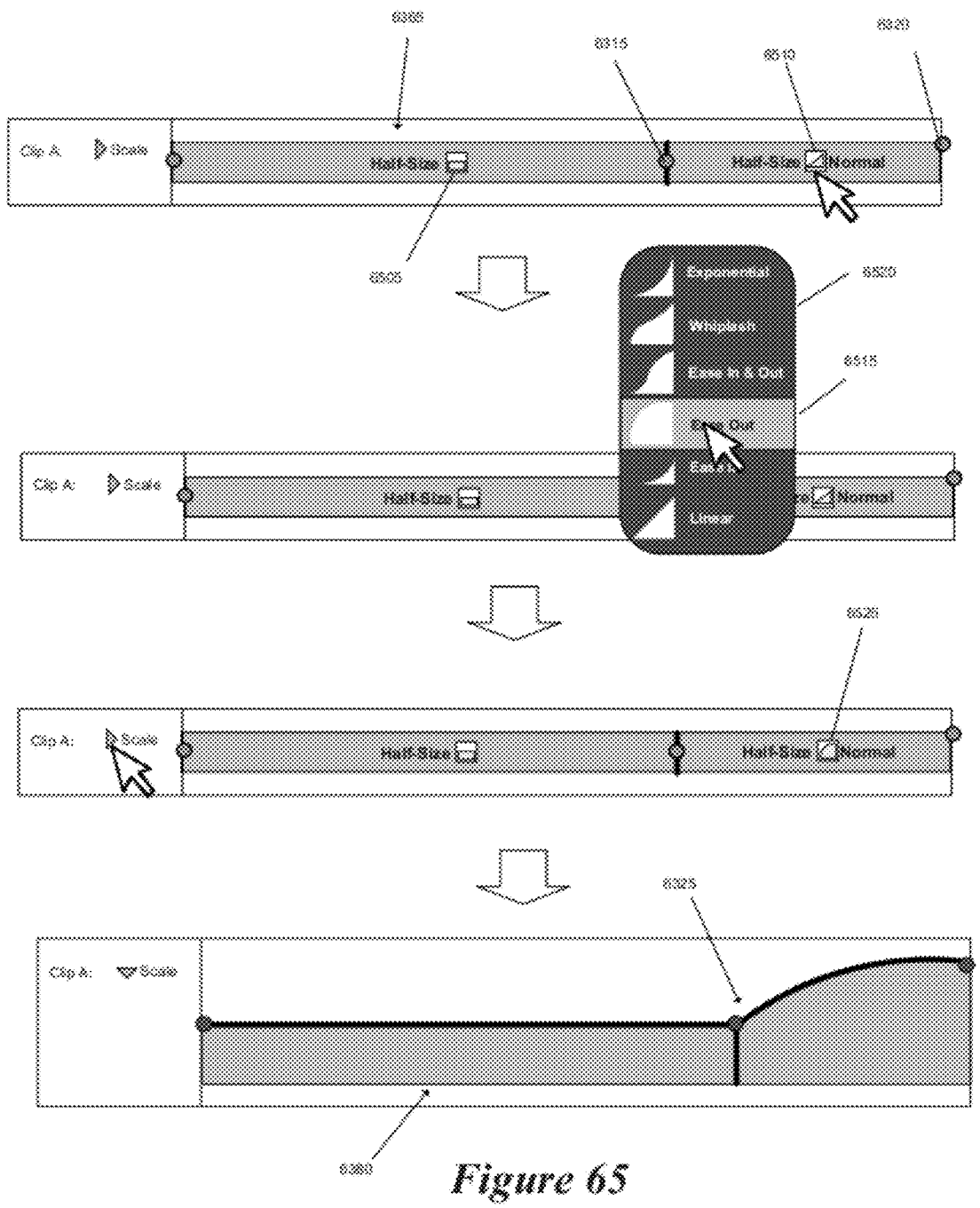
FIG. 65 illustrates modifying an interpolation between two key indices by using user-selectable tools on an attribute timing bar.

In some embodiments, the attribute timing bar provides user-selectable tools for modifying interpolation between key indices. FIG. 65 illustrates modifying an interpolation between the key indices 6315 and 6320 by using such user-selectable tools. As show, the attribute timing bar 6365 includes several user-selectable icons 6505 and 6510 that display interpolations between the key indices 6310-6320. Initially, icons 6505 and 6510 display geometries that indicates that the interpolations between the key indices 6310-6320 are linear. Also, icon 6505 indicates that attributes values between the key indices 6310 and 6315 is at half scale, while icon 6510 indicates that attributes values between the key indices 6315 and 6320 rises from half scale to normal scale.

As shown in FIG. 65, the cursor selection of thumbnail and text 6515 from a preset window 6520 initiates the modification of the interpolation between the key indices 6315 and 6320. Specially, when a user selects (e.g., through a cursor click operation) the icon 6510, the user is presented with the preset window 6520. The preset window 6520 includes several thumbnails with text that represent different predefined interpolations. The user then selects thumbnail with text 6515 labeled "ease out", which causes the interpolation between the key indices 6315 and 63120 to be modified. The attribute timing bar then displays a modified icon 6525 which indicates that the interpolation is an "ease out" interpolation. After modifying the interpolation, the user then selects the control 6335 which causes the modified key-indexed graph 6325 and shape 6380 to be revealed.

In the example described above, the user's selection of the icon 6510 initiates the display of the preset window 6520. Instead of displaying such preset window, some embodiments allow the user to toggle through different preset (e.g., key-index preset, interpolation presets) using such user-selectable tool. For instance, in FIG. 65, the "ease out" preset may be selected through one or more cursor click operations on the icon 6505.

Figure 66:
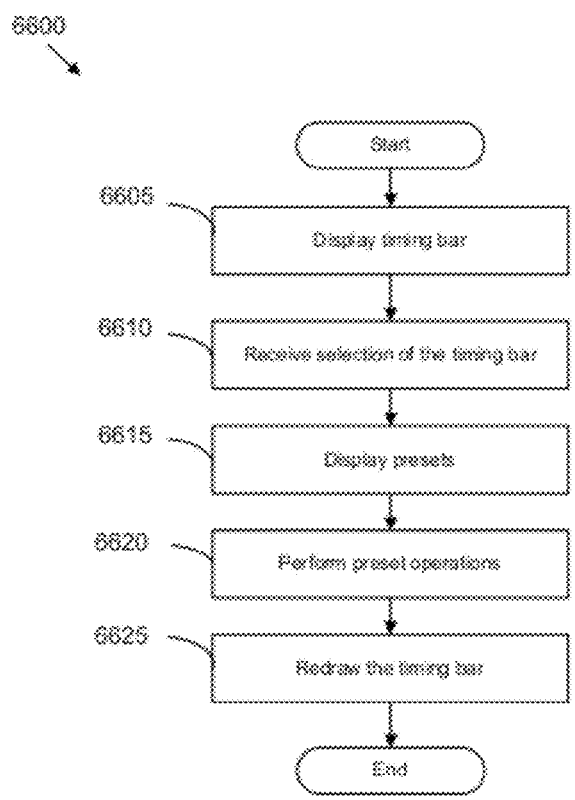
FIG. 66 conceptually illustrates a process of some embodiments for selecting and applying a preset by manipulation a timing bar.

The preceding section described and illustrated various ways to of select and apply presets by manipulating a collapsed timing bar. FIG. 66 conceptually illustrates a process 6600 of some embodiments for selecting and applying a preset by manipulation such timing bar. The process 6600 is performed by a media editing application in some embodiments. As shown, the process displays (at 6605) an attribute timing bar. Several examples of displaying such attribute timing bar are described above by reference to FIGS. 63-65.

Process then (at 6610) receives selection of the attribute timing bar. As mentioned above, some embodiments allow the user to directly select an interior location within the attribute timing bar and/or select user-interface tools on the attribute timing bar. An example of receiving selection of an interior location within the timing bar is described above by reference to FIG. 63. Several examples of receiving selection of user-interface tools on the timing bar are described above by reference to FIGS. 64-65.

Next, the process displays (at 6615) a list of presets. In some embodiments, the presets are displayed as thumbnails, thumbnails with text descriptions, and/or text-defined operations. Several examples of such representations are illustrated in FIGS. 63-65. Once the list of presets is displayed, the process receives (at 6615) selection of a preset from the list of presets.

The process then performs (at 6620) the preset operations. In some embodiments, the preset operations modify one or more key indices and/or the interpolation between the key indices. Several examples of modifying key indices are described above by reference to FIG. 63-64. An example of modifying interpolation between the key indices is described above by reference to FIG. 65. After performing the preset operations, the process redraws (at 6625) the timing bars. The process then ends.

One of ordinary skill in the art will realize that not all features for selecting and applying presets by manipulating a collapsed timing need to be used together. Accordingly, some embodiments perform variations on the process 6600. Furthermore, in some embodiments the operations of process 6600 might be performed by two or more separate processes. For instance, some embodiments might have one or more processes for performing the preset operations, and a separate process for displaying the timing bar.

IX. Overall Software Architecture

A. Software Architecture of an Application

Figure 67:
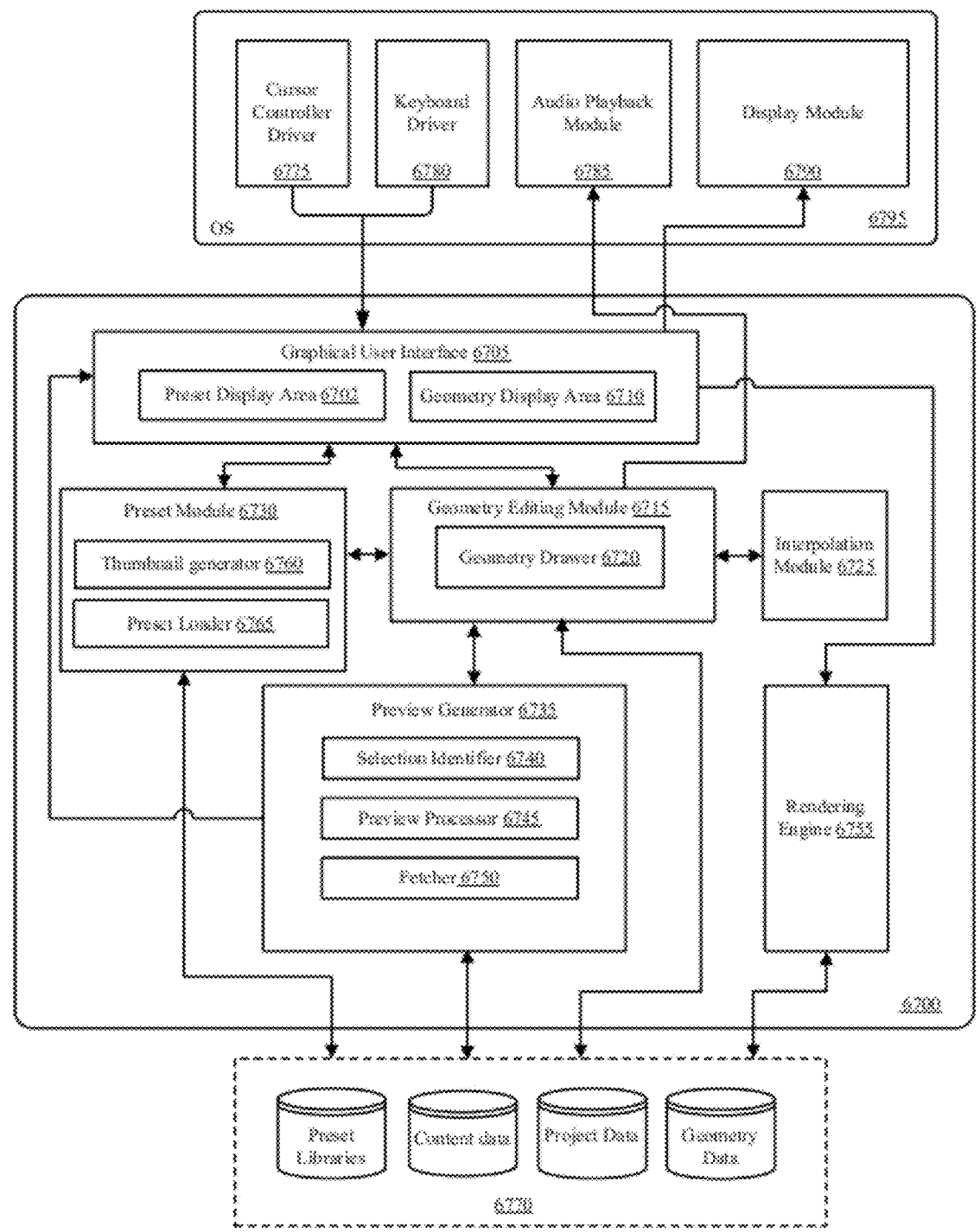
FIG. 67 conceptually illustrates the software architecture of an application in accordance with some embodiments.

In some embodiments, the above-described operations and user-interface tools are implemented as software running on a particular machine, such as a desktop computer, laptop, or handheld device, (or stored in a computer readable medium). FIG. 67 conceptually illustrates the software architecture of an application 6700 in accordance with some embodiments. In some embodiments, the application 6700 is a media editing application for creating a media presentation using one or more media clips. (e.g., audio clip, video clip, text overlay, picture, and/or other media). In some such embodiments, when the media editing application creates the media presentation, it creates the media presentation by incorporating the media clip into the media presentation with the attribute values specified by key-indexed geometries.

In some embodiments, the application 6700 is a stand-alone application or is integrated into another application (for instance, application 6700 might be a portion of a media editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine. In still other embodiments, the components (e.g., engines, modules) illustrated in FIG. 67 are split among multiple applications. For instance, in some embodiments, one application defines one or more key-indexed geometries to use in creating the media presentation, while another application performs composing and rendering of the media presentation based on the key-indexed geometries.

As shown in FIG. 67, the application 6700 includes a graphical user interface 6705, geometry editing module 6715, interpolation module 6725, preset module 6730, preview generator 6735, and rendering engine 6755. The graphical user interface 6705 provides user-interface tools (e.g., display areas, user-interface controls, etc.) that a user of the media editing application 6700 interacts with in order to create media presentations. In some embodiment, the user-interface tools include geometry-selections tools (e.g., timing bars, range selection tool, user-selectable shapes, user-selectable graphs, etc.) that allow the user to select parts of one or more key-indexed geometries. The user-interface tools also include menu item, toolbar icon, etc., which allow the user to save user-defined presets to one of the preset libraries in storage 6770.

In FIG. 67, the graphical user interface includes a preset display area 6702 for displaying one or more presets (e.g., interpolation presets, key-index presets, user-defined presets). The preset display area also allows the user of the media editing application to select the presets to apply to key-indexed geometries. In some embodiments, the graphical user interface includes a geometry display area 6710 that displays one or more key-indexed geometries that can be modified by the user according to one or more of the editing operations described above. When the geometry display area 6710 displays a key-indexed geometry, some embodiments provide geometry-selection capability by defining the geometry and its associated shape as selectable and modifiable elements (i.e., as items that can be selected and modified by the user).

As shown in FIG. 67, to facilitate geometry editing, displaying, and saving operations, the media editing application 6700 includes the geometry editing module 6715. In some embodiments, when the user inputs instructions to modify a particular key-indexed geometry through one of the user-interface tools, the geometry editing module 6715 receives and processes these instructions in order to modify and redraw the key-indexed geometry in the graphical user interface 6705. As shown in FIG. 67, the geometry editing module 6715 in some embodiments includes a geometry drawer 6720 for drawing and/or redrawing one or more of the key-indexed geometries in the graphical user interface 6705.

To draw the key-indexed geometries, the geometry drawer 6720 in some embodiments receives attributes values from the interpolation module 6725. This interpolation module 6725 in some embodiments is a module in the media editing application 6700 that receives the user modifications to one or more of the key-indexed geometries (e.g., attribute values at key indices, interpolation between the key indices) and performs data interpolation. For instance, in some such embodiments, the interpolation module 6725 receives a first attribute value at one key index and a second attribute value at a subsequent key index and fills in (i.e., interpolates) the attribute values between the two key indices in accordance with the interpolation that is defined between the two key indices. In some embodiments, the interpolation module 6725 performs the interpolation based on parameterizable curve mathematics in accordance with the angle of the tangents at the key indices and/or the length of the tangents at the key indices.

The preset module 6730 in some embodiments is a module in the media editing application 6700 that facilitates saving and loading of presets. When the user inputs instructions to save a part of one or more key-indexed geometries through one of the user-interface tools, the preset module 6715 receives and processes these instructions in order to save the part as one user-defined preset to one of the preset libraries in storage 6770. In some embodiments, the preset module 6730 automatically generates one or more representations (e.g., thumbnail, thumbnail with text description, and/or text-defined operation) when saving the user-defined preset to the library.

To automatically generate images for user-defined presets, the preset module 6730 in some embodiments includes a thumbnail generator 6760. This thumbnail generator 6760 automatically generates a thumbnail image when the user of the media editing applications inputs instructions to save a part of one or more geometries to the preset library. In some embodiments, thumbnail generator dynamically generates the thumbnail based on one or more rules. These rules might specify capturing a thumbnail of a media editing operations associated the user-defined preset. For instance, a rule might specify capturing a thumbnail image of one or more shapes and/or graphs that is associated with the preset. Alternatively, the rule might specify capturing one or more frames of video clip in a composite presentation that the media editing application creates. In generating, the thumbnail generator may interact with a rule engine (not shown). In some embodiments, the representation of the preset is stored along with the user-defined preset in one of the preset libraries. In some embodiments, the preset module includes a preset loader 6765 for loading presets stored in one or more of the preset libraries in storage 6770. For instance, when the user inputs instructions to apply a preset by selecting a preset representation, the preset module receives the preset from the preset loader 6765 and sends the preset to the geometry editing module 6715 for processing.

Preview generator 6735 in some embodiments generates a preview (e.g., real-time preview) of the media presentation that is being created by the media editing application 6700. When the preview generates the preview, it generates the preview by incorporating the media clip into the preview with the attribute values defined by one or more of the key-indexed geometry in some embodiments.

As shown in FIG. 67, the preview generator 6735 of some embodiments includes a preview processor 6745 that may be used to communicate with the geometry editing module 6715, and send and receive data (e.g., project data) to and from the graphical user interface 6705 and/or the set of data storages 6770. In addition, the preview processor 6745 may send and receive data to and from a section identifier 6740 and/or a fetcher 6750. In some embodiments, the preview processor 6745 sends timeline data to the section identifier 6740 that generates an appropriate set of data (e.g., a segment table) needed to generate the preview. In some embodiments, the preview processor 6745 supplies the set of data generated by the section identifier 6740 to the fetcher 6750. The fetcher 6750 of some embodiments retrieves content data (e.g., video frame data, audio sample data) from the set of data storages 6770 based on the set of data provided by the preview processor 6745. The preview generator 6735 in some embodiments receives and uses the content data in order to generate the preview.

Rendering engine 6755 enables the storage or output of audio and video from the media editing application 6700. For instance, the rendering engine 6755 may use attribute values associated with one or more attributes of a media clip to render a media presentation for display and/or storage.

The operating system 6795 of some embodiments includes a cursor controller driver 6775 for allowing the application 6700 to receive data from a cursor control device, a keyboard driver 6780 for allowing the application to receive data from a keyboard, the audio playback module 6785 for processing audio data that will be supplied to an audio device (e.g., a soundcard and speakers), and a display module 6795 for processing video data that will be supplied to a display device (e.g., a monitor).

An example operation of the media editing application 6700 will now be described by reference to the components (e.g., engines, modules) illustrated in FIG. 67. A user interacts with user-interface tools (e.g., geometries, user-selectable controls, display areas) in the graphical user interface 6705 of the media editing application via input devices such as a cursor controller (e.g., a mouse, touchpad, touch screen, etc.) and keyboard (e.g., physical keyboard, virtual keyboard). For instance, the user may select parts of multiple different key-indexed geometries using a user-interface tool and instruct the media editing application to store the selected the parts to a preset library using a saving tool.

When the user interacts with a user-interface tool for saving presets, some embodiments translate the user interaction into input data and send this data to the preset module 6730. The preset module 6730 then automatically generates one or more representations (e.g., thumbnail, thumbnail with text description, and/or text-defined operation) and saves the user-defined preset to one of the preset libraries in storage 6770.

When the user input result in a need to modify one or more geometries using a preset, the preset module 6730 receives the preset from the preset loader 6765 and sends the preset to the geometry editing module 6715 for processing. The interpolation module 6725 receives preset data (e.g., attribute value at key indices, interpolation between the key indices) from the editing module 6715 and performs data interpolation. For instance, in some such embodiments, the interpolation module receives a first attribute value at one key index and a second attribute value at a subsequent key index and fills in (i.e., interpolates) the attribute values between the two key indices in accordance with the interpolation that is defined between the two key indices (e.g., straight line, parameterizable curve, etc.). In some embodiments, the geometry editing module 6715 receives the attribute values (i.e., geometry data) from the interpolation module 6755 and stores the attribute values in memory (e.g., the set of storage 6770). The geometry drawer in some embodiments uses these attribute values to generate a display of the particular key-index geometry.

In some embodiments, the attribute values that are stored in memory are used by preview generator 6735 in order to generate a preview of the media presentation. As mentioned above, the rendering ending may also use the attribute values to render the media presentation for display and/or storage.

B. Process for Defining an Application

Figure 68:
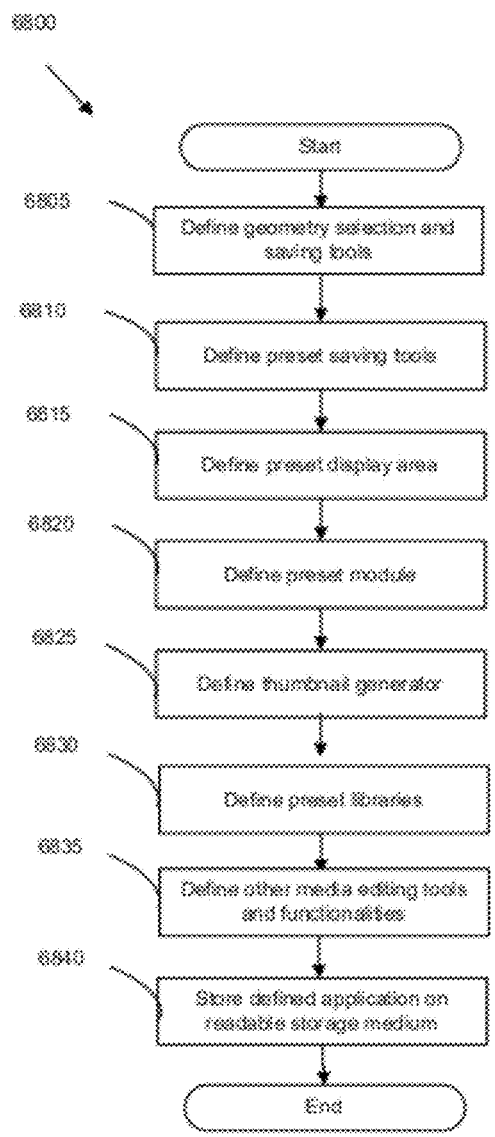
FIG. 68 conceptually illustrates a process of some embodiments for defining an application.

The section above described and illustrated the software architecture of an application in accordance with some embodiments. FIG. 68 conceptually illustrates a process 6800 of some embodiments for defining an application, such as application 6700. As shown, the process defines (at 6805) geometry selection tools. The process then defines (at 6810) preset saving tools. The process then defines (at 6815) preset display area. The preset display area 6702 is an example of such a display area.

Next, the process defines (at 6820) a preset module. The preset module 6730 is an example of such a module. The process then defines (at 6825) a thumbnail generator. The thumbnail generator 6760 is one example of such generator. The process next defines (at 6830) one or more preset libraries. In some embodiments, these preset libraries initially stores presets provided by one or more programmers of the application. These programmer defined-presets, in some embodiments, are different from presets defined by the user (i.e., end-user) of the application. The programmer-defined presets and end-user defined presets may be stored in different preset libraries, in some embodiments.

The process next defines (at 6835) other media editing tools and functionalities. After 6835, the application is defined. Accordingly, at 6840, the process stores a representation of the application in a readable storage medium. The readable storage medium may be a disk (e.g., CD, DVD, hard disk, etc.) or a solid-state storage device (e.g., flash memory) in some embodiments. The process then ends.

One of ordinary skill in the art will recognize that the various modules and UI items defined by process 6800 are not exhaustive of the modules and UI items that could be defined and stored on a computer readable storage medium for an editing application incorporating some embodiments of the invention.

X. Computer System

Many of the above-described processes, modules, and interfaces are implemented as software processes that are specified as a set of instructions recorded on a computer readable storage medium (also referred to as "computer readable medium", "readable storage medium", or "machine readable medium"). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 69:
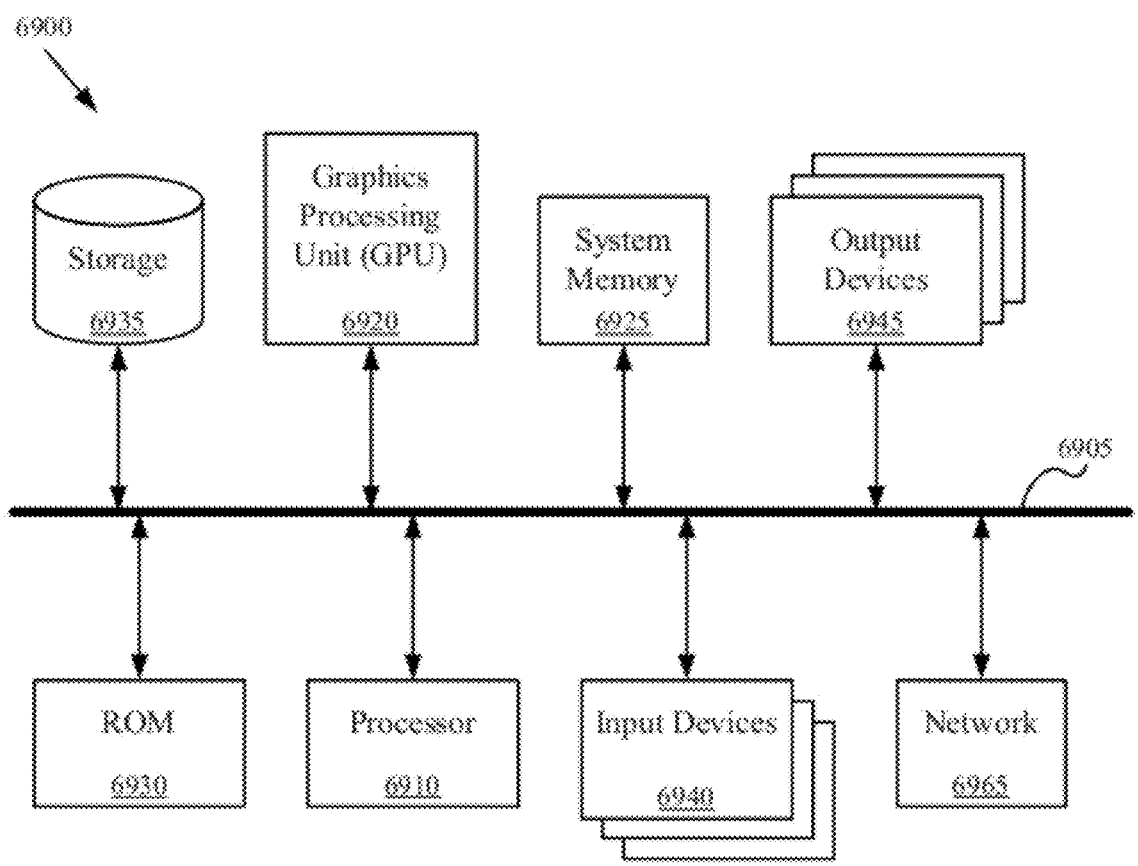
FIG. 69 conceptually illustrates a computer system with which some embodiments of the invention are implemented.

FIG. 69 conceptually illustrates a computer system 6900 with which some embodiments of the invention are implemented. For example, the system described above in reference to FIG. 67 may be at least partially implemented using sets of instructions that are run on the computer system 6900. As another example, the processes described in reference to FIGS. 41, 45, 51, 62, and 65 may be at least partially implemented using sets of instructions that are run on the computer system 6900.

Computer system 6900 includes a bus 6910, a processor 6920, a system memory 6930, a read-only memory (ROM) 6940, a permanent storage device 6950, a graphics processing unit ("GPU") 6960, input devices 6970, output devices 6980, and a network connection 6990. The components of the computer system 6900 are electronic devices that automatically perform operations based on digital and/or analog input signals. The various examples of user interfaces shown in FIGS. 38-40, 41-44, 46-50, 52-54, 56-60, and 63-65 may be at least partially implemented using sets of instructions that are run on the computer system 6900 and displayed using the output devices 6980.

One of ordinary skill in the art will recognize that the computer system 6900 may be embodied in other specific forms without deviating from the spirit of the invention. For instance, the computer system may be implemented using various specific devices either alone or in combination. For example, a local PC may include the input devices 6970 and output devices 6980, while a remote PC may include the other devices 6910-6960, with the local PC connected to the remote PC through a network that the local PC accesses through its network connection 6990 (where the remote PC is also connected to the network through a network connection).

The bus 6910 collectively represents all system, peripheral, and chipset buses that communicatively connect the numerous internal devices of the computer system 6900. For instance, the bus 6910 communicatively connects the processor 6920 with the system memory 6930, the ROM 6940, and the permanent storage device 6950. From these various memory units, the processor 6920 retrieves instructions to execute and data to process in order to execute the processes of the invention. In some embodiments, the processor comprises a Field Programmable Gate Array (FPGA), an ASIC, or various other electronic components for executing instructions. In some cases, the bus 6910 may include wireless and/or optical communication pathways in addition to or in place of wired connections. For example, the input devices 6970 and/or output devices 6980 may be coupled to the system 6900 using a wireless local area network (W-LAN) connection, Bluetooth®, or some other wireless connection protocol or system.

The ROM 6940 stores static data and instructions that are needed by the processor 6920 and other modules of the computer system. The permanent storage device 6950, on the other hand, is a read-and-write memory device. This device is a non-volatile memory unit that stores instructions and data even when the computer system 6900 is off. Some embodiments of the invention use a mass-storage device (such as a magnetic or optical disk and its corresponding disk drive) as the permanent storage device 6950.

Other embodiments use a removable storage device (such as a floppy disk, flash drive, or CD-ROM) as the permanent storage device. Like the permanent storage device 6950, the system memory 6930 is a read-and-write memory device. However, unlike storage device 6950, the system memory 6930 is a volatile read-and-write memory, such as a random access memory (RAM). The system memory stores some of the instructions and data that the processor needs at runtime. In some embodiments, the sets of instructions used to implement the invention's processes are stored in the system memory 6930, the permanent storage device 6950, and/or the read-only memory 6940. For example, the various memory units include instructions for processing multimedia items in accordance with some embodiments. From these various memory units, the processor 6910 retrieves instructions to execute and data to process in order to execute the processes of some embodiments.

In addition, the bus 6910 connects to the GPU 6960. The GPU of some embodiments performs various graphics processing functions. These functions may include display functions, rendering, compositing, and/or other functions related to the processing or display of graphical data.

The bus 6910 also connects to the input devices 6970 and output devices 6980. The input devices 6970 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 6980 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 69, bus 6910 also couples computer 6900 to a network 6990 through a network adapter (not shown). In this manner, the computer can be a part of a network of computers (such as a local area network ("LAN"), a wide area network ("WAN"), an Intranet, or a network of networks, such as the Internet. For example, the computer 6900 may be coupled to a web server (network 6990) so that a web browser executing on the computer 6900 can interact with the web server as a user interacts with a GUI that operates in the web browser.

As mentioned above, the computer system 6900 may include electronic components, such as microprocessors, storage and memory that store computer program instructions in one or more of a variety of different computer-readable media (alternatively referred to as computer-readable storage media, machine-readable media, machine-readable storage media, readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. It should be recognized by one of ordinary skill in the art that any or all of the components of computer system 6900 may be used in conjunction with the invention. Moreover, one of ordinary skill in the art will appreciate that any other system configuration may also be used in conjunction with the invention or components of the invention.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) user-interface elements in the graphical user interface. However, in some embodiments, these user-interface elements in the graphical user interface can also be controlled or manipulated through other control, such as touch control. In some embodiments, touch control is implemented through an input device that can detect the presence and location of touch on a display of the device. An example of such a device is a touch screen device. In some embodiments, with touch control, a user can directly manipulate user-interface elements by interacting with the graphical user interface that is displayed on the display of the touch screen device. For instance, a user can select a particular user-selectable element in the graphical user interface by simply touching that particular user-selectable element on the display of the touch screen device. As such, when touch control is utilized, a cursor may not even be provided for enabling selection of a user-selectable element of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms (i.e., different embodiments may implement or perform different operations) without departing from the spirit of the invention. One of ordinary skill in the art would also recognize that some embodiments may divide a particular module into multiple modules. One ordinary skill in the art would also recognize that once a user-defined preset is defined it may be shared with other users via the Internet. For instance, one end-user might create a preset and upload it into a server to be shared with other users. In addition, although the examples given above may discuss accessing the system using a particular device (e.g., a PC), one of ordinary skill will recognize that a user could access the system using alternative devices (e.g., a cellular phone, PDA, smartphone, BlackBerry®, or other device).

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

The invention claimed is:

1. A non-transitory machine readable medium storing a media editing application that when executed by at least one processing unit provides a graphical user interface ("GUI") for editing media items, the GUI comprising:
    a key-indexed geometry editor for specifying a plurality of different key-indexed geometries to represent a plurality of different attributes of a first media item, each key-indexed geometry spanning along a dimension and comprising a set of movable key indices at a set of different locations along the dimension to specify a set of values of one attribute at the set of different locations;
    a preset tool for selecting a first range along the dimension of a first key-indexed geometry representing a first attribute and a second range along the dimension of a second key-indexed geometry representing a second attribute, and saving one unified preset to a preset library based on the selected first and second ranges, wherein at least one of the first and second ranges spans only a portion of a duration of the corresponding key-indexed geometry; and
    a preset display area for displaying a representation of the one unified preset, wherein a selection of the representation causes the first and second attributes of a second media item to be modified according to the first and second ranges of the first and second key-indexed geometries.

2. The non-transitory machine readable medium of claim 1, wherein the representation comprises a thumbnail image, the GUI further comprising defining a thumbnail generator for capturing, based on a set of rules, the thumbnail image of the first and second ranges upon saving the unified preset to the preset library.

3. The non-transitory machine readable medium of claim 1, wherein the first media item is associated with a media presentation having a sequence of frames, wherein the representation comprises a thumbnail image, the GUI further comprising a thumbnail generator for capturing a thumbnail image of at least one frame of the media presentation upon saving the unified preset to the preset library.

4. The non-transitory machine readable medium of claim 1, wherein the representation is a text representation, wherein the preset tool is further for generating the text representation upon saving the unified preset to the preset library, wherein the preset display area is further for receiving a user-description for the text representation.

5. The non-transitory machine readable medium of claim 1, wherein saving the unified preset comprises saving media editing operations associated with the selected first and second ranges.

6. The non-transitory machine readable medium of claim 1, wherein each of the first and second ranges is defined at least by first and second key indices, and an interpolation between the first and second key indices.

7. The non-transitory machine readable medium of claim 1, wherein the plurality of key-indexed geometries are displayed in the key-indexed geometry editor as key-indexed graphs or key-indexed shapes.

8. The non-transitory machine readable medium of claim 1, wherein said media item is a media clip, wherein said media editing application creates a media presentation of the media clip by incorporating the media clip into the media presentation with the sets of attribute values specified by the plurality of key-indexed geometries.

9. The non-transitory machine readable medium of claim 1, wherein said media item is a media editing operation.

10. The non-transitory machine readable medium of claim 9, wherein said media editing operation is a filter operation for creating an effect in a media presentation, wherein said media editing application creates a media presentation in accordance with the sets of attribute values specified by the plurality of key-indexed geometries.

11. A non-transitory machine readable medium storing a program that when executed by at least one processing unit provides a graphical user interface ("GUI") for creating media presentations, the GUI comprising:
    to represent values of a first attribute of a first media item over a dimension, a key-indexed geometry that spans along the dimension and comprises a plurality of movable key indices at different locations along the dimension to specify different values of the first attribute at the different locations, wherein a movement of a key index modifies the key-indexed geometry and modifies at least a subset of values of the first attribute along said dimension;
    a preset tool for (i) selecting a range that spans only a portion of the dimension of the key-indexed geometry, (ii) storing a user-defined preset based on the selected range, and (iii) generating a thumbnail image for the user-defined preset; and
    a preset display area for displaying the thumbnail image of the user-defined preset, wherein a selection of the thumbnail image causes a second attribute of a second media item to be modified according to the range of the key-indexed geometry.

12. The non-transitory machine readable medium of claim 11, wherein the preset tool is further for generating a text representation for the user-defined preset, wherein said preset display area is further for receiving a user description for the text representation.

13. The non-transitory machine readable medium of claim 11, wherein the key-indexed geometry is a key-indexed shape that expresses the change in the attribute value over the dimension, wherein generating the thumbnail image comprises capturing a snapshot of at least the selected range of the key-indexed shape.

14. The non-transitory machine readable medium of claim 11, wherein the key-indexed geometry is a key-indexed graph that expresses the change in the attribute over the dimension, wherein generating the thumbnail image comprises capturing a snapshot of at least the selected range of the key-indexed graph.

15. The non-transitory machine readable medium of claim 11, wherein the key-indexed geometry is a first key-indexed geometry, wherein the GUI further comprises:
to represent values of a second attribute of the first media item over the dimension, a second key-indexed geometry that spans along the dimension and comprises a plurality of movable key indices at different locations along the dimension to specify different values of the second attribute at the different locations, wherein a movement of a key index modifies the second key-indexed geometry and modifies at least a subset of values of the second attribute along said dimension,
wherein the preset tool is further for (i) selecting multiple ranges of the first and second key-index geometries, (ii) storing one unified preset based on the selected ranges, and (iii) generating a thumbnail image for the unified preset.

16. The non-transitory machine readable medium of claim 11, wherein the key-indexed geometry is a first key-indexed geometry, wherein the second media item is associated with a second key-indexed geometry that is defined by a set of key indices and an interpolation between the set of key indices, wherein the selection of the thumbnail image causes the second attribute of the second media item to be modified by changing the attribute values at the set of key indices and the interpolation between the set of key indices.

17. The non-transitory machine readable medium of claim 11, wherein the key-indexed geometry is a first key-indexed geometry, wherein the second media item is defined by a second key-indexed geometry, wherein the user-defined preset is stored in a preset library, wherein the selection of the thumbnail image causes the second attribute of the second media item to be modified by replacing the second key-indexed geometry with the range of the first key-indexed geometry.

18. A method of defining a media editing application having a graphical user interface ("GUI") for editing media items, the method comprising:
configuring a key-indexed geometry editor for specifying a plurality of different key-indexed geometries to represent a plurality of different attributes of a first media item, each key-indexed geometry spanning along a dimension and comprising a set of movable key indices at a set of different locations along the dimension to specify a set of values of one attribute at the set of different locations;
configuring a preset tool for selecting a first range along the dimension of a first key-indexed geometry representing a first attribute and a second range along the dimension of a second key-indexed geometry representing a second attribute, and saving one unified preset to a preset library based on the selected first and second ranges, wherein at least one of the first and second ranges spans only a portion of the duration of the corresponding key-indexed geometry; and
configuring a preset display area for displaying a representation of the one unified preset, wherein a selection of the representation causes the first and second attributes of a second media item to be modified according to the first and second ranges of the first and second key-indexed geometries.

19. The method of claim 18, wherein the representation comprises a thumbnail image, the method further comprising configuring a thumbnail generator for capturing, based on a set of rules, the thumbnail image of the first and second ranges upon saving the unified preset to the preset library.

20. The method of claim 18 further comprising storing the media editing application with the geometry editor, the preset tool, and the preset display area on a physical storage medium.

21. The method of claim 18, wherein the first media item is associated with a media presentation having a sequence of frames, wherein the representation comprises a thumbnail image, the method further comprising configuring a thumbnail generator for capturing a thumbnail image of at least one frame of the media presentation upon saving the unified preset to the preset library.

22. The method of claim 18, wherein the representation is a text representation, wherein the preset tool is further for generating the text representation upon saving the unified preset to the preset library, wherein the preset display area is further for receiving a user-description for the text representation.

23. A method of defining a media editing application having a graphical user interface ("GUI") for creating media presentations, the method comprising:
configuring a key-indexed geometry to represent values of a first attribute of a first media item over a dimension, said key-indexed geometry spanning along the dimension and comprising a plurality of movable key indices at different locations along the dimension to specify different values of the first attribute at the different locations, wherein a movement of a key index modifies the key-indexed geometry and modifies at least a subset of values of the first attribute along said dimension;
configuring a preset tool for (i) selecting a range that spans only a portion of the dimension of the key-indexed geometry, (ii) storing a user-defined preset based on the selected range, and (iii) generating a thumbnail image for the user-defined preset; and
configuring a preset display area for displaying the thumbnail image of the user-defined preset, wherein a selection of the thumbnail image causes a second attribute of a second media item to be modified according to the range of the key-indexed geometry.

24. The method of claim 23, wherein the preset tool is further for generating a text representation for the user-defined preset, wherein said preset display area is further for receiving a user description for the text representation.

25. The method of claim 23, wherein the key-indexed geometry is a key-indexed shape that expresses the change in the attribute value over the dimension, wherein generating the thumbnail image comprises capturing a snapshot of at least the selected range of the key-indexed shape.

26. The method of claim 23, wherein the key-indexed geometry is a key-indexed graph that expresses the change in the attribute over the dimension, wherein generating the thumbnail image comprises capturing a snapshot of at least the selected range of the key-indexed graph.

27. The method of claim 23, wherein the key-indexed geometry is a first key-indexed geometry, wherein the second media item is associated with a second key-indexed geometry that is defined by a set of key indices and an interpolation between the set of key indices, wherein the selection of the thumbnail image causes the second attribute of the second media item to be modified by changing the attribute values at the set of key indices and the interpolation between the set of key indices.

* * * * *